Feb. 17, 1953　　　W. P. LOUDON　　　2,628,774
RECEIPT PRINTING AND ISSUING MECHANISM
Filed Sept. 16, 1949　　　　　　　　22 Sheets-Sheet 1
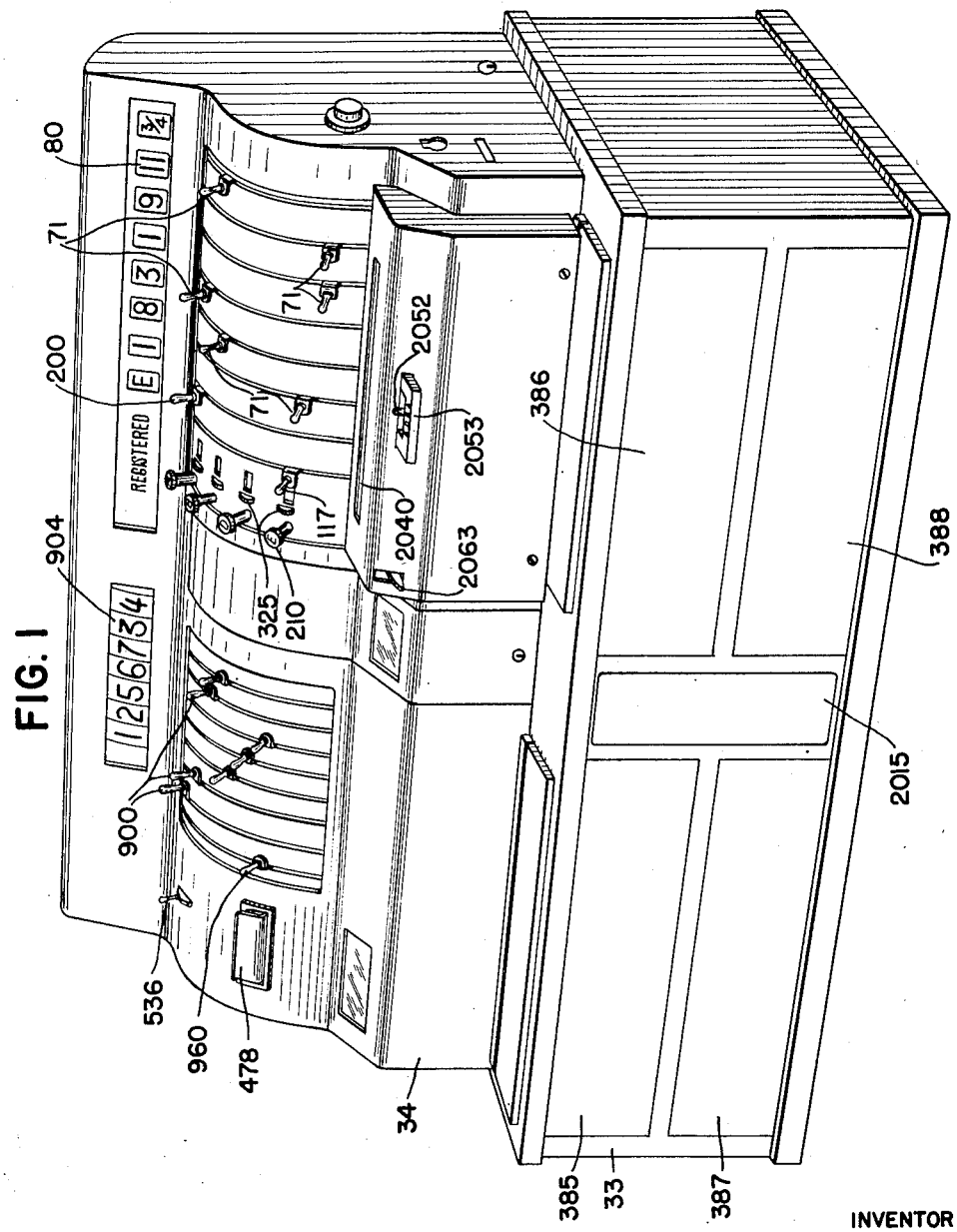
INVENTOR
WARREN P. LOUDON
BY Carl Beust
HIS ATTORNEY

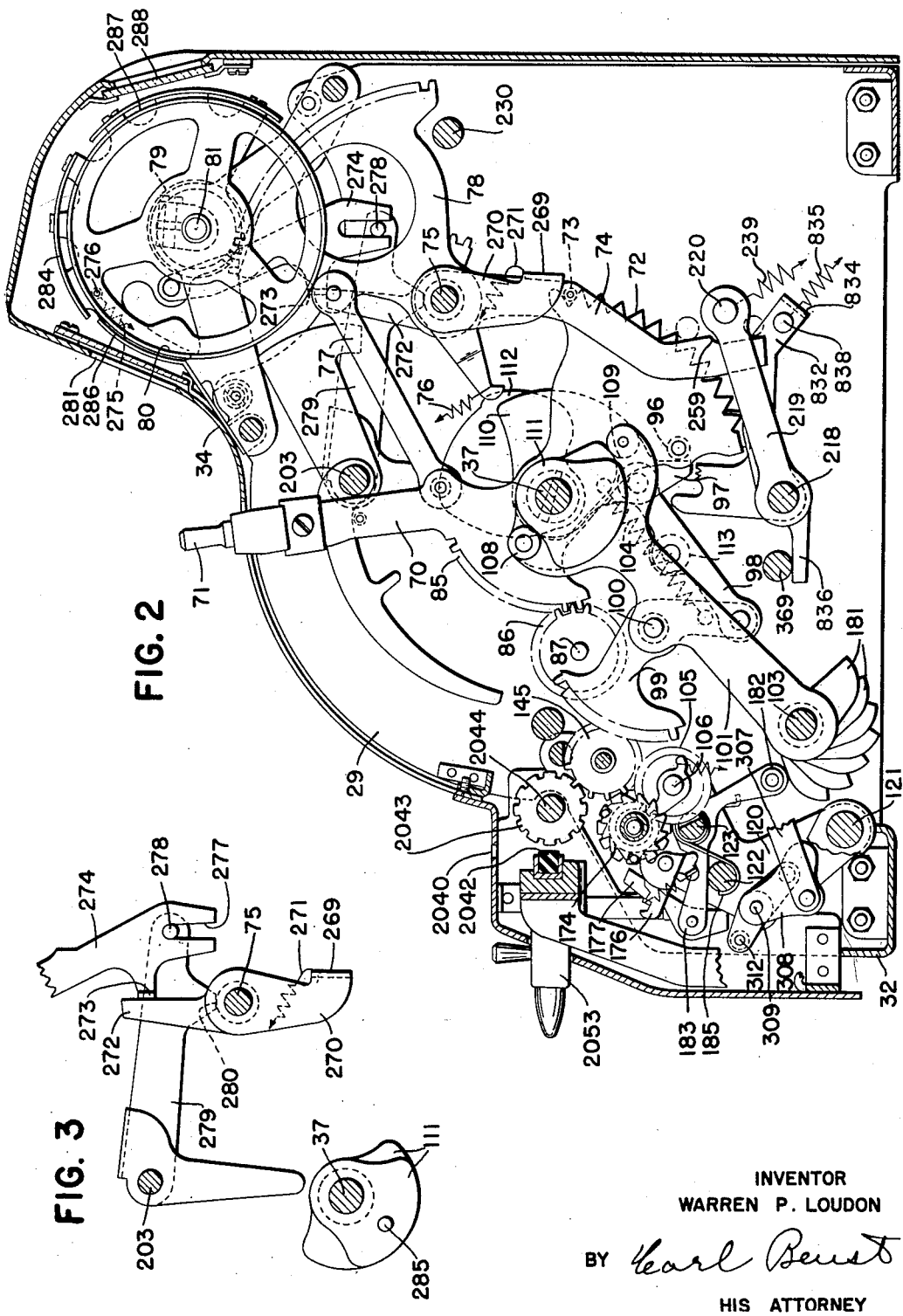

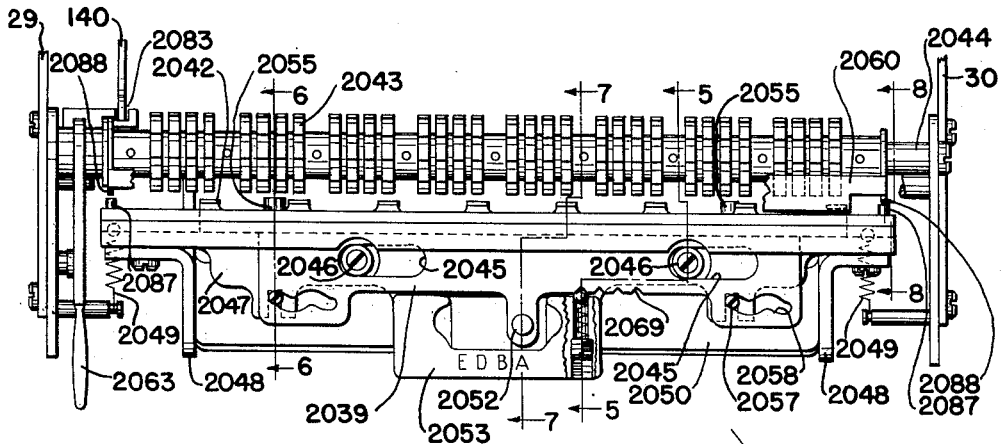
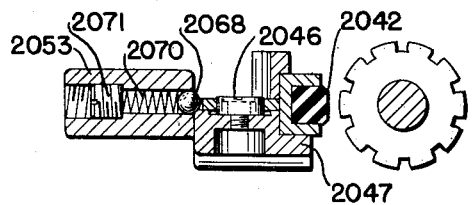
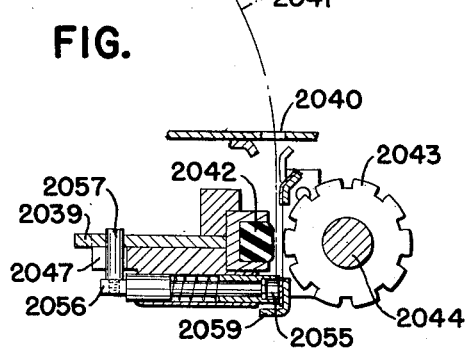
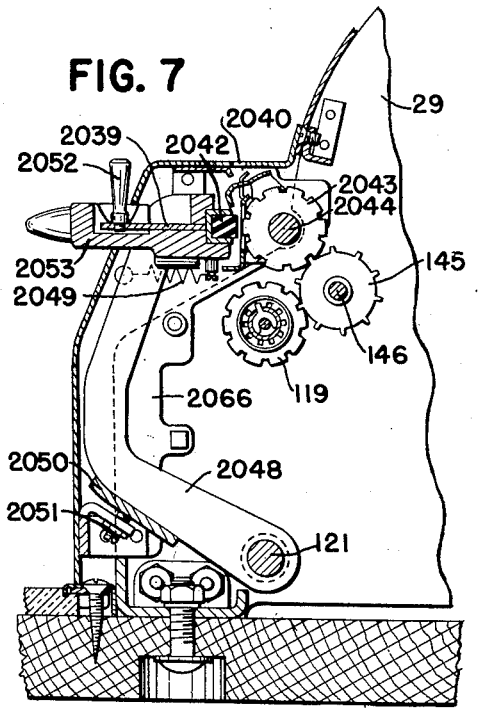
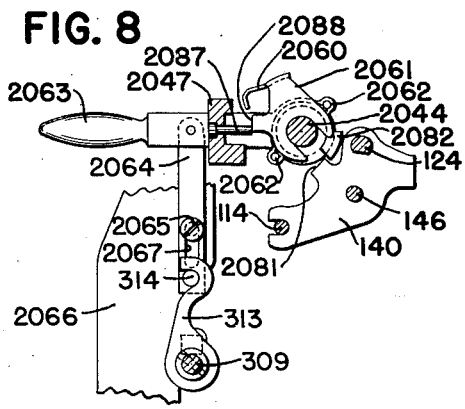

Feb. 17, 1953 W. P. LOUDON 2,628,774
RECEIPT PRINTING AND ISSUING MECHANISM
Filed Sept. 16, 1949 22 Sheets-Sheet 4

INVENTOR
WARREN P. LOUDON
BY *Hearl Beint*
HIS ATTORNEY

Feb. 17, 1953 W. P. LOUDON 2,628,774
RECEIPT PRINTING AND ISSUING MECHANISM
Filed Sept. 16, 1949 22 Sheets-Sheet 5
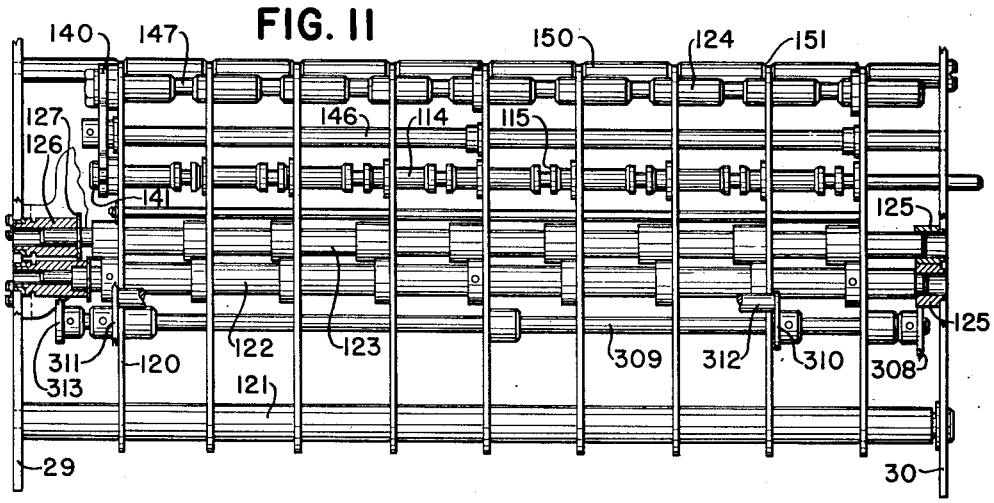
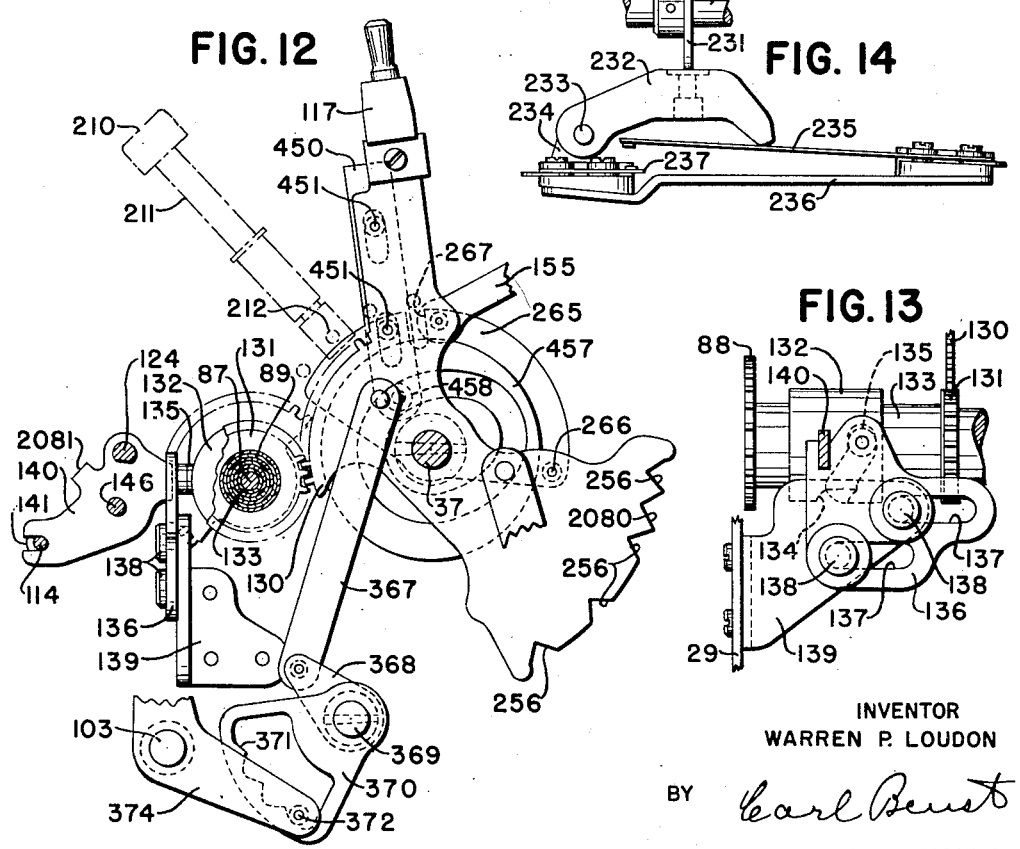
INVENTOR
WARREN P. LOUDON
BY Carl Beust
HIS ATTORNEY Feb. 17, 1953  W. P. LOUDON  2,628,774
RECEIPT PRINTING AND ISSUING MECHANISM
Filed Sept. 16, 1949  22 Sheets-Sheet 6
FIG. 15
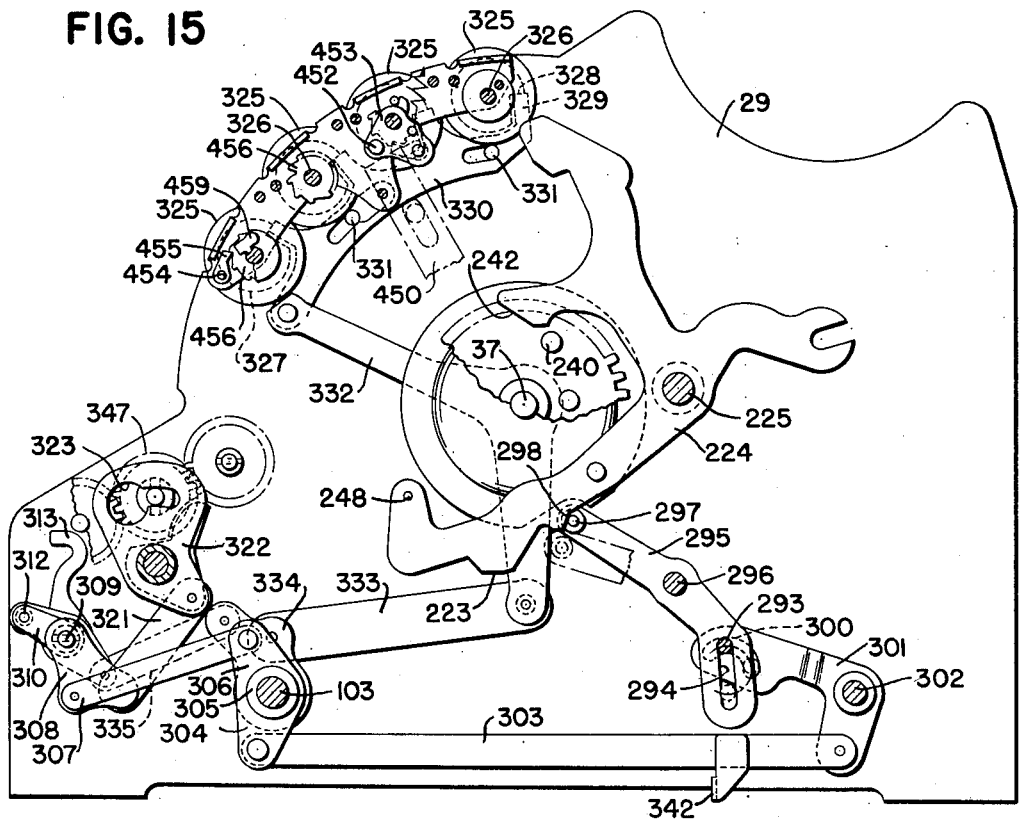
FIG. 16  FIG. 17  FIG. 18  FIG. 19
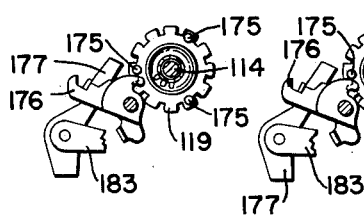 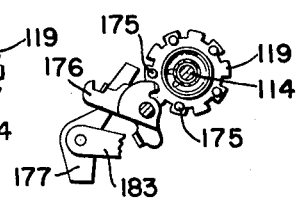 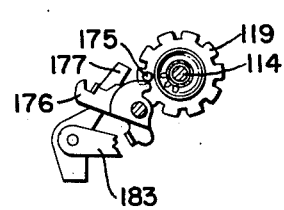
FIG. 20
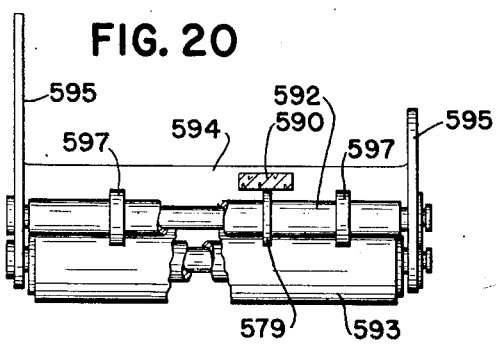
INVENTOR
WARREN P. LOUDON
BY Pearl Benet
HIS ATTORNEY Feb. 17, 1953 W. P. LOUDON 2,628,774
RECEIPT PRINTING AND ISSUING MECHANISM
Filed Sept. 16, 1949 22 Sheets-Sheet 7

INVENTOR
WARREN P. LOUDON
BY *Pearl Bennett*
HIS ATTORNEY

Feb. 17, 1953 W. P. LOUDON 2,628,774
RECEIPT PRINTING AND ISSUING MECHANISM
Filed Sept. 16, 1949 22 Sheets-Sheet 8

INVENTOR
WARREN P. LOUDON
BY Earl Beust
HIS ATTORNEY

Feb. 17, 1953 W. P. LOUDON 2,628,774
RECEIPT PRINTING AND ISSUING MECHANISM
Filed Sept. 16, 1949 22 Sheets-Sheet 9

INVENTOR
WARREN P. LOUDON

BY Earl Benst
HIS ATTORNEY

Feb. 17, 1953 — W. P. LOUDON — 2,628,774
RECEIPT PRINTING AND ISSUING MECHANISM
Filed Sept. 16, 1949 — 22 Sheets-Sheet 10

INVENTOR
WARREN P. LOUDON
BY Carl Beust
HIS ATTORNEY

Feb. 17, 1953 W. P. LOUDON 2,628,774
RECEIPT PRINTING AND ISSUING MECHANISM
Filed Sept. 16, 1949 22 Sheets-Sheet 11
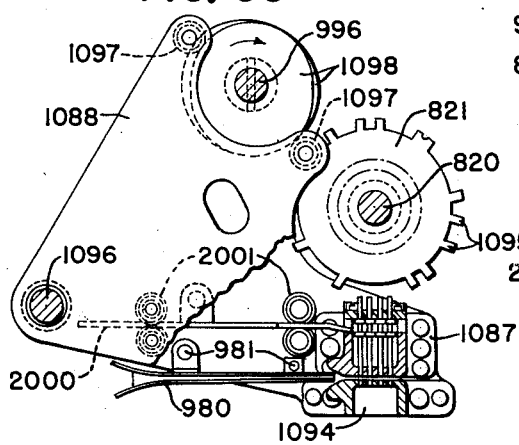
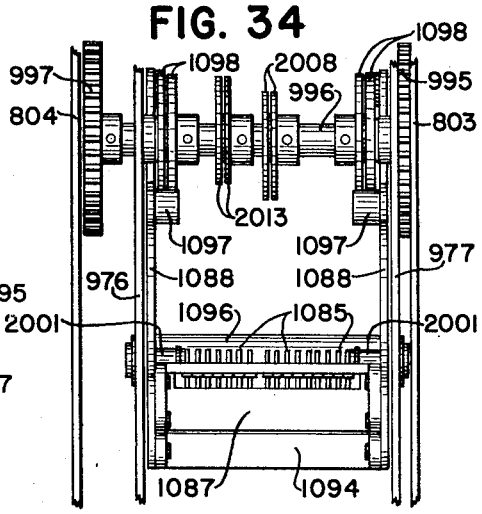
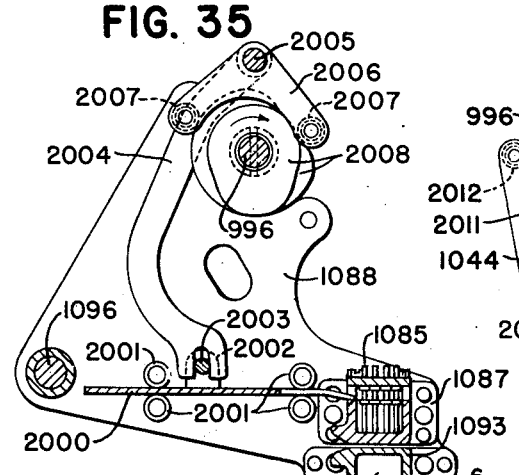
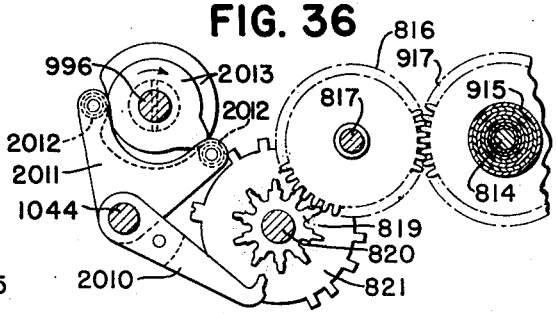
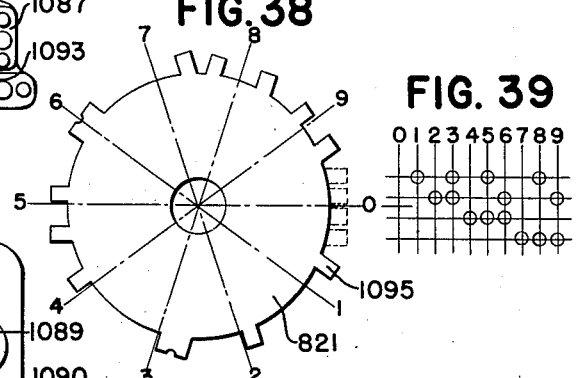
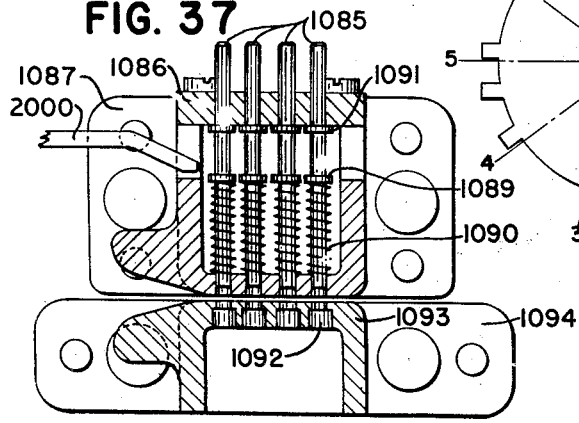
INVENTOR
WARREN P. LOUDON
BY Earl Beust
HIS ATTORNEY Feb. 17, 1953  W. P. LOUDON  2,628,774
RECEIPT PRINTING AND ISSUING MECHANISM
Filed Sept. 16, 1949  22 Sheets-Sheet 12
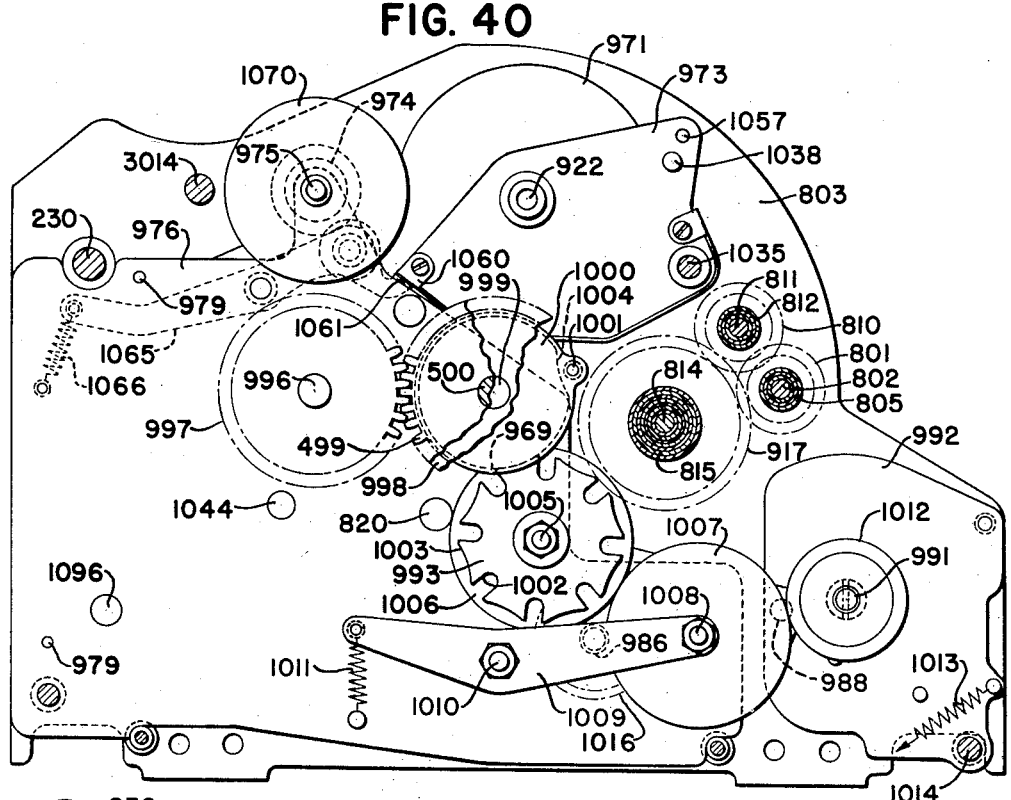
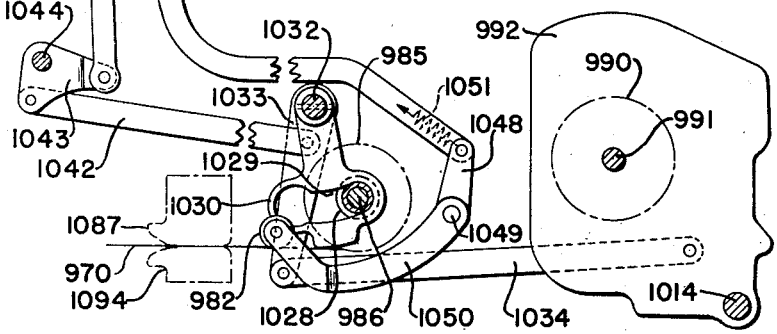
INVENTOR
WARREN P. LOUDON
BY Carl Bunt
HIS ATTORNEY Feb. 17, 1953  W. P. LOUDON  2,628,774
RECEIPT PRINTING AND ISSUING MECHANISM
Filed Sept. 16, 1949  22 Sheets-Sheet 13

INVENTOR
WARREN P. LOUDON
BY Earl Beust
HIS ATTORNEY

Feb. 17, 1953  W. P. LOUDON  2,628,774
RECEIPT PRINTING AND ISSUING MECHANISM
Filed Sept. 16, 1949  22 Sheets-Sheet 14
FIG. 44
FIG. 45
FIG. 46
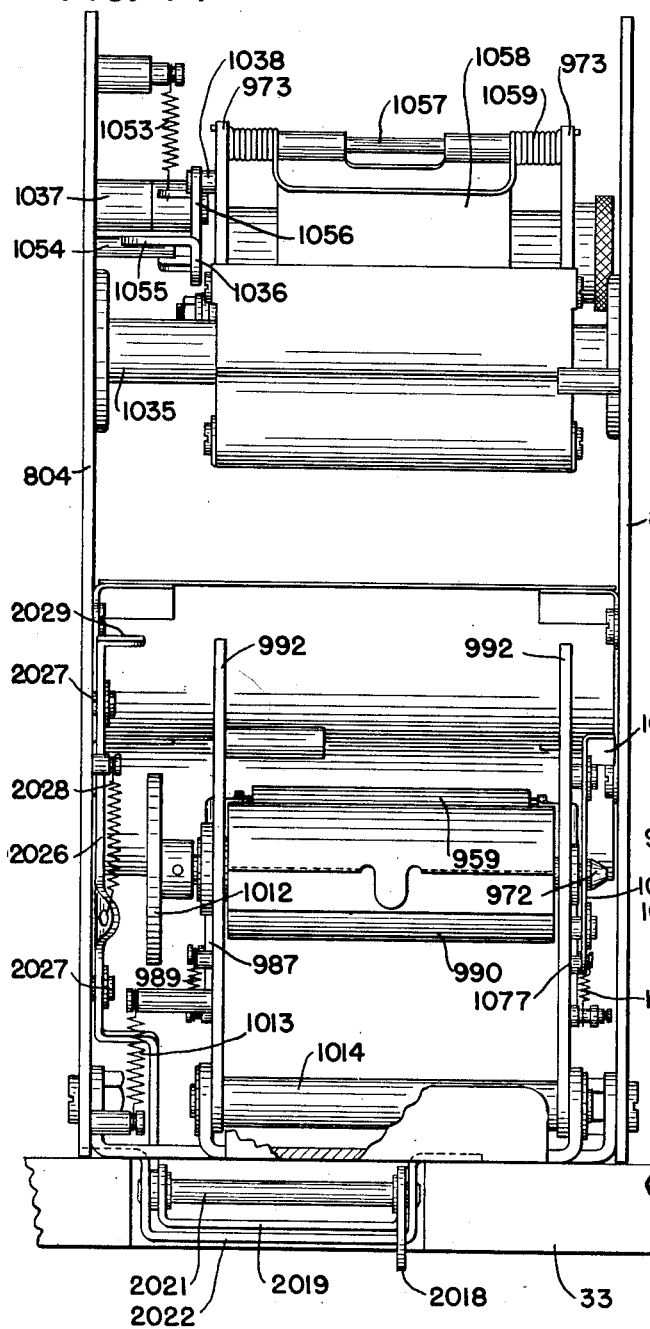
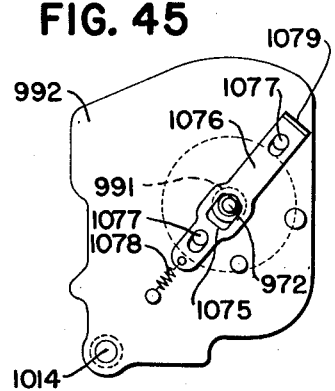
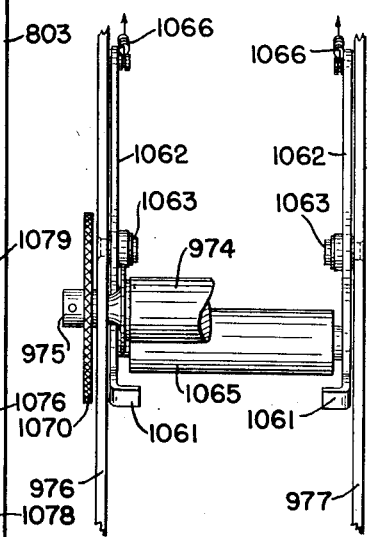
INVENTOR
WARREN P. LOUDON
BY Carl Beust
HIS ATTORNEY Feb. 17, 1953  W. P. LOUDON  2,628,774
RECEIPT PRINTING AND ISSUING MECHANISM
Filed Sept. 16, 1949  22 Sheets-Sheet 16
FIG. 48
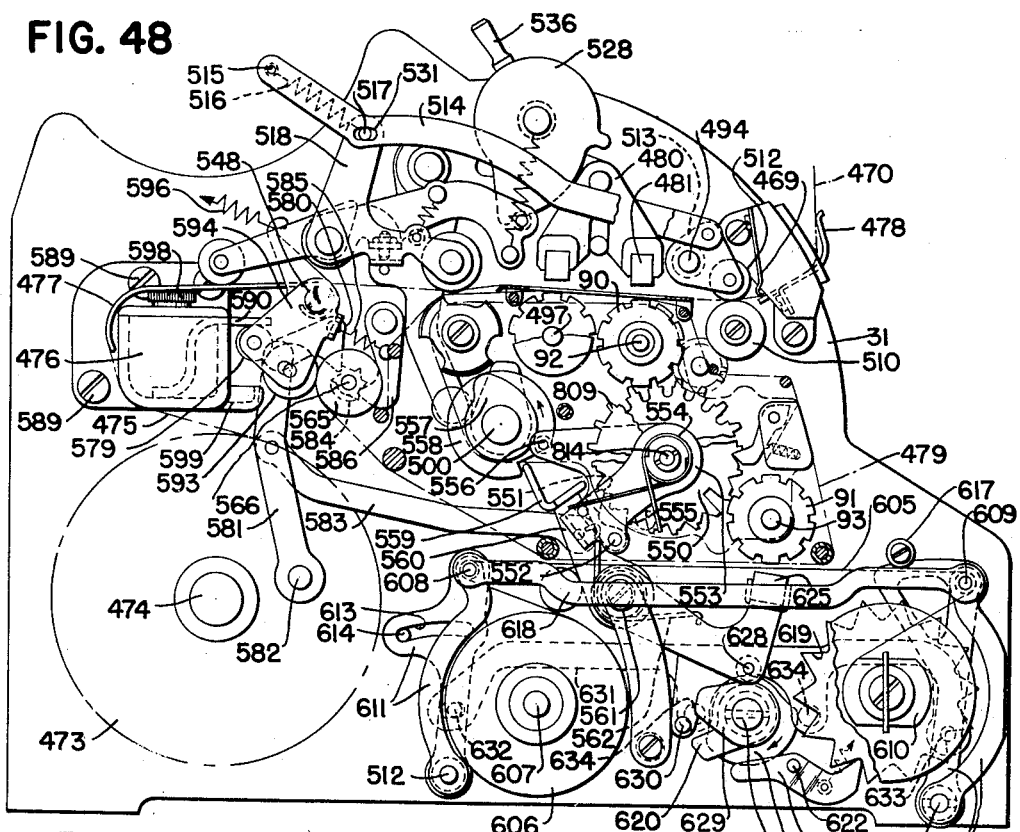
FIG. 49
FIG. 50
FIG. 51
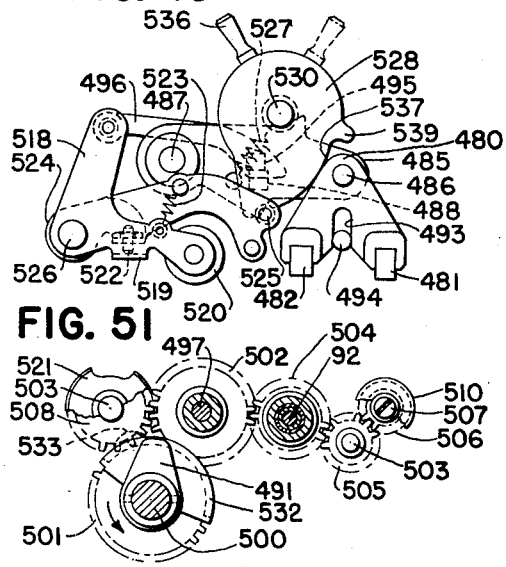
INVENTOR
WARREN P. LOUDON
BY Earl Beust
HIS ATTORNEY

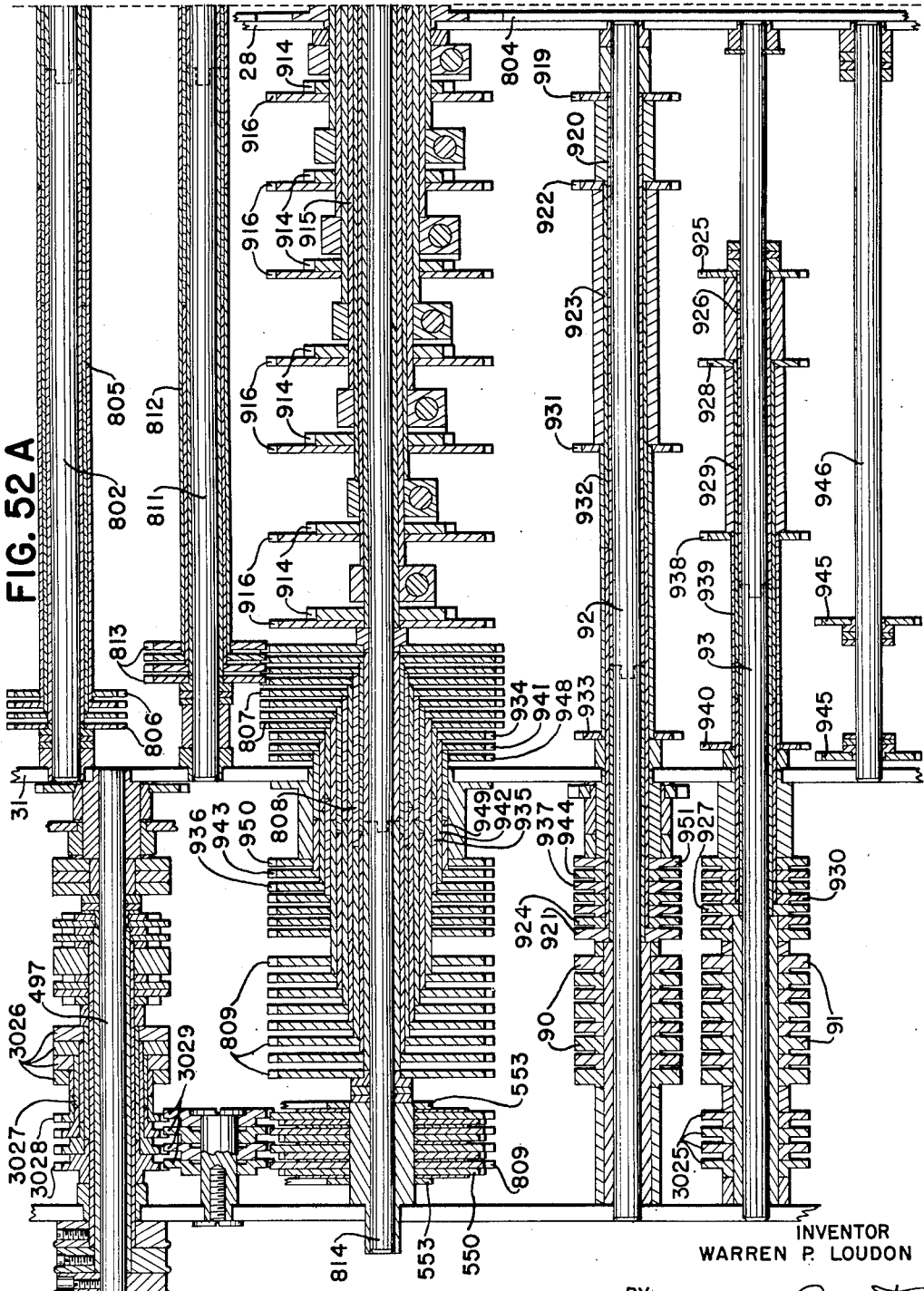

Feb. 17, 1953   W. P. LOUDON   2,628,774
RECEIPT PRINTING AND ISSUING MECHANISM
Filed Sept. 16, 1949   22 Sheets-Sheet 18
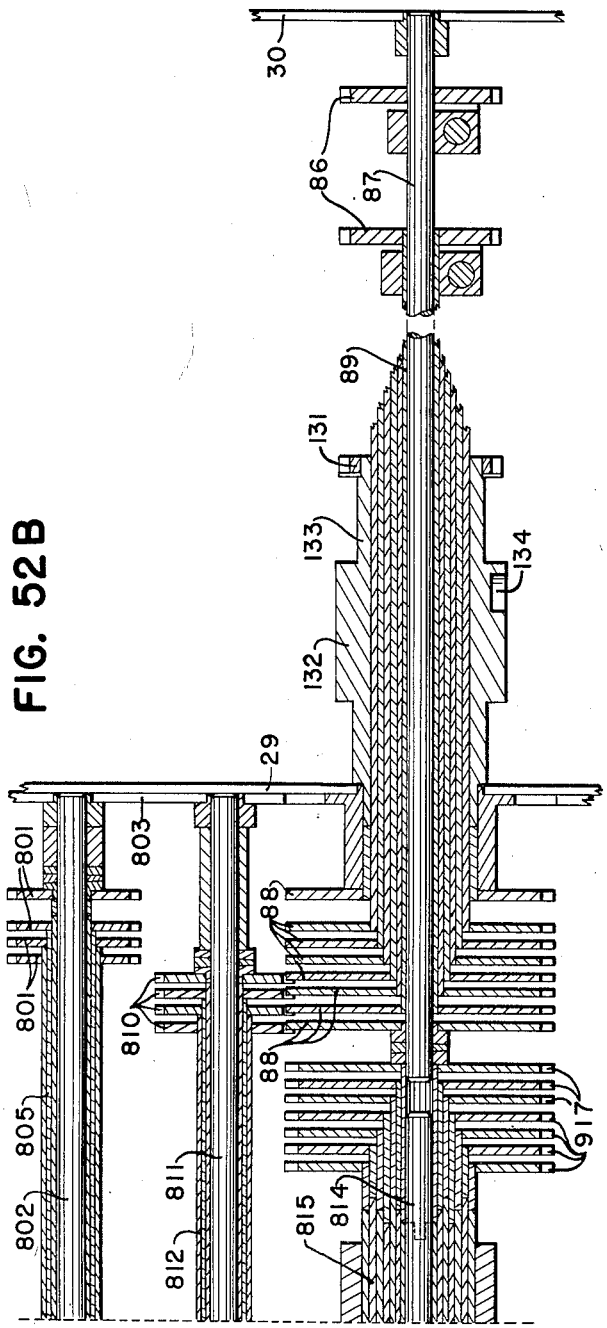
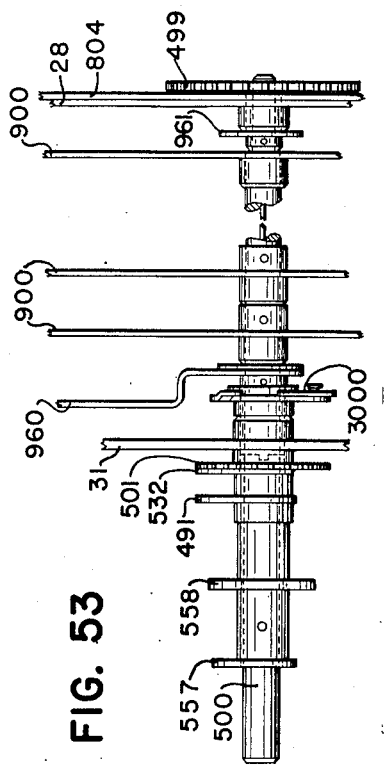
INVENTOR
WARREN P. LOUDON
BY
HIS ATTORNEY

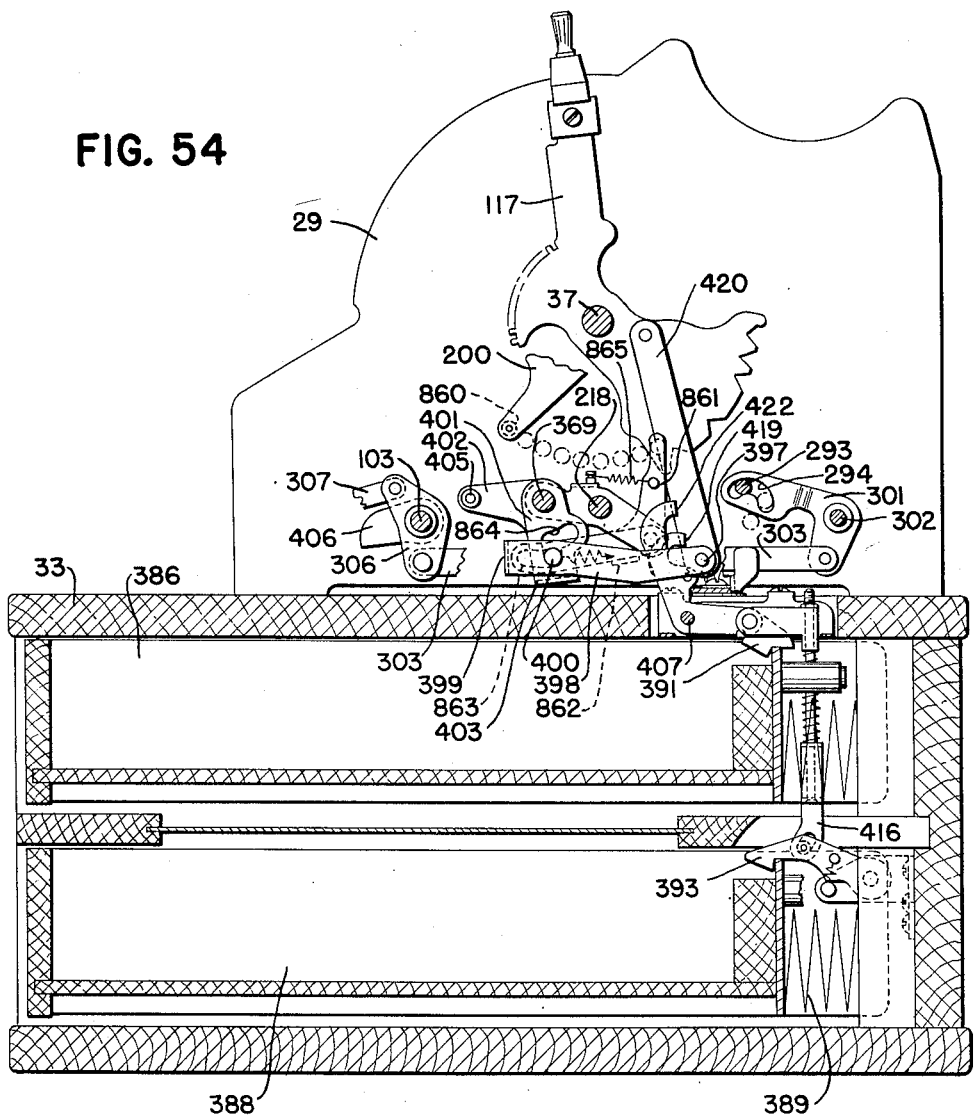

Feb. 17, 1953     W. P. LOUDON     2,628,774
RECEIPT PRINTING AND ISSUING MECHANISM
Filed Sept. 16, 1949     22 Sheets-Sheet 20
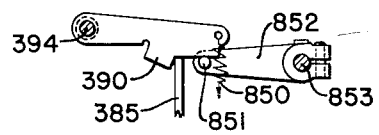
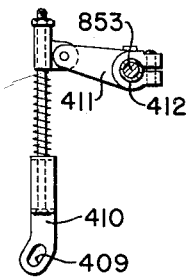
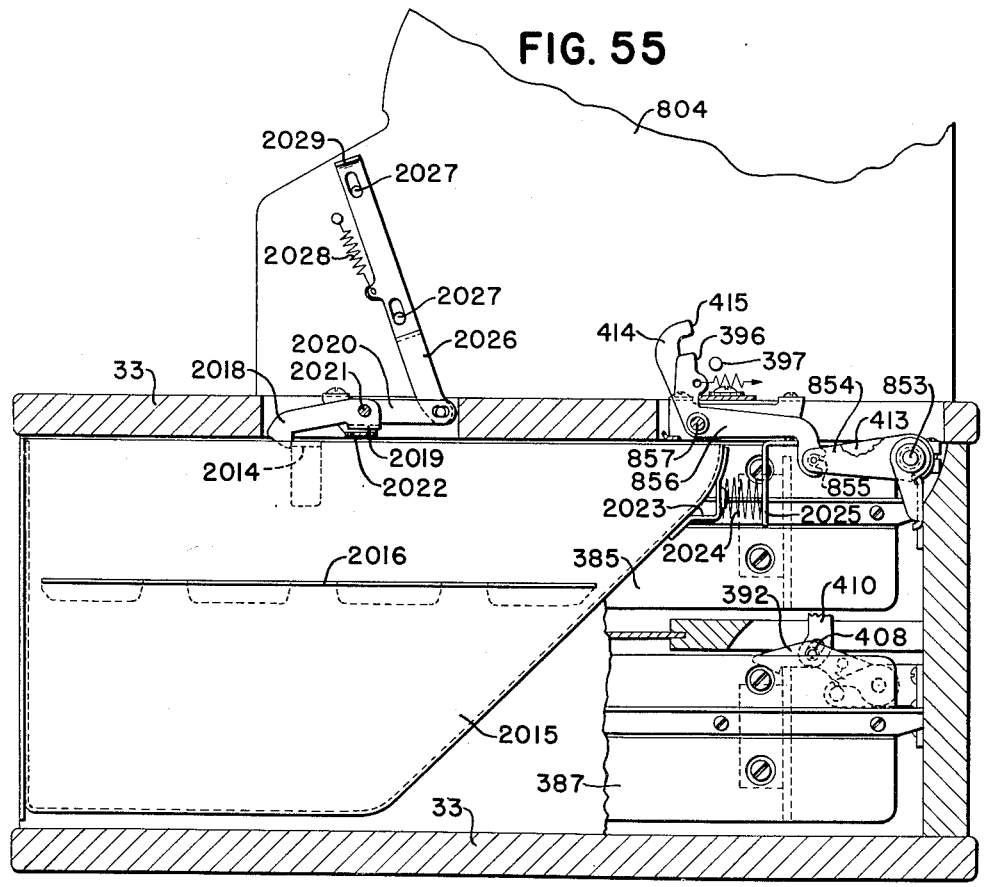
INVENTOR
WARREN P. LOUDON
BY Carl Beust
HIS ATTORNEY

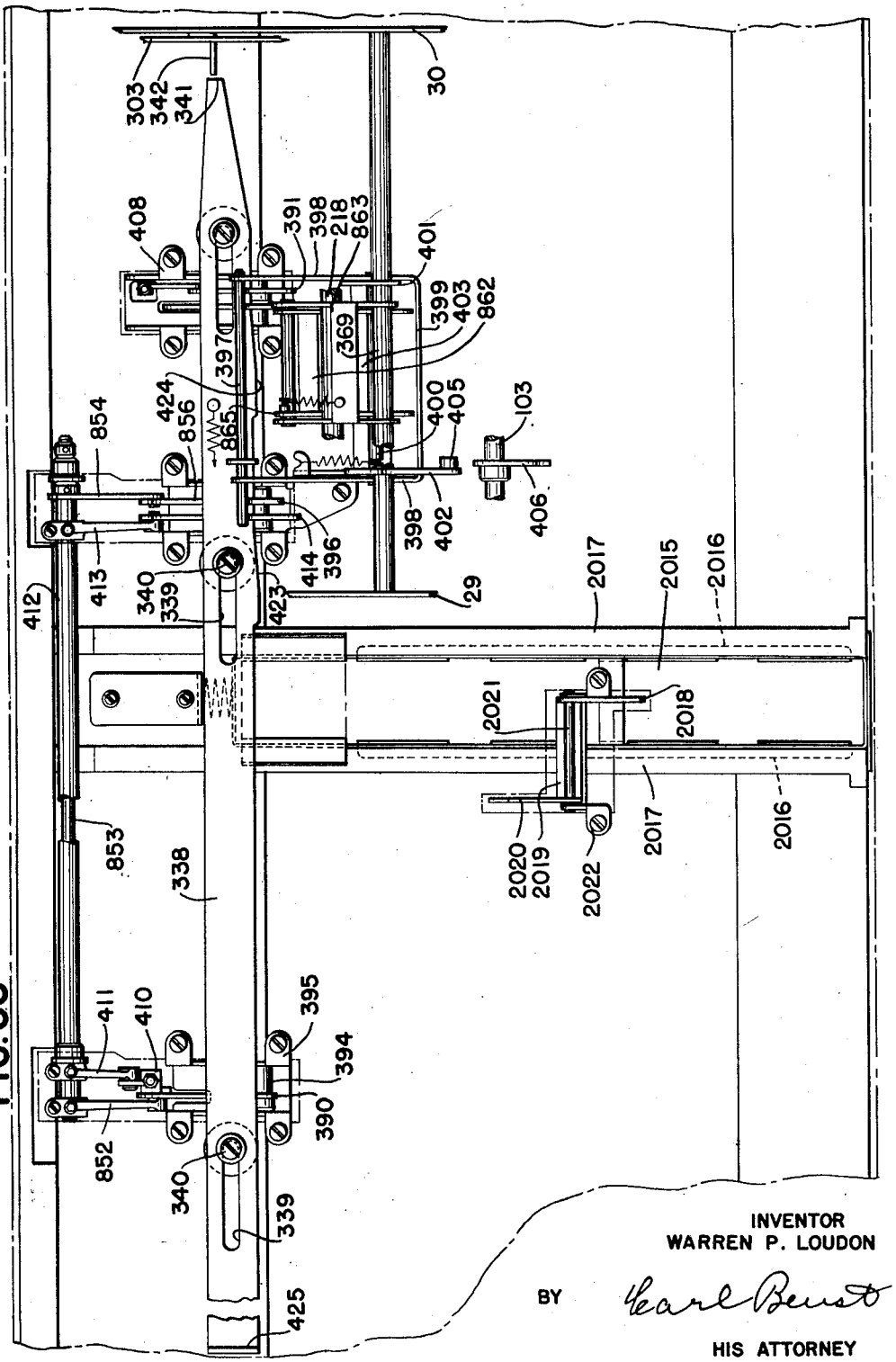

Feb. 17, 1953 W. P. LOUDON 2,628,774
RECEIPT PRINTING AND ISSUING MECHANISM
Filed Sept. 16, 1949 22 Sheets-Sheet 22
FIG. 59
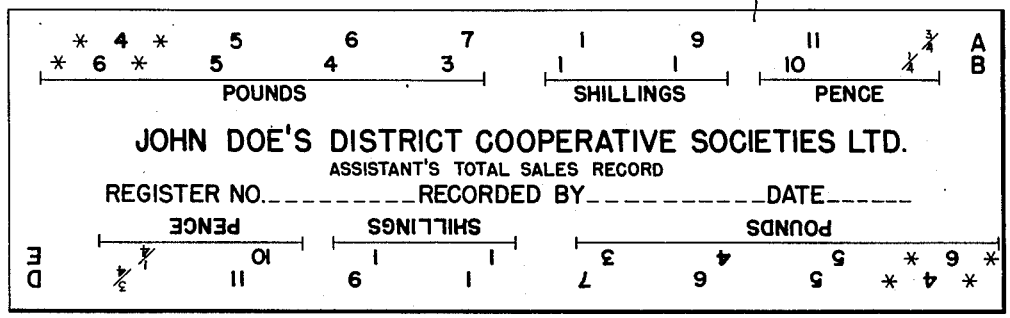
FIG. 60
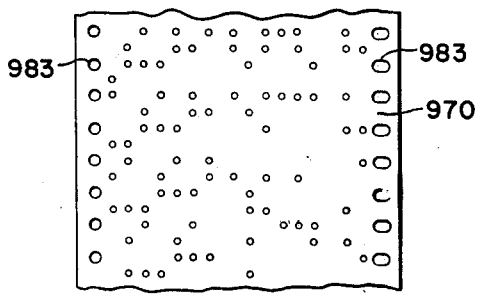
FIG. 61
Your Amount
Membership of your
Number Purchase
▼ ▼
1234567 B⊨43-13-4¾ —472
John Doe's District
Cooperative —470
Societies Ltd.
123 16 MAR 48 0343 —483
Kindly compare your
membership no. & amt.
of your purchase
FIG. 62
INVENTOR
WARREN P. LOUDON
BY *Carl Berist*
HIS ATTORNEY Patented Feb. 17, 1953

2,628,774

UNITED STATES PATENT OFFICE 2,628,774

RECEIPT PRINTING AND ISSUING MECHANISM

Warren P. Loudon, Dayton, Ohio, assignor to The National Cash Register Company, Dayton, Ohio, a corporation of Maryland Application September 16, 1949, Serial No. 116,004

6 Claims. (Cl. 235—3)

This invention relates to improvements in recording and perforating mechanism for accounting machines.

The invention is shown applied to a machine of the type disclosed in United States Patent No. 2,209,763, issued to Ernst Breitling on July 30, 1940, and in the co-pending United States applications of Frank R. Werner, Serial No. 46,165, filed August 25, 1948; Serial No. 58,114, filed November 3, 1948; and Serial No. 102,658, filed July 1, 1949, now Patent No. 2,587,019.

The principal object of the invention is to provide a machine of the type disclosed in the above patent and applications for use by cooperative societies, and, as illustrated herein, the machine is adapted for use in Great Britain, where cooperative societies are well organized and consist of many cooperating stores.

Another object of the invention is to provide a novel means, controlled by the setting of a manipulative device on the keyboard, for disabling the drawer opening mechanism.

Another object of the invention is to provide an interlock to prevent the adjustment of amount setting manipulative devices when a special manipulative device is moved into a certain position.

Another and specific object of the invention is to provide a clutch mechanism for operating a receipt printing and issuing means, which clutch is automatically disabled when a special manipulative device is moved into a certain position.

With these and incidental objects in view, the invention includes certain novel features of construction and combinations of parts, a preferred form or embodiment of which is hereinafter described with reference to the drawings which accompany and form a part of this specification.

Of said drawings:

Fig. 1 is a perspective view showing the keyboard arrangement of the machine.

Fig. 2 is a cross-sectional view taken through an amount bank and illustrates the total printing mechanism.

Fig. 3 is a detail view of the indicator flash mechanism.

Fig. 4 is a top plan view showing the mechanism for printing totals from the clerks' totalizers.

Fig. 5 is a sectional view taken on line 5—5 of Fig. 4.

Fig. 6 is a sectional view, taken on line 6—6 of Fig. 4, showing a part of the total printing mechanism and the opening in the cabinet through which the record material is positioned for taking impressions thereon.

Fig. 7 is a sectional view taken on line 7—7 of Fig. 4 and shows a part of the total printing mechanism and the connection between a totalizer element and a type wheel.

Fig. 8 is a sectional view taken on line 8—8 of Fig. 4 and shows the flash operating mechanism for permitting the insertion of record material into printing position for total printing.

Fig. 11 is a front elevational view of the totalizer supporting frame.

Fig. 12 is a detail view showing the clerk's totalizer selecting mechanism and certain interlock elements associated therewith.

Fig. 13 is a detail view of the totalizer selecting shifting cam.

Fig. 14 is a detail view of the motor starting switch.

Fig. 15 is a side elevational view showing the special counter actuating mechanism, together with certain interlocking mechanism actuated by the machine lock.

Fig. 16 is a detail view showing the fractions of pence totalizer wheel and the tens transfer mechanism actuated thereby.

Fig. 17 is a detail view showing the units of pence totalizer wheel and the transfer mechanism actuated thereby.

Fig. 18 is a detail view of a tens of shilling totalizer wheel and the transfer elements actuated thereby.

Fig. 19 is a detail view of a units of shillings totalizer wheel and the tens transfer mechanism actuated thereby.

Fig. 20 is a detail view of a part of the ribbon reinking mechanism.

Fig. 33 is a detail view showing the mechanism for operating the perforating punches.

Fig. 34 is the end elevation of the mechanism shown in Fig. 33.

Fig. 35 is a detail view showing the mechanism for positively releasing the punches of the perforating mechanism in the event the punches should stick.

Fig. 36 is a detail view of a part of the driving connections for the punch operating disk, together with an aligning mechanism therefor.

Fig. 37 is an enlarged detail view showing the punch construction.

Fig. 38 is a detail view of the punch control disk, showing the code arrangement thereon.

Fig. 39 is a detail view of the code used in the punching system in the present machine.

Fig. 40 is a side elevational view of the perforating section of the machine.

Fig. 41 is a detail view showing the interlocks which are effective to lock the machine against release when a new supply of paper is being positioned in the machine and in the event the paper becomes broken or its supply becomes exhausted.

Fig. 44 is a front elevational view showing the location of the supply and receiving roll receptacles.

Fig. 45 is a detail view of the latch for latching the paper receiving spool of the perforating mechanism in position.

Fig. 46 is a detail end elevation showing the mechanism for hand-spacing the record material to be perforated.

Fig. 48 is a left-hand side elevation of the machine and shows the printing section.

Fig. 49 is a detail view of the receipt printing throw-off mechanism.

Fig. 50 is a detail view showing certain parts of the mechanism of Fig. 49 in position for rendering the receipt printing hammer ineffective.

Fig. 51 is a detail view of the driving mechanism for the receipt feeding mechanism.

Figure 9:
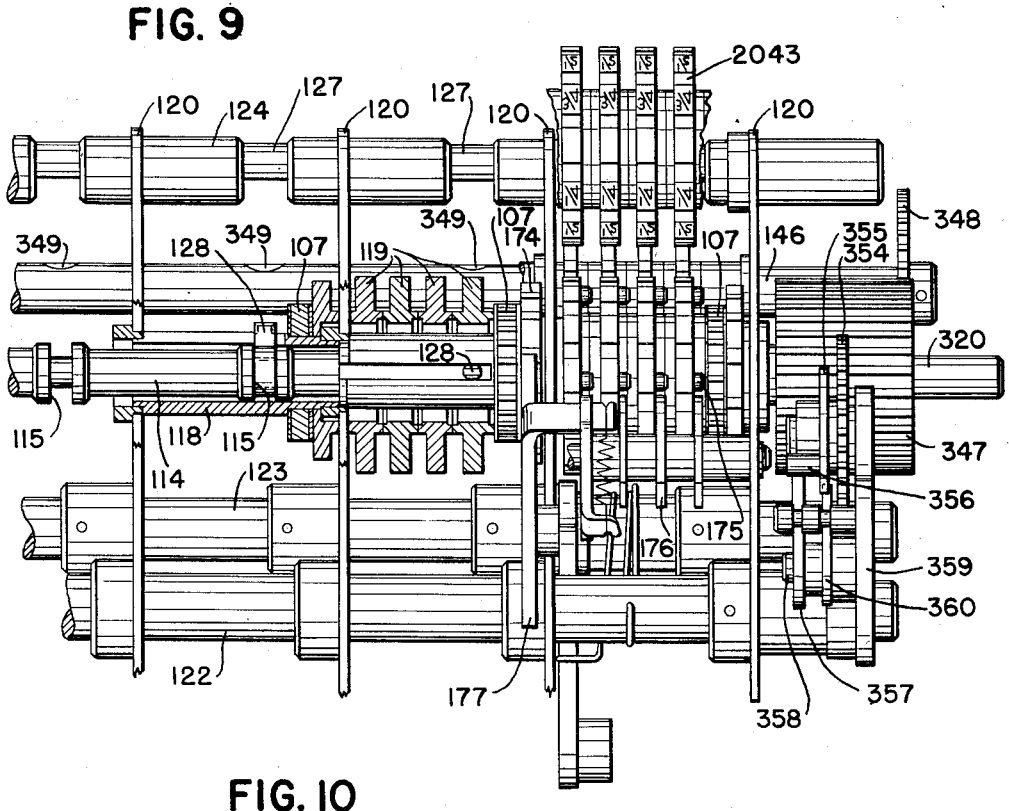
Fig. 9 is a top plan view of the totalizer selecting and actuating mechanism, shown with certain parts broken away for clearness.

Figs. 52A and 52B, taken together, constitute a sectional view, in spread-out relationship, showing the connections between the amount setting levers and the account number levers for setting up the perforating control plates and the type wheels.

Fig. 53 is a front elevation showing some of the cams on the audit strip cam shaft and certain of the frames for supporting the same.

Fig. 54 is a detail view of the cash drawer selecting mechanism.

Fig. 55 is a sectional view showing the receptacle for the confetti punched from the perforated strip, and a part of the cash drawers in the left-hand tier.

Fig. 56 is a detail view of a part of the cash drawer releasing mechanism.

Fig. 57 is a detail view of a part of the cash drawer releasing mechanism.

Fig. 58 is a top plan view showing the drawer releasing mechanism, and shows both the automatic release and a manual release for the cash drawers.

Fig. 59 is a facsimile illustrating the insertable record strip on which the totals are printed from the type wheels set by the totalizer elements.

Fig. 60 is a facsimile of a part of the audit strip.

Fig. 61 is a facsimile of a receipt issued by the machine.

Fig. 62 is a facsimile of a part of the perforated record produced by the machine.

GENERAL DESCRIPTION

The machine embodying the present invention is provided with a printer section near the left-hand end and an account number section comprising a plurality of setting levers, there being seven such levers illustrated in the present machine. Next to the account number levers, to the right thereof, is a section in which the perforating mechanism for perforating an audit strip is provided. The right-hand half of the machine comprises a set of amount setting levers, a transaction lever, and a clerk's lever, together with four machine release keys.

Each setting lever—that is, the amount levers, the account number levers, the transaction lever, and the clerk's lever—is connected to a corresponding rotary type of indicator, and each lever is geared to a type wheel for printing upon an issuing strip and to a corresponding type wheel for printing data upon a detail strip. The levers are also connected to a corresponding perforator control disk for selecting punches for perforating data on a perforated strip. The positioning of the levers positions the corresponding indicators and type wheels, together with the perforator selecting disk. Each amount lever controls a related actuator, which actuates the corresponding wheel of a selected totalizer on the totalizer line. A plurality of interspersed totalizers are provided, which are selected for actuation by a clerk's lever. Positioning of the amount levers positions their actuators in proportion thereto, and, upon operation of the machine, the actuators are engaged with the selected totalizer wheels, after which said actuators are returned from set position to zero position and, in being so returned, rotate the wheels of the selected totalizer to enter therein the amount set upon the levers. After the actuators have been returned to zero, they are disengaged from the totalizer wheels and during the latter part of the machine operation are returned to zero positions.

Mechanism rendered effective upon engagement of the actuators with the totalizer, in cooperation with the amount lever retaining means, locks the levers and connected mechanism in set positions while the actuators are engaged with the totalizer. The totalizer of the instant machine has a well-known type of carrying mechanism for transferring amounts from lower to higher denominations, and the carrying mechanism is adapted to the British monetary system.

The present machine is provided with an indicator for indicating when an amount is or is not registered. The settable levers remain in their set positions after termination of machine operation and may be removed from their old position directly to a new position. Moving any one of the amount levers from one position to another releases a latch mechanism that frees a registration indicator to the actuation of a spring, which immediately shifts said indicator from a "Register" position to a "Non-register" position, which indicates that the amount being set up has not yet been registered. Upon operation of the machine, mechanism becomes effective to return the registration indicator from the "Non-register" position to the "Register" position, whereupon the latch mechanism becomes effective to retain said indicator in "Register" position.

Near the end of machine operation, mechanism becomes effective to release a latch mechanism which normally retains the cash drawers in closed position, thus freeing a selected cash drawer to the action of a spring which immediately opens said selected cash drawer.

The machine as illustrated herein is provided with four interspersed totalizers, one for each of four clerks. A clerk's lever is settable to select one of the interspersed totalizers for receiving entries. Adjacent the totalizer selecting lever is a bank of keys, one assigned to each clerk. The keys are of the removable type, so that the clerk may carry the key on his person. The clerk may insert his key into the lock provided therefor, and, upon depression of the key after it is inserted into the lock, the machine is released for operation.

A settable lever is also provided to control the entry of amounts into the selected totalizers so that only the "Cash" and "Received-on-account" items are entered. When the lever is positioned in the "Charge" position or a "Paid-out" position, a device is set to prevent the amount actuators from receiving the differential movement under control of the amount setting levers. A settable lever is also provided to set up data on the type wheels and on the perforating control plates for identifying the type of operation being performed. In certain business systems, particularly in cooperative stores, as operated in Great Britain, in which members of a cooperative association are entitled to receive rebates, a record is kept of their particular accounts. If a customer who is a non-member of the association makes a purchase, it is then desirable to print a code on the perforated strip indicating such, so that the data will not be added into an account. In order to control such auditing, a special code is perforated on the perforated strip before the entry of the sale to a non-member is entered into the machine. Setting of the transaction lever to its ninth position controls certain interlocks in the machine, which prevents the adjustment of the amount levers and also prevents operation of a receipt printing and issuing mechanism. Thereafter, upon operation of the machine with the amount levers all set at zero, a code is perforated on the perforated strip adjacent the non-member's account number, which account number may represent an account number of another association, and therefore, when the perforated strip is later analyzed, the special code perforated on the strip controls the analyzing machine to skip the entry of the amount which is entered on the perforated strip immediately following the operation in which the code is printed. After the code is printed, the amount of the purchase is set up on the amount levers and the normal operation of the machine is made, whereupon the data is perforated on the strip.

A special counter is provided adjacent the clerk's key, and the special counter corresponding to the depressed clerk's key is operated to count one unit, so that the number of operations of the machine with respect to the clerk's key depressed are counted. At the end of a given time, the manager can check to determine how many transactions each clerk handles during the business period.

Conveniently located on the right-hand side of the machine cabinet is a cashier's lock, which controls the operations of the machine, such as locking the machine against operation, printing of totals from the totalizers, opening of the cash drawers without a machine operation, and locking the machine against release. The possessor of the key to the cashier's lock may position the lock to any one of three position. When the lock is in its intermediate position, the machine may be operated for entering amounts into the totalizer and for issuing a receipt, printing on the audit tape, and perforating the record strip. When the lock is in its extreme counter-clockwise position, the machine is locked against operation. When the lock is in its extreme clockwise position, the printing hammer for printing on an insertable strip is released for operation, whereupon a totalizer can be selected for recording data on the insertable slip; or, when the modified form of printing mechanism is used, the impressions are made from all of the totalizers simultaneously.

When the lock is in the extreme clockwise position, the totalizer can also be reset to zero.

The machine embodying the instant invention has three lines of type wheels in the printer section of the machine, two of which are used to print records on an issuing receipt, and the other for making records on an audit tape, which is retained in the machine and which may be removed at the end of any business period.

Two of the type wheel lines have an amount type wheel for each amount lever, a type wheel for the transaction lever, and a type wheel for the clerk's lever. These type lines are also provided with a type wheel for each of the account number levers, so that the account number may be printed on the issuing receipt and also on the audit tape. Each of the above type wheels is connected to its respective lever to be positioned thereby.

In addition to the type wheels above mentioned, the type wheel line for printing on the audit tape is provided with a plurality of consecutive number type wheels which are automatically advanced one step each machine operation. The consecutive number wheels and the wheels of the totalizer may be reset to zero at will by any authorized person having possession of a reset wrench for this purpose.

Each clerk is provided with a cash drawer, which is automatically opened at the end of each entry operation. The possessor of the cashier's key may open all the cash drawers without operating the machine when the cashier's lock is in its clockwise position.

An electroprinting device is provided for printing various data of a descriptive or advertising nature on the face of the issuing strip. The type wheels are inked by an endless ribbon supported by a removable frame which may be easily and quickly removed from the frame when it is desired to change or adjust the inking ribbon. An ink well is provided to constantly ink the ribbon. The electroprinting and receipt feeding mechanism may be disabled when desired by means of a manipulative device which projects through the cabinet of the machine near its left side. In addition to the manipulative device, the printing and issuing of the receipt are controlled by a transaction lever, so that, when the transaction lever is moved to its ninth position, the receipt printing mechanism is automatically thrown off.

DETAILED DESCRIPTION

Framework

The machine is built in three sections and is thereafter assembled into a complete machine. The mechanism of the right-hand section of the machine, which includes the amount, transaction, and clerks' manipulative devices, is supported by a pair of frames 29 and 30 (Figs. 2, 4, 7, 15, 21, 22, 25, 52B, and 54). The center section of the machine, which includes the perforator mechanism, is supported by a pair of frames 803 and 804 (Figs. 29, 34, 40, 42, 44, 47, 52A, 53, and 55). The mechanism of the left-hand section of the machine, which includes the account number manipulative devices and the printing mechanism, is supported by a pair of frames 28 and 31 (Figs. 26, 47, 48, and 52A). Each pair of frames is connected by various cross rods, shafts, and base plates 32 to form the three sections, which are mounted side by side on a drawer cabinet top 33, to form a unitary machine. Suitable means are provided to connect such mechanisms as extend into one of the three sections from another section. The mechanisms of the three sections of the machine are enclosed in a single cabinet 34, secured to the various frames by any suitable means.

Operating mechanism

The main shaft 37 (Figs. 2, 15, 21, 22, 23, and 24) of the right-hand section is journaled in the frames 29 and 30 and may be operated by means of a hand crank (not shown) geared to said shaft through an idler gear 40 (Fig. 21), which is carried by a stud 173 in the right frame 30 and which meshes with a gear 241 on the main shaft 37. A stop device, described hereinafter, arrests the machine when it arrives in its home position after completing a complete operation, and, before the shaft 37 can be rotated again, it is necessary to release the machine in a manner described hereinafter.

If desired, an electric motor 41 (Fig. 22) may be provided to operate the machine, in addition to the hand crank. The armature 42 of the motor is provided with a worm gear 43, made of insulating material and meshing with a worm gear 44 on a shaft 45 mounted in bearings in the motor frame. The shaft 45 is connected to a shaft 63 by an insulating coupling, and the shaft 63 carries a spur gear 46 in mesh with a crown gear 47 (see also Fig. 23). The shaft 63 is rotatably mounted in bearings 48 and 49 carried by a bracket 50 supported in the left side frame 29 by screws 51.

The crown gear 47 (Fig. 23) is secured to a ratchet wheel 52, and the assembly including the gear 47 and the ratchet wheel 52 is rotatably mounted on a stud 60, carried in the frame 29. Also mounted on the stud 60 is a disk 53, carrying a clutch pawl 54 pivotally mounted on a stud 55. A spring 56, connected to one end of the clutch pawl 54 and to a stud carried by the disk 53, normally tends to move the clutch pawl 54 into engagement with the ratchet wheel 52. When the machine is at rest, a stop arm 57, described later, lies in the path of an upstanding arm 58 of the clutch pawl 54, and the arm 58 is engaged by a stud 59 on the disk 53 to thereby provide a positive stop for the disk 53.

When the machine is released for operation, in a manner described hereinafter, the stop arm 57 is raised out of engagement with the arm 58, thus permitting the spring 56 to move the clutch pawl 54 into engagement with the ratchet wheel 52, which at this time is being rotated by the motor 41. When the clutch pawl 54 drops behind a tooth of the ratchet wheel 52, the ratchet wheel carries the pawl, together with the disk 53, counter-clockwise. As the upstanding arm 58 again approaches home position, the arm 57 is again lowered, in a manner described hereinafter, into the path of the upstanding arm 58, thus forcing the upstanding arm 58 against the stud 59, thereby arresting the disk 53 after the main shaft 37 has completed one complete clockwise rotation. Also secured to the disk 53 is a gear 61, meshing with a gear 62 secured to the main shaft 37. Therefore, when the disk 53 is arrested, the gears 61 and 62 and the main shaft 37 are arrested after the main shaft makes one complete rotation. The ratio between the gears 61 and 62 is 1 to 1. In other words, one complete rotation of the gear 61 causes one complete rotation of the gear 62 and the main shaft 37.

Amount differential mechanism

Loose on the main shaft 37 (Figs. 2 and 25) is an amount lever 70 for each denominational order, an upward extension of which terminates in a finger piece 71, which protrudes through a corresponding arcuate opening in the cabinet 34. Each of the levers 70 has a plurality of V-shaped notches 72 cut in a segmental portion thereof. Said notches correspond to the different positions of the levers and are adapted to cooperate with respective rollers 73, each of which is mounted upon a corresponding lever 74, loose on a shaft 75 supported by the frames 29 and 30. A spring 76, connected to each lever 74, urges the levers 74 clockwise to maintain the rollers 73 in engagement with the notches 72, thereby providing a means for locating and retaining the amount levers 70 in set positions. Each of the setting levers 70 is connected by a link 77 to a corresponding gear sector 78, loose on the shaft 75 and having teeth which mesh with the teeth of a corresponding gear 79, integral with a front indicator 80, supported by a shaft 81, journaled in the frames 29 and 30. The lowest order front indicator 80 is pinned to the shaft 81, as is also the lowest order rear indicator (not shown), while the higher order front indicators are connected by nested tubes to their corresponding higher order rear indicators, said nested tubes being rotatably supported upon the shaft 81.

Each of the settable levers 70 has a segmental portion of gear teeth 85, which mesh with a corresponding drive gear 86. The lowest order drive gear 86 is secured on a shaft 87 (see also Fig. 52B), journaled in the frame 30 at its right-hand end (Fig. 52B) and in a bearing carried by the intermediate frame 29, in which a bearing for a series of tubes 89 is mounted, and the shaft 87 is mounted within the innermost sleeve. Each sleeve carries a drive gear 86 for meshing with gear teeth 85 of corresponding higher order levers 70. The shaft 87 and each tube 89 have a corresponding type wheel drive gear 88 secured thereto.

The four highest order drive gears 88 mesh with gears 801 (see also Fig. 29), the lowest order of which is secured to a shaft 802 journaled in bearings in the frames 31, 803, and 804 (Figs. 52A and 52B). The three next higher order gears 801 are secured to the ends of a series of tubes 805, carried by the shaft 802. The left ends of the shaft 802 and of each of the tubes 805 have a gear 806 secured thereon (see Fig. 52A). The gears 806 mesh with gears 807 on the ends of tubes 808, extending into the printer section at the left side of the machine. The tubes 808 have secured thereto type wheel drive gears 809. The tubes 808 are journaled in a bearing carried by the frame 31.

The drive gears 88 for the lowest order amount levers mesh with gears 810, one secured to a shaft 811 and the other secured to the innermost tube of a series of tubes 812 on a shaft 811, and the latter is journaled in the frames 31 and 803. Gears 813, secured to the left end of the shaft 811 and the sleeve 812, mesh with gears 807 on the series of tubes 808, having secured thereto type wheel drive gears 809. The type wheel drive gears 809 mesh with corresponding amount type wheels 90 of the upper or receipt type wheel line and with the corresponding amount type wheels 90 of the upper or receipt type wheel line and with the corresponding rotatably mounted on a shaft 92, carried by the frames 31 and 28, and the detail type wheels 91 are rotatably mounted on a shaft 93, also carried by the frames 31 and 28.

The drive gears 88 are located in the center or perforator section of the machine, and they mesh with gears 816 (Fig. 29) rotatable on a shaft 817 carried by a pair of frames 976 and 977, which are a part of a removable unit later described. The gears 816 mesh with pinions 819 on a stud 820 carried in frames 976 and 977. The pinions 819 are secured to corresponding perforator selector disks 821.

It is therefore obvious from the foregoing description that the positioning of the amount lever 70 also positions the corresponding front and back indicators 80, the corresponding type wheels 90 and 91, and the corresponding perforator selector disks 821 in proportion to the position of said levers.

Each of the amount levers 70 (Fig. 2) carries a stud 96, which cooperates with a corresponding arm 97 loose on the shaft 37, which arm 97 is connected by a link 98 to an arm of a segmental gear 99, loose on a rod 100, supported by a plurality of plates 101, loose on a shaft 103, journaled in the frames 29 and 30. The plates 101 are held in rigid relation to each other by the rod 100, and the entire assembly forms a rockable frame adapted to rock the teeth of the segments 99 into engagement with teeth of corresponding totalizer drive gears 105, loose on a shaft 106 supported by the frames 29 and 30. The gears 105 mesh with pinions 107 (Fig. 9), each pinion being secured to a sleeve rotatably supported in bearings in totalizer plates 120. Totalizer wheels 119 are selectively coupled to the sleeve by means described hereinafter. A spring 104 (Fig. 2), tensioned between each of the segments 99 and the arms 97, urges said segments and the arms 97 counterclockwise, as viewed in Fig. 2, to maintain said arms 97 in constant contact with the studs 96. It is therefore evident that, when the amount levers 70 are positioned, the spring 104 causes the arm 97 to follow the stud 96, thereby positioning the corresponding segments 99 to positions commensurate with the setting of the amount lever 70.

Each plate 101 (Fig. 2) carries rollers 108 and 109, adapted to cooperate with their respective companion plate cams 110 and 111, fast on the main shaft 37. As previously explained, rotation of the main shaft 37 one clockwise rotation by means of the crank 38, or by the motor 41, completes an operation of the machine. Initial movement of the shaft 37 causes the cams 110 and 111, in cooperation with the rollers 108 and 109, to rock the framework composed of the plates 101 counterclockwise to engage the teeth of the segments 99 with their corresponding totalizer gears 105. After the segments 99 have been engaged with the gears 105, continued movement of the main shaft 37 causes a cam 112 for each denominational order, secured on said main shaft 37, to engage corresponding rollers 113, mounted on the links 98, and return the segments 99 from set position clockwise to zero or normal position. This rotates the totalizer pinions 107 proportionate to the amount set up on the amount levers 70 to enter said amount in the selected totalizer wheels. A dwelling portion on the peripheries of the cams 112 causes the segment 99 to remain in zero position until further rotation of the shaft 37 causes the cams 110 and 111 to rock the segment frame clockwise to disengage the segments 99 from the totalizer gears 105, whereupon the declining surfaces on the cams 112 permit the springs 104 to return the segments 99, their associated links 98, and the arms 97 counterclockwise to their set positions, which positions are determined by the arms 97 contacting the studs 96.

*Interspersed totalizers*

As disclosed herein, the machine is provided with four interspersed totalizers. The differential movement of the segment 99 is transmitted to a selected one of the interspersed totalizers, which selection is under control of a clerk's lever 117 (Fig. 12) in the manner described hereinafter.

Figure 10:
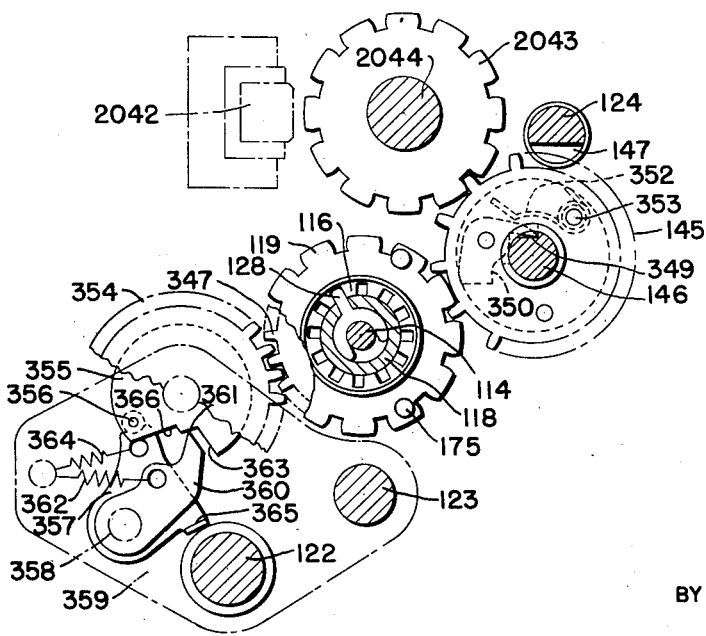
Fig. 10 is a side elevational sectional view taken through the totalizer and shows certain parts broken away for clearness.

The totalizer pinion 107 (Fig. 9) for each totalizer lever 70 is mounted on a sleeve 118, which supports the four totalizer wheels 119 for each denomination of the interspersed totalizers. The totalizer wheels 119 are loosely rotatable on the sleeve 118 and may be selectively coupled to the sleeve 118 by a coupling member 128 (Figs. 9 and 10). A coupling member 128 is provided for each denominational order of totalizer wheels and is supported on a shaft 114 provided with an annular groove 115 for each denominational order, and the coupling member 128 is mounted on the shaft within the annular groove 115. The shaft 114 is shifted endwise by the clerk's setting lever 117 (Fig. 12), so as to shift the coupling member to select a totalizer wheel 119. The totalizer wheels are provided with internal teeth 116, and the coupling member 128 is moved into engagement with the internal teeth by the shifting movement of the shaft 114, to thereby couple a selected one of the sets of totalizer wheels 119 with the totalizer pinion 107.

As mentioned above, the present disclosure illustrates four interspersed totalizers, and therefore there are four totalizer wheels 119 associated with each setting lever 70. A coupling member 128 is provided for each denominational order lever 70, and the shaft 114, when shifted, moves the coupling members 128 adjacent the corresponding totalizer wheels 119 for each denominational order. As illustrated in Fig. 9, the coupling member 128 is in engagement with the internal teeth 116 of the right-hand totalizer wheels 119 for each denominational order.

When the coupling member 128 is shifted to select the proper totalizer and the machine is operated with the amount levers adjusted in the manner described hereinbefore, then, during the machine operation when the pinion 107 receives a differential movement commensurate with the value of the setting of the amount lever 70, the pinion 107, through the sleeve 118 and the coupling member 128, rotates the corresponding totalizer wheel 119 an extent commensurate with the value set up by the amount lever 70.

Each pinion 107 and sleeve 118 is mounted for independent rotation between the plates 120 (Figs. 2, 9, and 11). The plates 120 are supported by the frames 29 and 30 through the medium of three shafts 121, 122, and 123. For convenience in assembling the shafts 122 and 123, they are supported in bearings 125 (Fig. 11) in the right frame 30 and by slidable collars 126, which are turned to form a tenon at their left ends to fit in bearings in the left frame 29. Clips 127 maintain the collars 126 in position after the shafts are assembled in the machine.

*Totalizer selecting means*

As before mentioned, the shaft 114 (see also Fig. 12) is shifted endwise to adjust the coupling member 128 in position to couple a selected totalizer wheel 119 with the differential pinion 107. The selection is effected by the clerk's lever 117 (Fig. 12). The lever 117 has formed thereon teeth 130, which teeth mesh with a gear 131, connected to a drum cam 132 by a sleeve 133, the latter being carried on one of the beforementioned sleeves of the nest of sleeves 89 for setting the type wheels in the printer section of the machine. The drum cam 132 is provided with a cam race 134 (Fig. 13), into which projects a roller 135 (Fig. 12) carried by a slide 136, having two slots 137 engaging over studs 138 carried by a bracket 139 supported by the frame 29. The slide 136 is provided with a notch into which projects an end of a plate 140 having a bifurcation 141 engaging an annular groove in the left end of the shaft 114.

From the above it is seen that, when the lever 117 is positioned by the clerk, the teeth 130, engaging the gear 131, rotate the drum cam 132 to shift the slide 136 endwise. Endwise shifting of the slide 136, through the plate 140 engaging the annular groove in the shaft 114, shifts said shaft 114 endwise to position the coupling member 128 to engage the inner teeth 116 of a totalizer corresponding to the position of the clerk's lever 117.

To prevent the totalizer wheels 119, which are not selected for operation, from being accidentally rotated during the machine operation, a locking shaft 124 (Fig. 10) is provided. The shaft 124, forming a part of the totalizer framework, normally engages between teeth of reset gears 145 (Fig. 10, later described) rotatably mounted on a shaft 146, which shaft is shiftably mounted in the plates 120, so as to move with the shaft 114. The gears 145 are always in mesh with associated totalizer wheels 119. The shaft 124 has notches 147 (see also Fig. 11) to provide clearance for the teeth of the gears 145 meshing with the selected totalizer wheels 119, so that, when the coupling members 128 rotate the selected totalizer wheels 119, the reset gears 145 associated therewith are free to rotate. However, the gears 145, in mesh with the totalizer wheels 119 which are not selected for operation, engage the periphery or, in other words, the unnotched portion of the shaft 124, to prevent accidental rotation thereof and thereby prevent accidental rotation of the unselected totalizer wheels 119.

The left end of the shaft 124 is secured to the plate 140, and therefore, when the drum cam 132 shifts the plate 140 to move the coupling members 128 for selecting a totalizer for operation, the shaft 124 is also shifted to properly position the notches 147 opposite the gears 145 for the selected totalizer wheels 119.

The shaft 146 is secured to the shifting plate 140, so that this shaft is shifted endwise for the purpose of reset operations, described hereinafter.

A shaft 150 (Fig. 11), carried by the frames 29 and 30, is provided with notches 151, into which the upper ends of the plates 120 project to properly side-space said plates.

Connected to the clerk's lever 117 (Fig. 12) is a link 155, which is similar to the link 77 (Fig. 2) for the amount lever 70. The link 155 is connected to and operates an indicator for displaying clerks' initials in the same manner that the amount indicator 80 is positioned and set under control of the amount lever 70.

The sleeve 133 (Fig. 13), which is differentially adjusted by the clerk's lever 117, projects to the left (Fig. 52B) into the perforator section of the machine, where a gear 88 is differentially positioned and meshes with a gear 801, connected to type wheels 90 and 91 in the same manner as described above for the amount levers 70. By this means, a character is positioned at the printing lines, in both the upper and the lower printer lines, to print a symbol indicating which clerk has operated the machine. The gear 88 for the clerk's lever also meshes with a gear 816 (Fig. 29) to adjust a perforator selector disk 821 in the same manner as such disks are set by the amount levers 70.

*Tens transfer mechanism*

The tens transfer mechanism used in the totalizer is of a well-known type. Inasmuch as this type of transfer mechanism is old and well known, only a brief description will be given herein, in which the application of this mechanism to an interspersed totalizer adapted to the English currency system will be described in detail.

The tens transfer mechanism is shown in enlarged view in Fig. 9, and this figure shows the mechanism for transferring from any one of the fractional pence order totalizer wheels 119 into the corresponding totalizer wheel 119 in the units of pence order. The fractional pence totalizer wheel 119 has twelve teeth and is provided with three studs 175 (Figs. 2, 9, and 16), which, when the wheel is rotated through zero, engages a projection of a latch 176 to rock said latch counter-clockwise against the action of a spring to disengage a shoulder, on one projection thereof, from a projection on a transfer pawl 177. Since the totalizer line consists of four interspersed totalizers, the transfer latch 176 is provided with four projections, one lying in the path of the studs 175 of each wheel. The projections on the latch 176 are formed in a unitary member consisting of the four projections on the latch 176, so that any totalizer wheel which may be rotated through zero will effect the tens transfer into the next higher order. Releasing the transfer pawl 177 for the next higher order totalizer wheel 119 permits the tooth of the pawl 177 to engage the teeth of a ratchet wheel 174 integral with the differential pinion 107 for the next higher order totalizer wheels 119. The main shaft 37 (Fig. 21) is operatively connected to the shaft 103 by means of the idler gear 40, loose on a stud 173 carried by the right side frame 30, which idler gear meshes with a gear 172 loose on a shaft 171. The gear 172 meshes with a gear 170, secured to the shaft 103. Through the gearing just described, one clockwise rotation of the main shaft 37 drives the shaft 103 (Fig. 21) counter-clockwise, causing a plurality of helically-arranged transfer cams 181 (Fig. 2) integral with said shaft, in cooperation with rollers 182 on respective levers 183 to rock said levers 183 clockwise against the action of their respective torsion springs 185. The torsion springs 185 are coiled around the shaft 123, and one end of each is connected to the shaft 122. The other end presses against one side of the lever 183.

There is a lever 183 for each denominational order except the lowest order, and secured on the forward end of each of these levers is the corresponding transfer pawl 177. It is therefore apparent that clockwise movement of the levers 183 carries the transfer pawls 177 in unison therewith, causing all tripped transfer pawls to engage the ratchets 174 of their corresponding totalizer wheels 119 to advance said wheels one step. The camming action of the ratchets 174 on the under sides of the pawls 177, as the ratchets are rotated by the pawls, causes the bent-over ears on the pawls 177 to be raised above the shoulder on the transfer latches 176, thereby permitting said latches to be spring-returned into engagement with said ears to restore the transfer mechanism to untripped position before the end of a machine operation.

When any of the transfer latches 176 are not tripped, they move clockwise in unison with their respective transfer pawls 177 and hold the teeth of said pawls above their ratchets on the corresponding totalizer wheels to prevent the advancing of said totalizer wheels. The helical arrangement of the cams 181 causes the transfer mechanism for each denomination to be operated progressively from the lowest denomination to the highest denomination, to provide time for effective transfers upon transfers.

The pence wheel 119 (Fig. 17) is divided into twelve spaces to provide for a tens transfer into the units of shilling wheel 119 (Fig. 19) when the pence wheel passes from 11 to 0. For this reason, only one transfer trip stud 175 is provided on the pence totalizer wheel. The units of shilling wheel is identical with the usual ten-space wheels and trips the tens transfer pawl in the tens of shilling totalizer wheel upon passing from 9 to 0. The tens of shilling totalizer wheel 119 (Fig. 18) is a ten-division wheel and has a transfer trip stud 175 opposite every other tooth, so that one is tripped into the units of pounds order wheel at every other step of movement thereof.

*Transaction control lever*

Adjacent the highest order amount lever 70, a lever 200 (Fig. 24) is provided for controlling movement of the totalizer actuating segments 99 to selectively prevent adding operations when desired. As illustrated herein, the six upper positions of the lever 200 permit the totalizer actuating mechanism to operate to enter the items set up on the amount levers 70 into the selected totalizer. When the lever 200 is moved into its seventh, eighth, or ninth positions, the amount entering mechanism is disabled, so that the amounts set up on the levers 70 are not entered into the selected totalizer. However, the amounts are printed on the detail strip and on the receipt when the receipt-printing mechanism is set for issuing a receipt and the transaction lever is set to any one of its first eight positions. An automatic mechanism is provided to throw off the receipt printing and issuing mechanism when the lever 200 is moved into its ninth position, in a manner hereinafter described.

The transaction lever 200 is pivoted on the beforementioned shaft 37 and has pivoted thereon a link 201 connected to an arm 202 secured to a shaft 203 carried by the frames 29 and 30. Also mounted on the shaft 203, adjacent each amount differential mechanism, is a lockout segment 204, which lies in the plane of a segment plate 205 integral with each of the beforementioned arms 97 in the amount banks. Movement of the lever 200 from the position shown in full lines in Fig. 24 into the seventh, eighth, or ninth position, shown in chain lines, through the link 201, the arm 202, and the shaft 203, rocks all of the lockout segments 204 clockwise to position their forward ends over a surface 206 on the segment plates 205 of the amount banks, to prevent the latter from rotating when the machine is operated. If the segment plates 205 and their integral arms 97 are arrested during the machine operation, the links 98 cannot partake of the differential movement under control of the studs 96, and therefore no amounts are added into the totalizer, although the segment gears 99 are rocked into engagement therewith. If, on the other hand, the lever 200 is in the position shown in Fig. 24, or in any one of its first six positions of adjustment, the lockout segments 204 remain out of the path of movement of the segment plates 205, and therefore the amounts are entered into the totalizer in the manner described hereinbefore when the machine is operated.

The lever 200 is provided with segment teeth 207, which engage with a pinion 86 (Fig. 52B) on one of the tubes 89 connected to the printing mechanism, to set up a type wheel in both the upper and the lower type lines, so that a designating symbol is printed on the receipt and on the detail strip, and also to set a perforator control disk 821 (Fig. 29) to perforate a corresponding symbol on the perforated strip.

Figure 28:
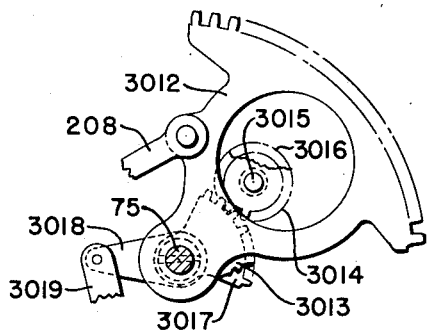
Fig. 28 is a detail view of part of the mechanism actuated by the transaction lever shown in Fig. 24 to control the receipt printing and issuing mechanism.

An indicator to indicate the type of transaction being entered is also provided and is adjusted by a link 208 (see also Fig. 28) pivoted to the transaction lever 200 in the same manner described for setting the indicators by the amount levers 70. The link 208 is connected to an indicator setting segment 3012 for this purpose.

*Interlock between transaction and amount banks*

In the system in which the present invention is to be used, it is necessary to prevent recording amounts on the perforated strip when the transaction lever 200 (Fig. 24) is in the lowermost, or "nine," position. To obtain such a result, a means actuated by the transaction lever positions a lock in the path of the lever 74 in each amount bank to lock the respective studs 73 in the notches 72 of the amount lever.

To accomplish this result, the transaction lever 200 is provided with a stud 839, which is moved into the chain-line position when the lever is set into its eighth position. In this position, the stud 830 contacts a lever 831, and, upon movement of the lever 209 into its ninth position, the stud 830 lifts the arm 831 to move around the shaft 37, upon which it is pivoted. The arm 831 is connected to an arm 832 by a link 833. The arm 832 is connected to a second arm 832 by a yoke 834, and the arms 832 are pivoted on a shaft 218. A spring 835 maintains the arm 832 in lowered position, with a toe 836 on the arm 832 against the shaft 369. The arms 832 carry a rod 838, which extend across the planes of all the levers 74 of the six amount banks.

When the lever 200 is moved into its ninth position, the rod 838 is lifted into the paths of the lower ends of the levers 74, thus locking the studs 73 in the notches of the amount levers to prevent any movement thereof.

If an amount lever should be adjusted before moving the lever 200 into its seventh, eighth, or ninth position, a segment 205 will be in the path of its corresponding arm 204, thus preventing the transaction lever from being moved past the sixth position. In such event, it is necessary to restore the amount lever 70 to its home position before the transaction lever 200 can be moved beyond the sixth position.

*Machine release mechanism*

After the amount levers 70, the clerk's lever 117, the transaction lever 200, and the account number levers, later described, have been properly positioned, the machine may be released for operation by depression of one of four release keys 210 (Fig. 21) carried in a key frame 209. The keys 210 are assigned to the various clerks who are authorized to operate the machine and are of the insertable type; that is, the key 210 is inserted into a lock cylinder 211, so that each clerk has an individual key for releasing the machine for operation. Insertion of a key 210 into a cylinder and further depression thereof move a stud 212 on the lower end of the key cylinder into a slot 213 in a segment 214 loosely mounted on the shaft 37. The cam slot 213 is so formed that entry of the stud 212 therein, resulting from the depression of a key 210, rocks the segment 214 clockwise. The segment 214 is provided with a downwardly-extending arm 215, having a stud 216 projecting into the bifurcated end of an arm 217 pinned to a shaft 218 (Figs. 2, 21, and 24), which shaft is supported between the frames 29 and 30. The bifurcated arm 217 is located near the frame 29. Also secured to the shaft 218, adjacent the right frame 30, is an arm 219, which, together with an extension on the arm 217, supports a universal rod 220 for a purpose to be described hereinafter. The shaft 218 projects through the right side frame 30, where it supports an arm 221, which is provided with a flange 222 at its upper end. The flange 222 normally lies in the path of a surface 223 of a three-armed lever 224 pivoted on a stud 225 on the right side frame 30. A spring 226 normally maintains the surface 223 in contact with the flange 222. A rearwardly-extending arm 227 of the three-armed lever 224 is bifurcated to engage a stud 228 on an arm 229 secured to a shaft 230. The beforementioned stop arm 57 (see also Figs. 22 and 23) is pinned to the shaft 230. Also secured on the shaft 230 is an arm 231 (Figs. 14 and 21) normally engaging a switch operating arm 232 pivoted on a stud 233 carried by a flange on the motor bracket 234. The switch arm 232 is made of an insulating material, such as fiber, and is normally in contact with a switch blade 235 carried by a bracket 236 mounted on the motor. The bracket 236 also has thereon a switch blade 237, with which the switch blade 235 contacts to close the circuit through the motor 41.

Through the above-described mechanism, upon depression of a key 210 (Fig. 21), the segment 214, acting through the arm 217, the shaft 218, and the arm 221, withdraws the flange 222 from beneath the surface 223 to release the three-armed lever 224 to the action of the spring 226, to rock the three-armed lever counter-clockwise. Counter-clockwise movement of the three-armed lever 224 rocks the arm 229 and the shaft 230 clockwise, which rocks the arm 231 clockwise (Fig. 21) to lower the switch arm 232 (Fig. 14) to move the switch blade 235 into contact with the stationary switch blade 237, to start the motor in operation. When the motor operates, the ratchet wheel 52 (Fig. 23) is rotated. When the shaft 230 is rocked clockwise, the arm 57 is rocked therewith to withdraw its left end from the path of the upstanding arm 58 to release the clutch pawl 54 to the action of its spring 56. This causes the clutch pawl 54 to engage with a tooth of the ratchet wheel 52, whereupon the ratchet wheel, acting through the pawl 54, rotates the disk 53 and, through the gears 61 and 62, rotates the main shaft 37 clockwise, as hereinbefore described. Near the end of the machine operation, a stud 240, on a gear 241 secured to the main shaft 37, engages a nose 242 on the forward end of the three-armed lever 224 and returns the three-armed lever 224 clockwise to its home position. When the three-armed lever 224 is thus restored to its home position, the flange 222 is again rocked beneath the surface 223 by a spring 239, one end of which is connected to the rod 220 and the other end of which is connected to a flange 243 on a bracket 244 for supporting the frames 29 and 30. Return movement of the arm 221 and the shaft 218 to their normal positions by the spring 239 restores the segment 214 to its home position. The segment 214, acting through the cam slot 213, restores the depressed key 210. This restoring movement is assisted by the action of a spring 245, coiled around the lock cylinder of the key.

A means is provided to prevent a second release of the motor before the depressed key 210 is again released to the action of the spring 245 at the end of the machine operation. This means includes a pawl 246 pivoted on the forward end of the lower arm of the three-armed lever 224. A spring 247 normally maintains the pawl 246 in contact with a stud 248 on an upper extension of the lower arm of the three-armed lever 224.

When the pawl 246 is held against the stud 248, a surface 249 thereof lies out of the path of movement of the flange 222 of the arm 221. When the machine is released for operation by depression of a key 210 and the flange 222 is rocked from beneath the surface 223, the flange 222 moves beyond the surface 249 of the pawl 246. When the three-armed lever is rocked counter-clockwise by the spring 226, the pawl 246 moves in front of the flange 222. If, at the end of the machine operation, the operator should maintain the key 210 depressed, the arm 221 is held in moved position, wherein the flange 222 lies in the path of movement of the surface 249. Thereafter, when the three-armed lever is restored clockwise by the stud 240, the surface 249 comes to rest on top of the flange 222 and holds the stop arm 57 in moved position, thus preventing a second release of the motor until after the pressure is taken from the key 210. When the operator removes the pressure from the key 210, the segment 214, the arm 217, the shaft 218, and the arm 221 are restored to home positions to again move the flange 222 beneath the surface 223. As the flange 222 moves from beyond the surface 249 of the pawl 246, the three-armed lever 224 is restored into its home position by the spring 226, whereupon the surface 223 comes to rest on top of the flange 222.

In the normal operation of the machine, when the key 210 is free to be released at the end of the operation of the machine, the spring 239 restores the arm 221 into its home position at the end of the machine operation. During this operation, the pawl 246 performs no function, and the machine comes to rest in the position shown in Fig. 21, in the manner described above.

Setting lever lock

The amount levers 70, the clerk's lever 117, and the transaction lever 200 are provided with notches 72 (Fig. 2), 256 (Fig. 12), and 72 (Fig. 24), respectively. As before mentioned, the arms 217 and 219 carry between them a universal rod 220, which rod extends across the plane of the setting levers 70, 117, and 200.

Adjacent each lever 70, 117, and 200 is a spring-urged lever 74, pivoted on the shaft 75. Each lever 74 has a shoulder 259 lying in the path of the universal rod 220. When the machine is released for operation and the arms 217 and 219 are rocked counterclockwise, the rod 220 is moved into engagement with the shoulders 259 of the levers 74 to lock the rollers 73 in the respective notches 72, 256, and 257 of the levers 70, 117, and 200, thereby preventing any adjustment of the levers 70, 117, and 200 during the machine operation.

Release key selecting mechanism

An interlock is provided between the clerk's lever 117 and the clerk's keys 210. Inasmuch as the lever 117 selects a totalizer corresponding to the clerk operating the machine, an interlock is provided so that only the key 210 which classifies the clerk operating the machine, and which corresponds to the position of the lever 117, can be depressed. This interlock includes a disk 265 (Fig. 12) connected to the lever 117 by a stud 266. The disk 265 is provided with a notch 267, which is movable into the paths of the studs 212 on the depressible keys 210. When the lever 117 is in its uppermost position, the notch 267 lies in the path of the stud 212 for the upper key 210. As the lever 117 is progressively moved forwardly, the notch 267 is positioned opposite the studs 212 for the corresponding keys 210. Therefore, the position in which the lever 117 is adjusted permits the depression of the corresponding key. The unnotched section of the disk 265 is long enough to present its periphery into the path of the three keys 210, which are not to be depressed; or, in other words, which are not opposite the position of the adjusted lever 117.

Signal device

The present machine is provided with a signal device for visibly indicating when an amount set up on the levers 70 has been registered, or has not been registered.

A yoke 269 (Figs. 2 and 3) including supporting arms 270, loose on the shaft 75, transverses all the alining levers 74 and is retained in resilient engagement with said levers by springs 271 connected to the yoke 269. One arm 270 of the yoke 269 is provided with an upstanding finger 272, the upper end of which is normally engaged by a flange 273 of a pitman 274, connected to a signal member 284. The signal member 284 is loosely pivoted on the shaft 81 and is normally urged counter-clockwise by a spring 275, one end of which is connected to a stud 276 on the signal member 284 and the other end of which is connected to a stud on the left side frame. The signal member 285 is held in its normal invisible position by engagement of the flange 273 with the upper end of the upstanding finger 272 of the yoke 269. Movement of any lever 70 from its home position, acting on the roller 73, rocks the arms 270 counter-clockwise, thus moving the yoke 269 likewise to withdraw the finger 272 from beneath the flange 273, whereupon the spring 275 moves the signal member, together with the pitman 274 thereon, until arrested by a bifurcated end 277 of the pitman 274 coming into engagement with a stud 278 on a bell crank 279 pivoted on the beforementioned shaft 203. The bell crank 279 is provided with a foot 280, which normally rests on a collar on the shaft 75, to form a positive stop for the stud 278 and the pitman 274 when released in the manner illustrated in Fig. 3. Release of the signal member 284 moves the signal member in front of a window 281 to indicate that an amount has been set up on the keyboard, which amount has not been registered in the machine.

The cams 111 for engaging the totalizer carry a stud 285 (Fig. 3), which, near the end of the machine operation, engages a downwardly-extending arm of the bell crank 279 to rock said bell crank counter-clockwise. Counter-clockwise movement of the bell crank 279 restores the pitman 274 upwardly, causing the flange 273 to move beyond the upper end of the finger 272, whereupon said finger is spring-returned into the path of said flange to retain the pitman 274 and associated parts in restored position. Upward restoration of the pitman 274 restores the signal member 284 clockwise to normal position.

A shield, mounted on the framework of the machine and lying behind the window 281, has the legend "Registered" thereon, which is visible when the signal member 284 is in its upper position. The signal member 284 has thereon a legend "Not registered," which is dropped in front of the shield 286 when released, to expose said legend through the window when a setting lever is adjusted.

The amount, clerks', transaction, and account number indicators are visible through the front window 281 and also through a rear window 287. The signal member 284 and a shield 288 are provided opposite the rear window 287, so that the legends "Registered" and "Not registered" will be exposed to the rear of the machine in the same manner as similar legends are exposed at the front of the machine.

Control lock

The machine of the instant invention is provided with a control lock 290 (Fig. 21), which controls the operations of the machine; that is, the operations of printing totals from the totalizer wheels, locking of the machine, release of the cash drawers, etc. The lock has three positions of adjustment. When the lock is in intermediate position, shown in Fig. 21, the machine can be operated for entering items. When the lock is turned ninety degrees in a clockwise direction (Fig. 21), the machine release mechanism is locked against operation, totals can be printed from the selected totalizer wheels, the totalizer can be reset to zero, the tens transfer mechanisms are disabled, and a manual drawer release mechanism is unlocked. When the lock is turned counter-clockwise ninety degrees from the position shown in Fig. 21, the machine is locked against any operation.

Figure 21:
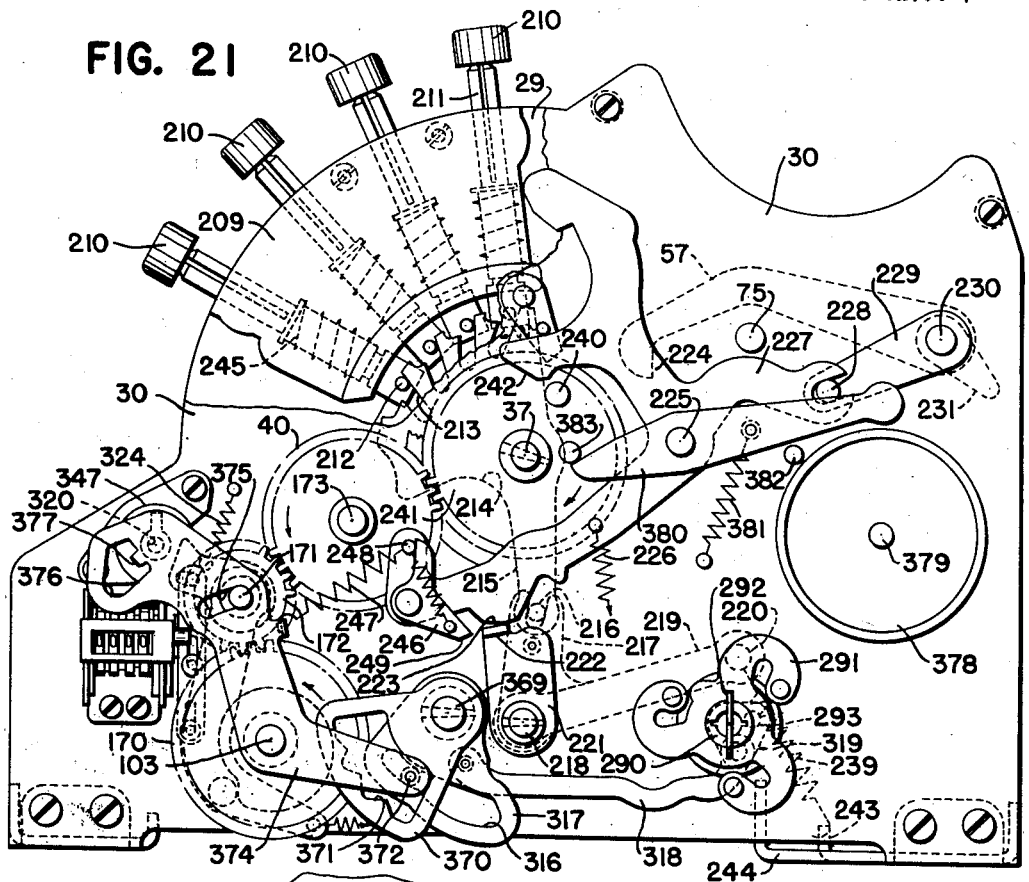
Fig. 21 is a right side elevational view of the machine taken just outside the right side frame.
Figure 22:
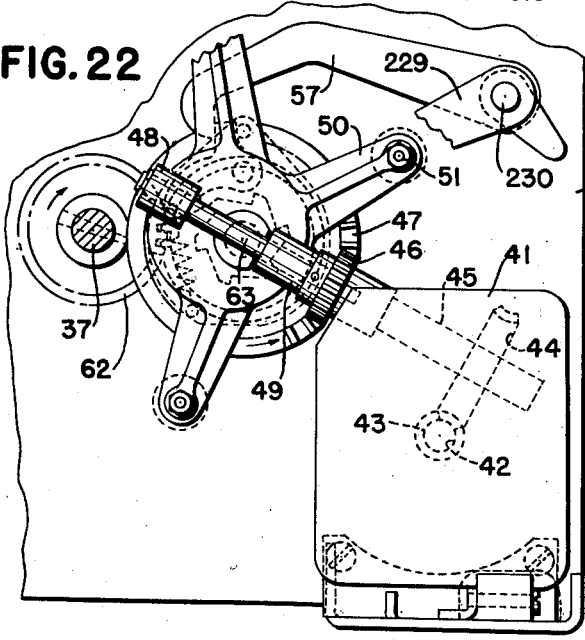
Fig. 22 is a detail view of connections between the motor and the main operating shaft of the machine, together with certain of the release mechanism for releasing the machine for operation.
Figure 23:
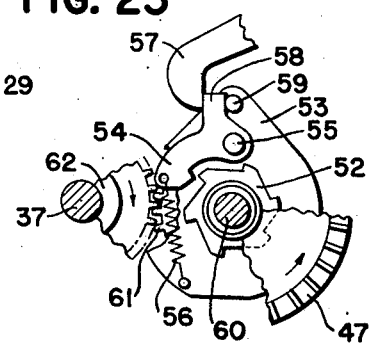
Fig. 23 is a detail view of the motor clutch mechanism.
Figure 24:
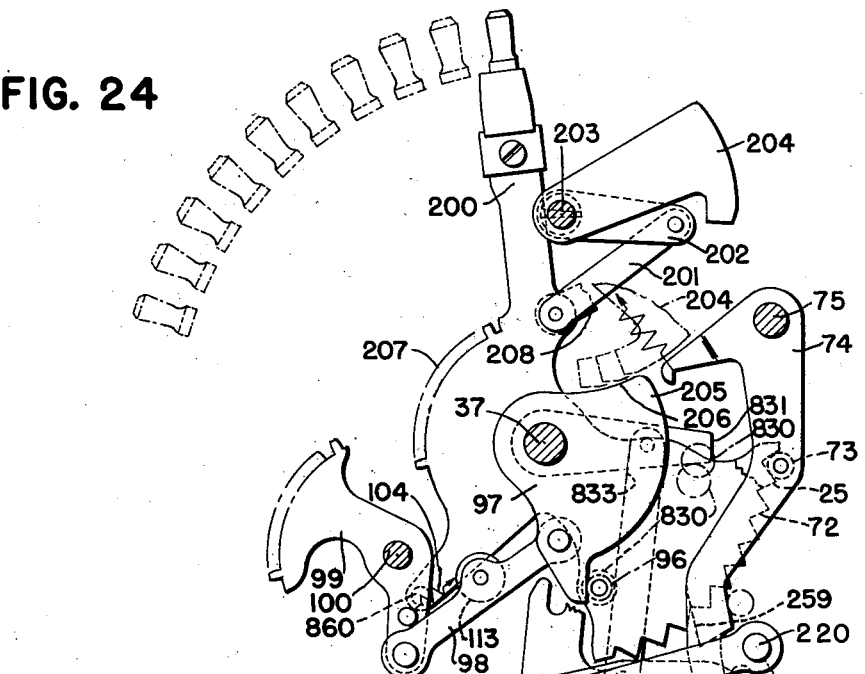
Fig. 24 is a detail view of a special transaction lever and certain interlocks actuated thereby.
Figure 25:
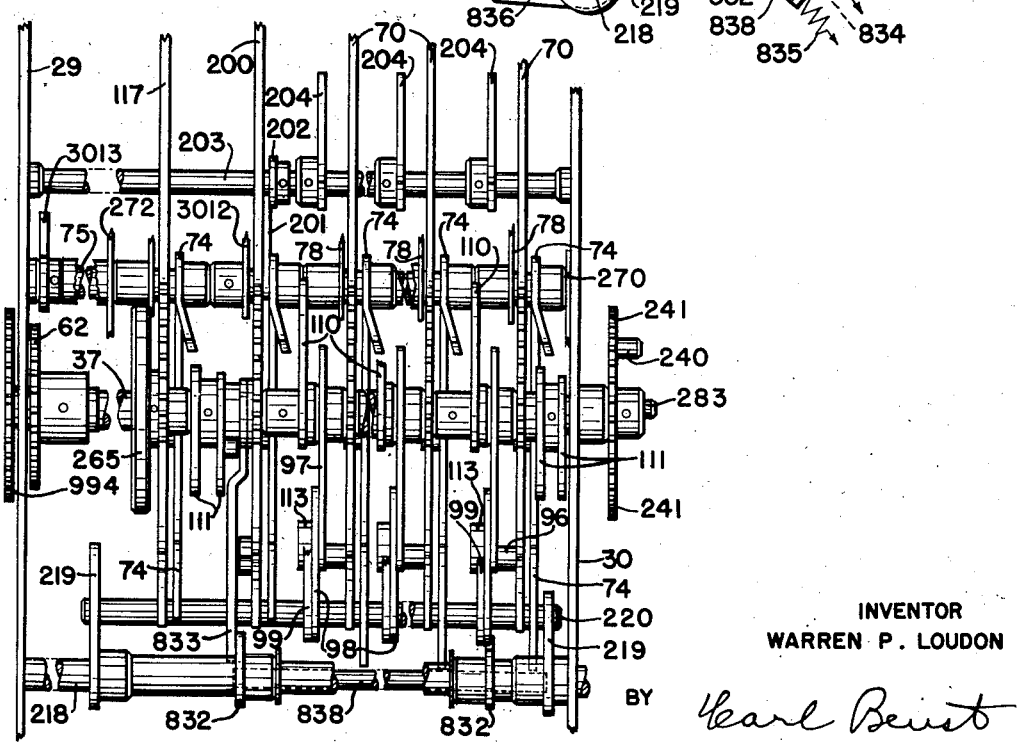
Fig. 25 is a detail front elevational view showing the side spacing of the amount, clerks', and transaction levers.

The control lock 290 (Fig. 21) is mounted in a bracket 291 on the right side frame 30. An insertable key 292 controls the various functions of the machine described above. When the key 292 is in its vertical position, as shown in Fig. 21, the machine can be operated for item-entering operations. When the key 292 is turned clockwise (Fig. 21) until it is in horizontal position, the following mechanisms are operated:

Rotation of the lock barrel clockwise (Fig. 21) by the key 292 moves a pin 293 thereon into the position shown in full lines in Fig. 15. The pin 293 projects into a slot 294 of a lever 295 pivoted on a stud 296 carried by the right side frame 30. Counter-clockwise rotation of the lock 290 moves the lever 295 from the dot-and-dash position into the full-line position shown in Fig. 15. When the lever 295 is moved into its full-line position, a stud 297 thereon comes into engagement with a shoulder 298 on the three-armed lever 224 (see also Fig. 21), thus preventing any releasing movement thereof. Therefore, when a machine release key 210 (Fig. 21) is depressed to withdraw the flange 222 from the surface 223 of the three-armed lever 224, the lever is arrested against movement, therefore preventing release of the machine. When the operator removes his finger from the key 210, with the machine in the above-described locked condition, the depressed key 210 is not latched in depressed position, and therefore the spring 245 immediately restores the depressed key 210 into its undepressed position.

Clockwise rotation of the key 292 from its normal intermediate position into its horizontal position moves the pin 293 into the lower position shown by dot-and-dash lines in Fig. 15. When the pin 293 is thus moved, the pin 293, cooperating with the slot 294, also moves the stud 297 into engagement with the shoulder 298, thus also preventing release of the machine when the lock is in its clockwise moved position.

From the above description it is clear that the machine is locked against releasing movement when the key 292 assumes either its counter-clockwise position or its clockwise position.

The pin 293 on the lock 290 also projects into a slot 300 (Fig. 15) of a bell crank 301 pivoted on a stud 302 carried by the right frame 30. The downwardly-extending arm of the bell crank 301 has pivoted thereto a link 303, the other end of which is pivoted to a downwardly-extending arm 304 of a bell crank 305 loosely mounted on the beforementioned shaft 103. An upwardly-extending arm 306 of the bell crank 305 has pivoted thereto one end of a link 307, the other end of which is pivoted to an arm 308 pinned to a shaft 309 pivotally supported in the totalizer plates 120 (see also Fig. 11). An arm 310 secured to the shaft 309 adjacent the second totalizer plate from the right, as shown in Fig. 11, and a second arm 311 are secured to the shaft 309 adjacent the left-hand totalizer plate 120. A bail rod 312 is supported between the two arms 310 and 311. Also pinned to the shaft 309 is an arm 313, normally engaging a stud 314 (Fig. 8) to prevent operation of the total printing mechanism, later described. When the key 292 is turned clockwise, the arm 313 is rocked from engagement with the stud 314 to release the total printing mechanism.

The totalizers are reset to zero by rotation of a reset gear 347 (Fig. 15) one complete clockwise rotation by a key inserted through a suitable opening in the cabinet, which key is provided with notches for clutching it onto the gear 347. Means is provided to prevent insertion of the reset key when the key 292 is in its vertical position and the machine is in condition to receive entries. When the key 292 is rocked clockwise into its clockwise horizontal position, and the arm 308 is rocked clockwise in the manner described hereinbefore, a link 321, pivoted to the arm 308 at one end and to a lock-out plate 322 at its other end, rocks the lock-out plate 322 clockwise to position an enlarged section of an opening 323 of the plate 322 into a position to permit insertion of the reset key. Normally the lock-out plate 322 is in a position wherein a narrow section of the opening 323 is opposite the opening through which the reset key is inserted, thus preventing its insertion and the subsequent return to zero of the totalizer wheels. From this it is apparent that the totalizer can be reset only when the proprietor's key 292 is in its clockwise, or horizontal, position.

The cam slot 300 is so formed that, when the key 292 is rotated counter-clockwise, to lock the machine against operation, the pin 293 moves in a concentric part of the cam slot 300, thus having no rocking effect on the bell crank 301 and its connecting mechanism. Therefore, when the key 292 is turned counter-clockwise from normal, the arm 313 and the lock-out plate 322 remain in their normal positions, in which positions the totals on the totalizer wheels cannot be printed, and the totalizer cannot be reset to zero.

The machine is also provided with four special counters 325, described hereinafter, on the selected one of which "1" is added each time the machine is operated with the clerk's lever 117 in the respective positions to count the number of operations performed by each clerk. The special counters can be reset by rotating the respective shafts 326, in a manner described hereinafter.

Means is provided to prevent rotation of the shafts 326 and therefore prevent the resetting of the special counters except when the key 292 is in its clockwise position, which is the position in which the totals can be printed and the totalizer reset.

Mounted on each shaft 326 is a locking plate 327 (Fig. 15). Each locking plate 327 is provided with a shoulder 328, normally lying against an upstanding finger 329, formed on a locking slide 330, slidably supported on two studs 331, carried by the key frame 209. One arm of a bell crank 332, pivoted on the shaft 37, is pivotally connected to the locking slide 330. The other arm of the bell crank 332 has pivoted thereto a link, one end of which is pivoted to an arm 334 pivoted on the beforementioned shaft 103. The upper end of the arm 334 is connected to the beforementioned arm 311 by a link 335.

When the key 292 is rotated clockwise, the bell crank 301, the link 303, the arm 306, the link 307, the arm 308, the shaft 309, and the arm 311 are actuated to shift the link 335 to the left (Fig. 15). Leftward movement of the link 335 rocks the arm 334 counterclockwise and shifts the link 333 leftwardly (Fig. 15) to rock the bell crank 332 clockwise. Clockwise movement of the bell crank 332 moves the locking slide upwardly to withdraw all four fingers 329 from their respective locking plates 327, thus permitting clockwise rotation of the shafts 326 to reset the special counter to zero in a manner described hereinafter.

A slide 338 is provided, which can be manually shifted to the right (Fig. 58) to release all of the cash drawers in a manner described hereinafter. The slide 338 is provided with two slots 339, which engage studs 340, mounted on the top 33 of the drawer cabinet. The right end 341 of the slide 338 is normally obstructed by a flange 342 (see also Fig. 15) mounted on the before-mentioned link 303. When the key 292 is in its vertical position or in its counter-clockwise horizontal position, the flange 342 obstructs shifting movement of the slide 338. However, when the key 292 is rotated clockwise, the pin 293, engaging the cam slot 300, rocks the bell crank 301 clockwise to shift the link 303 to the left (Fig. 15). Leftward movement of the link 303 removes the flange 342 from the path of the right-hand end 341 of the slide 338, thus permitting the proprietor to shift the slide 338 to the right (Fig. 58) to release all the cash drawers in the manner described hereinafter.

Movement of the control lock to the clockwise horizontal position, in which position the totalizers can be reset to zero, also controls the tens transfer pawls to prevent their being tripped when the totalizer is being reset to zero. The beforementioned bail rod 312 lies adjacent to the downwardly-extending arms of the carrying pawls 177 (Fig. 2). When the shaft 309 is rocked clockwise, upon turning the key 292 in a clockwise direction from its normal position, the bail rod 312 engages all the transfer carrying pawls and holds them in their inactive position, even though the trip pawls 176 are actuated by the studs 175. In this manner, all the transfer carrying pawls are maintained in normal position during the reset operation.

*Totalizer turn-to-zero mechanism*

The totalizer wheels 119 are reset to zero by a manual means, consisting of a key insertable on the reset shaft 320 (Figs. 9 and 21). The turn-to-zero key is provided with a clutch prong which engages a notch in the wide gear 347 in mesh with the gear 348 pinned to the shifting shaft 146. As described hereinbefore, the shaft 146 is a part of the totalizer shifting frame, including the coupling shaft 114 on which the coupling members 128 are mounted. The shaft 146 is provided with a notch 349 (Fig. 10) for each denominational order of totalizer wheels 119, and the notches are in alinement with the coupling members 128 on the shaft 114. When the shaft 114 is shifted endwise by manipulation of the clerk's setting lever 117 to select a totalizer with which the coupling member 128 is engaged, the notches 349 are moved into the path of reset pawls 350, pivotally mounted within the hollow portion of reset gears 145. Springs 352, mounted on studs 353 within the hollow portions of the gears 145, engage the pawls 350 and normally tend to move the pawls into engagement with the notches 349. A gear 145 is provided for each totalizer wheel 119, with which the gears 145 are constantly in mesh.

As amounts are entered into the totalizer wheels 119, the corresponding gears 145 are rotated counterclockwise. When a totalizer wheel 119 is moved out of zero position, the pawl 350, moving with the gear 145, is moved out of engagement with the notch 349 a distance corresponding to the value set on the totalizer wheel 119. To restore the totalizer wheels 119 to zero position, the operator inserts the key into engagement with the wide gear 347 and rotates the gear, together with the gear 348, one complete rotation. One complete rotation of the gear 348 rotates the shaft 146 one complete counter-clockwise rotation. As the shaft 146 rotates counter-clockwise, the notches 349 picks up the selected pawls 350 from their set positions and restore the gears 145 into a position corresponding to the zero position of the totalizer wheels 119.

Means is provided, forming a positive stop for the shaft 146 when the totalizer pinions 119 arrive in their zero positions. This means includes a gear 354 (Figs. 8 and 9) always in mesh with the wide gear 347. Secured to the gear 354 is a stop disk 355, provided with a stud 356. The stud 356 is normally in engagement with the upper end of an arm 357, pivotally mounted on a stud 358 of a frame 359, carried by the beforementioned shafts 122 and 123. Also mounted on the stud 358 is a pawl 360, the free end of which is normally held in engagement with a stop 361 on the stop disk 355 by a spring 362. The stop disk 355 is provided with a stop surface 363, spaced slightly from the end of the pawl 360 when the parts are in the normal position, shown in Fig. 9.

When the turn-to-zero key is inserted on the shaft 320, the key is turned backwards slightly, which, through the gears 347 and 354, rotates the stop disk 355 slightly clockwise until arrested by the end of the pawl 360. Clockwise movement of the stop disk 355 removes the stud 356 from engagement with the end of the arm 357, whereupon a spring 364 rocks the arm 357 counter-clockwise until a flange 365 on the arm 357 engages the under side of the pawl 360. After the arm 357 has been moved out of the path of the stud 356, the turn-to-zero key is rotated to rotate the wide gear 347 clockwise, thus rotating the stop disk 355 counter-clockwise. As the stop disk 355 rotates counter-clockwise, a surface 366 on the disk 355 engages the free end of the pawl 360 and rocks the pawl 360 clockwise against the action of the spring 362. Continued clockwise rotation of the pawl 360, through the flange 365, rocks the arm 357 to again present the free end of the arm 357 into the path of the stud 356, which stud at this time has been moved by the rotation of the disk 355. As the totalizer wheels 119 approach their zero positions, the stud 356 comes into contact with the end of the arm 357, thus arresting the stop disk 355, and, through the gears 354, 347, and 348, arresting the shaft 146 and therefore the totalizer wheels 119 in their zero positions.

A flash, comprising a lever 374, has an enlarged upper end covering the opening for the reset key when the lock 292 is in add position, as illustrated in Fig. 21. This enlarged upper end prevents insertion of the reset key to rotate the gear 347, rotatably mounted on the shaft 320, as hereinbefore described. The lower end of the lever 374 is provided with a stud 372 projecting into a cam slot 316 formed in a segment 317 loosely mounted on shaft 369. A link 318 connects the segment 317 with an angular shaped arm 319 pivoted on the frame 30. The arm 319 is provided with an opening for receiving the stud 293. When the stud is in the "add" position shown, the reset key cannot be clutched to the gear 347. However, when the lock 292 is turned to reset position, the stud 293 rotates the arm 319 clockwise to thrust the link 318 leftwardly (Fig. 21) which, through the cam slot 316 in segment 317, causes the flash lever 374 to rock clockwise to align an opening 376 therein with the shaft 320. This provides access for the reset key, so that the key can be clutched to the gear 347 for resetting the selected totalizer. A spring 324, connected to the lever 374, maintains the stud 372 thereon in contact with the lower wall of the cam slot 316, when the clearance portion of the cam slot is adjacent the stud 372.

Any one of the four totalizers can be reset to zero, as selected by the clerk's setting lever 117. Movement of the clerk's setting lever 117 shifts the shaft 146 to present the notches 349 into the path of the reset pawl 350 for the totalizer wheels 119 selected for resetting.

In order to insure that the notches 349 are in proper alinement with the reset pawls 350, an interlock is provided which makes it impossible to insert the reset key into the opening provided therefor unless the notches 349 are in proper position. This means includes a link 367 (Fig. 12) pivoted to the clerk's selecting lever 117. The lower end of the link 367 is pivoted to an arm 368 secured to a shaft 369, to which shaft is also pinned a segment 370. The segment 370 is provided with a cam slot 371 engaging the stud 372 on the lever 374 pivoted on the shaft 103 carried by the frames 30 and 31. The lever 374 is provided with an opening 375 (Fig. 21) to provide a guide therefor, in cooperation with the beforementioned shaft 171. As before mentioned, the lever 374 is provided with an irregularly-shaped opening 376, the concentric portion of which registers with the shaft 320 when a clerk's setting lever is in one of its adjusted positions and the lock 292 has been moved into reset position. When the clerk's setting lever 117 is moved from one position to the other, the segment 370 is rocked, which, by means of the cam slot 371 therein engaging the stud 372, rocks the lever 374 first counter-clockwise and then clockwise. Counter-clockwise movement of the lever 374 brings a lug 377, formed within the irregular opening 376, into registering position with the path of movement of the reset key as it is inserted into the machine and on the shaft 320. Therefore, when the clerk's setting lever 117 is in an intermediate position, the lug 377 blocks insertion of the reset key, and therefore the reset shaft cannot be rotated to reset the totalizer wheels 119 unless the clerk's setting lever 117 is in one of its four adjusted positions.

Bell ringing mechanism

The machine is provided with an audible signal to signify the beginning of a machine operation. This signal comprises a bell 378 (Fig. 21) mounted on a stud 379 carried by the right frame 30. Pivoted on the beforementioned stud 225 is a bell hammer 380, which is spring-urged clockwise into engagement with the bell 378 by a spring 381. A stud 382 normally maintains the end of the hammer 380 out of contact with the bell 378. During the operation of the machine, when the gear 241 starts to rotate, a stud 383 thereon rotates the bell hammer 380 counter-clockwise against the action of the spring 381. As the stud 383 passes the end of the hammer 380, the spring 381 rapidly swings the hammer 380 clockwise until its end strikes the bell to give an audible signal, indicating that the machine has been started in an operation.

Cash drawer mechanism

The cash drawer cabinet 33 (Figs. 54 and 55) houses four cash drawers, 385, 386, 387, and 388. One cash drawer is allotted for each of the four clerks; that is, one for each of the four positions of the clerks' selecting lever 117. The cash drawers are suitably mounted on tracks on which rollers carried by the cash drawers run for each operation of the drawers when the drawers are released to move out of the cabinet 33. Each cash drawer is impelled outwardly by a spring 389 when released. Normally latches 390 (shown in Fig. 56), 391, 392, and 393 maintain the respective drawers in their inaccessible position. The latches 390, 391, 392, and 393 (Figs. 54, 55, and 56) are selectively operated under control of the clerks' selecting lever 117.

The cash drawers are arranged in two tiers, the drawers 385 and 387 being in the left-hand tier, and the drawers 386 and 388 being in the right-hand tier.

The latch 390 for the upper left-hand cash drawer 385 is pivoted on a shaft 394 (see also Fig. 58) carried by a bracket 395, supported in the top of the drawer cabinet 33. The latch 390 is spring-urged, by a spring 850, into engagement with a stud 851 carried on an arm 852 secured to a shaft 853 journaled in bearings on the drawer cabinet 33. The right-hand end (Fig. 58) of the shaft 853 carries an arm 854 (Fig. 55) provided with a stud 855 projecting into a notch in the free end of a drawer release arm 856, pivoted on a shaft 857. The arm 856 is provided with an upwardly-extending arm 396, which lies in the path of a rod 397 (Figs. 54 and 58) carried between the two arms 398 of a yoke 399 when the clerks' selecting lever 117 is in its upper position. The yoke 399 is pivotally mounted on the shaft 369, supported in the frames 29 and 30. The arm 402 is provided with a roller 405, which lies in the path of movement of a cam 406 secured to the shaft 103.

When the machine is operated with the clerks' selecting lever 117 in its uppermost position, the rod 397 moves into engagement with the arm 396 and rocks the arms 396 and 856, together with the connections including arm 854, shaft 853, and arm 852, to rock the latch 390 counter-clockwise (Fig. 56) to release the upper left-hand cash drawer. The rod 397 is moved into engagement with the arm 396 when the cam 406 is rotated and engages the roller 405 to rock the yoke 403 clockwise. Clockwise movement of the yoke 403 moves the yoke 399, together with the rod 397, to the left (Fig. 54) to engage the arm 396 of the latch mechanism to rock the latch 390 counter-clockwise to release the upper left cash drawer.

The latch 391 for the upper right-hand cash drawer 386 is pivoted on a stud 407 (Fig. 54) carried by a bracket supported on the top of the cabinet 33. The latch 391 is provided with an upwardly-extending arm having a face 419, which lies in the path of the rod 397 when the clerk's selecting lever 117 is moved into its second position. The lever 117 has pivoted thereto a link 420, the lower end of which is pivoted to the rod 397, by means of which the rod 397 is positioned.

When the clerk's selecting lever 117 is moved counter-clockwise into its second position (Fig. 54), the link 420 lifts the rod 397 into the path of the face 419. Thereafter, during machine operation, when the cam 406 rotates to rock the yoke 403 clockwise, the yoke 399, pulling on the rod 397, rocks the latch 391 to release the second cash drawer.

The lower left-hand cash drawer 387 is held in closed position by a latch 392 (Fig. 55) having a stud 408 projecting into a slot 439 of a link 410. The link 410 is connected to an arm 411 (see also Fig. 57) clamped to a sleeve 412 on shaft 853. The sleeve 412 extends toward the right (Fig. 58), where an arm 413 is secured thereto, adjacent the beforementioned arm 854. The arm 413 is provided with a stud, like stud 855 (Fig. 55), projecting into a notch in the end of a bell crank 414, similar to the bell crank 856 but having a face 415 one step higher than the face 419 on the latch 391. When the clerks' lever 117 is moved into its third position, the rod 397 is moved opposite the face 415, and therefore, during the machine operation, when the rod 397 is moved by the cam 406, the rod 397, acting on the face 415, rocks the train of mechanism including the bell crank 414, the arm 413, the sleeve 412, the arm 411, the link 410, and the latch 392 to release the lower left-hand cash drawer.

The lower right-hand cash drawer 388 is provided with mechanism like that for lifting the latch 392. The latch 393 for the drawer 388 is connected to a link 416, which is connected to a bell crank having a surface 422 (Fig. 54). As the clerks' selecting lever 117 is moved into its fourth position, the rod 397 is moved opposite the surface 422. When the rod 397 engages the surface 422, the lower right-hand cash drawer 388 is released by the mechanism including the cam 406 and the yokes 403 and 399.

A manual release is provided for releasing all of the cash drawers when the proprietor wants to check the cash in the cash drawers without operating the machine. For this purpose, the beforementioned slide 338 (Fig. 58) is provided. The slide 338 has formed thereon two cam surfaces 423 and 424, which lie adjacent the bell cranks normally operated by the rod 397 during machine operation. When the proprietor operates the control lock to remove the flange 342 from the right end 341 of the slide 338 in the manner described hereinbefore, in preparing the machine for printing totals, the slide 338 is free to be moved rightwardly (Fig. 58). When the flange 342 is out of the path of the slide 338, the proprietor grasps a finger piece 425, formed on the left end of the slide 338, and shifts the slide 338 to the right. Movement of the slide 338 to the right causes the cam surfaces 423 and 424 to wipe against the rear ends of the drawer-releasing bell cranks, rocking them counter-clockwise to lift all of the latches 390, 391, 392, and 393, thus releasing all the cash drawers simultaneously without operating the machine.

*Drawer release control by transaction lever*

As hereinbefore mentioned, an operation of the machine with the transaction lever 200 (Figs. 24 and 54) in its ninth position results in the cash drawers all remaining latched in closed position. To accomplish this result, the connection between the cam 406 and the rod 397 is disabled when the transaction lever is moved into the ninth position.

The drawer release mechanism is disabled by the transaction lever 200 by a stud 860 mounted on an extension thereof. The various positions assumed by the stud 860 are shown in chain lines in Fig. 54. Lying in the path of the stud 860 is an arm 861 forming an upwardly-projecting extension of one arm of a yoke 862. The left ends (Fig. 54) of the two arms of the yoke 862 are provided with clearance slots 863, through which the shaft 400 passes. The two arms 401 and 402 of yoke 403 are provided with the beforementioned L-shaped slots 864, through which the shaft 400 also passes. A spring 865 normally maintains the shaft 400 in the vertical section of the L-shaped slot 864, so that the shaft 400 is normally effective to actuate the rod 397 in the manner hereinbefore described. When the transaction lever 200 is moved into its lowermost, or ninth, position, the stud 860 engages the arm 865 and rocks the yoke 862 to lift the shaft 400 out of the vertical section of the L-shaped slot 864. Thereafter, when the cam 406 actuates the yoke 403, the horizontal section of the slot 864 moves over the shaft 400; therefore the rod 397 is not moved, and the selected cash drawer latch is not actuated to release a cash drawer.

*Special counters*

The machine is provided with four special counters 325. One special counter 325 (Fig. 15) is allotted to each clerk, and each special counter is selected for operation when the clerk's selecting lever 117 is positioned.

Mounted on two studs 451 (Figs. 12 and 15) on the lever 117 is a selecting arm 450. When the clerks' selecting lever 117 is moved to select a totalizer for receiving entries, the selecting arm 450 is moved beneath a stud 452 for the special counter allotted to that position of the clerk's selecting lever 117. Each stud 452 is carried by a yoke 453 pivotally mounted on the shaft 326. The yoke 453 is provided with a shaft 454, on which is pivotally mounted a differentially tined pawl 455, spring-urged into engagement with ratchet 456, one for each wheel of the special counter. When the machine is operated after the clerks' selecting lever 117 has been properly positioned, a cam 457, coacting with a roller 458 mounted on the lower end of the selecting arm 450, raises said arm 450 to engage the stud 452 and rock the yoke 453 and the tined pawl 455 clockwise. Clockwise movement of the tined pawl 455, coacting with the ratchet wheel 456, rotates the unit wheel for the selected special counter one step.

The tined pawl 455 is what is known in the art as a differentially-tined pawl and coacts with the ratchet wheel 456 for the next higher order special counter wheel when the lower order wheel passes from "9" to "0" to effect a tens transfer when needed.

The special counters may be reset to zero by rotating the shaft 326 counter-clockwise. The shaft 326 is provided with a notch which engages reset pawls 459 to pick up the special counter wheels and restore them to zero in a manner well known in the art.

Account number setting levers

As before mentioned, the left-hand section of the machine is provided with a series of setting levers for setting up account numbers on the type lines of the printing mechanism and on the perforator control disks.

The series of account number levers 900 (Figs. 26 and 53) are pivoted on a shaft 500, supported by the frames 28 and 31. Each lever has pivoted thereto a link 901 connected to an indicator setting segment 902, pivoted on a shaft 903 (see also Fig. 47). The segment 902 meshes with a pinion secured to the side of an indicator 904, similar in all respects to the indicators 80 for the amount section.

Each lever 900 is provided with a segment 905, having a series of notches 906, one notch for each position of the lever 900. Coacting with the notches 906 is a stud 907 for each segment 905. The stud 907 is mounted on an arm 908, which is spring-actuated by a spring 909 to normally maintain the stud 907 in contact with a notch 906. When the account number lever 900 is positioned to set up a number on the indicator, on the type wheels in the printer section of the machine, and on a perforator selecting disk in the perforating section of the machine, the stud 907 ratchets in and out of the notches 906.

Upon release of the machine for operation, the studs 907 are all locked in the respective notches 906, so that the levers 900 cannot be moved during a machine operation. To accomplish this, a yoke 910, which lies over the rear sides of all of the arms 908, is provided, which is locked in position by the machine release mechanism, but which is normally held in the position shown in Fig. 26 by a spring 911. When the machine is released for operation, the shaft 230 (Fig. 26) is rocked in a clockwise direction in the manner hereinafter described, to position a locking finger 912 thereon over the surface 913 of one arm of the yoke 910, thus locking the studs 907 in the respective notches 906.

When a lever 900 is in a position intermediate any setting positions, the arm 908, actuated thereby through a notch 906 and a stud 907, holds the yoke 910 in a moved position, in which one arm of the yoke is held in the path of movement of the arm 912 on the release shaft 230. Therefore, when any one or more of the account number levers 900 are in an intermediate position, the machine release shaft 230 is locked, and the machine cannot be released for operation.

Each lever 900 is provided with a series of teeth 913, each of which meshes with a gear 914, one gear 914 being secured to a respective one of a nest of tubes 915 (see also Fig. 47 and Fig. 52A) mounted on the beforementioned shaft 814. Secured to the side of each gear 914 is an intermediate gear 916, which gears are connected to the type setting section of the machine by means presently described. The right-hand ends of the sleeves 915 have connected thereto gears 917 (Fig. 52B) in the perforator section of the machine to set up perforator selecting disks, as hereinafter described.

Each order of account number lever gears 916 is connected to the printing section of the machine by a different gear train. The units order gear 916 (Fig. 52A) meshes with a pinion 919 (Fig. 52A) secured to a sleeve 920 on the shaft 92, to the left-hand end of which is secured a units type wheel 921.

The tens order gear 916 meshes with a pinion 922 secured to a sleeve 923 mounted on the sleeve 920, the left-hand end of which is secured to a type wheel 924.

The hundreds order gear 916 meshes with a pinion 925, secured to a sleeve 926 on the beforementioned shaft 93. The left-hand end of the sleeve 926 has secured thereto a type wheel 927.

The one thousand order gear 916 meshes with a pinion 928 secured to a sleeve 929, rotatably mounted on the beforementioned sleeve 926, and the sleeve 929 has secured thereto a type wheel 930.

The ten thousand order gear 916 meshes with a pinion 931 secured to the right-hand end of a sleeve 932, which carries a pinion 933 on its left end. The pinion 933 meshes with a gear 934 on a sleeve 935 carried by the shaft 814. The left end of the sleeve 935 carries a gear 936 meshing with a type wheel 936 on the shaft 92.

The hundred thousand gear 916 meshes with a pinion 938 secured to a sleeve 939 surrounding the beforementioned sleeve 929 and to the left end of which is secured a pinion 940 meshing with a gear 941, secured to a sleeve 942, to the left-hand end of which is secured a gear 943, meshing with a type wheel 944.

The highest order gear 916 meshes with a pinion 945 secured to a shaft 946, to which is also secured a gear 947, meshing with a gear 948 on a sleeve 949, to which is also secured a gear 950. The gear 950 meshes with a type wheel 951.

Each of the type wheels on the shaft 92 and each of the type wheels on the shaft 93 is adapted to mesh with a gear like the gears 936 and 934, so that the positioning of one type wheel on one line will position the corresponding type wheel on the other line commensurate therewith.

Referring to Fig. 52A, it will be seen that the type wheels 90 for setting up the amounts, and the type wheels for setting up the account numbers, are positioned on the same shaft and lined therewith, and similar type wheels are set on the shaft 93 adjacent the amount type wheels 91. Therefore, during the printing operation, the amount set up on the amount type wheel and on the account number type wheel will be on a single line, and the data will be printed therefrom simultaneously.

Figure 26:
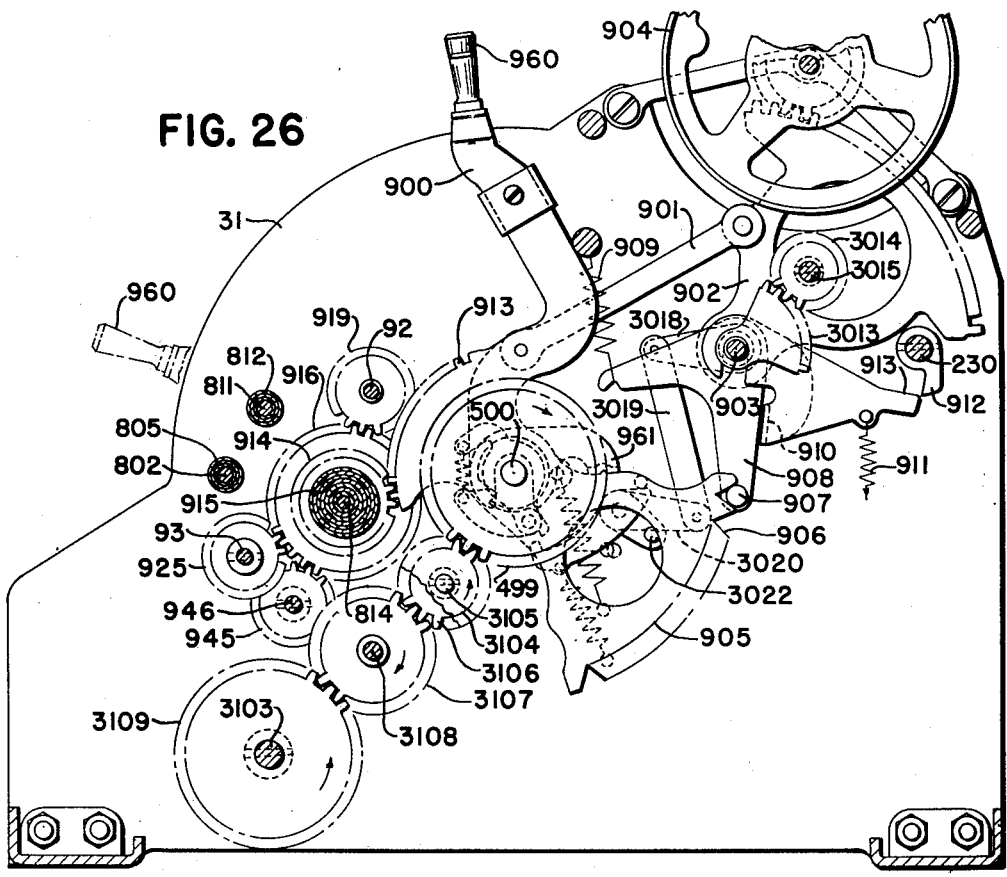
Fig. 26 is a detail view showing the account number lever and the connections actuated thereby.

A special lever 960 adjacent the highest order account number lever is provided for restoring all of the account number levers 900 to their normal positions simultaneously. The lever 960 is pivoted on the shaft 500 and has secured thereto a yoke 961 (Fig. 26) having a bar extending over and being in contact with all of the segments 905 of the account number levers 900, when the lever 960 is positioned to its full-line position, shown in Fig. 26. Normally, the lever 960 assumes the position shown by chain lines, in which position the yoke 961 is above and out of contact with the segments 905, thus permitting the setting of the account number levers 900. At the end of the operation of the machine, the lever 960, being in the chain line position, is grasped by the operator and moved upwardly into its full-line position, during which movement the yoke 961 engages the positioned extensions 905 and restores the extensions and all of the levers 900 to their normal positions, in which they are shown in Fig. 26.

Perforator section

Located between the account number section of the machine and the amount and transaction sections of the machine is a mechanism for perforating a record strip 970 (Fig. 62). The construction of the perforator section of the machine is shown in Figs. 29 to 47 inclusive.

Perforator strip

The record strip 970 is fed from a supply roll 971 (Fig. 29) carried on an arbor 972, rotatably mounted in a rockable frame 973. The frame 973 is rockable on a shaft 1035, carried by frames 803 and 804, for rendering the arbor 972 accessible for replacing a new supply roll 971 of paper, in the manner described hereinafter.

The strip 970 is fed below a roller 974 on a stud 975 carried between two removable frames 976 and 977 (see Fig. 47). From the roller 974, the paper 970 is guided through a paper chute 978, supported on studs 979 on the frames 976 and 977. The paper chute 978 is curved, and the forwardly-extending terminal of the chute projects into the open mouth of a second paper chute 980 supported on studs 981 carried by a pair of arms 1088. The forward end of the paper chute 980 guides the paper between the punches of a perforator mechanism, hereinafter described, and below a roller 982, carried by swinging arms in a manner hereinafter described. The perforator strip 970 is provided with feed perforations 983 on each edge thereof, for engagement with teeth 984 on each side of a feed drum 985 (see also Fig. 30). The feed drum 985 is mounted on, and clutched to, a shaft 986 in a manner hereinafter described. The paper 970 is guided over the drum 985 and around a roller 959, carried by a spring-tensioned arm 987 pivoted on a stud 988 on a rockable frame 952. A spring 989 tends to rotate the arm 987 to maintain the roller 959 in constant engagement with the paper 970 and the drum 985 to hold the paper in engagement with the teeth 984 of the drum 985.

From the roller 959, the paper 970 is guided onto a receiving roll 990, rotatably mounted on a spool carried by a stud 991 mounted in the rockable frame 992. The rockable frame 992 is pivoted on a stud 1014 carried by a bracket mounted on the cash drawer cabinet 33.

Perforated strip feeding mechanism

To feed the perforated strip onto the spool for the receiving roll 990, the shaft 991 is actuated step by step by a Geneva mechanism, including the Geneva gear 993 (Fig. 40). The Geneva gear 993 is driven from the main shaft 37 (Fig. 47) by a train of mechanism including the following:

Secured to the shaft 37, between the frames 803 and 977, is a gear 994, which meshes with a gear 995 secured to a shaft 996, which shaft is journaled in the frames 976 and 977. Also secured to the shaft 996 adjacent the frame 804 is a gear 997 (see also Figs. 40 and 43), which gear meshes with a gear 998 on a stud 999 secured in the frame 976. Secured to the side of the gear 998 is a disk 1000, on which is mounted a stud 1001 adapted to engage in the notches 1002 of the Geneva gear 993. Secured to the side of the disk 1000 is a locking disk 969, normally engaging surfaces 1003 of the Geneva gear, to lock the Geneva gear against rotation until the stud 1001 engages a notch 1002, whereupon a clearance notch 1004 in the locking disk 969 permits rotation of the Geneva gear by the stud 1001. The Geneva gear is mounted to rotate on a stud 1005 carried by the frame 976 and has secured thereto a feed roller 1006 engaged by a friction roller 1007 rotatably supported on a stud 1008, carried by a rockable arm 1009 pivoted on a stud 1010. A spring 1011, connected to the arm 1009, maintains the friction roller 1007 against the feed roller 1006.

The friction roller 1007 is also held in engagement with a feed roller 1012, secured to the shaft 991, to which the spool for the receiving roll 990 is clutched.

When the shaft 37 is rotated during operation of the machine, the disk 1000 will be rotated clockwise by the gears 994, 995, 997, and 998. When the disk 1000 rotates, the stud 1001, entering a notch 1002 of the Geneva gear, rotates the Geneva gear counter-clockwise, which movement is transferred by the friction roll 1007 to the feed roll 1012, to feed the perforated strip one step and wind said strip on the spool clutched to the shaft 991.

As before mentioned, the receiving roll 990 is mounted on a rockable frame 992. A spring 1013, connected to the rocking frame 992, normally holds the feed roll 1012 against the friction roll 1007.

The friction roll 1007 is located in relation to the feed rollers 1006 and 1012 to permit variable rotating speed of the receiving roll 990. When the spool for the receiving roll is almost empty, its angular movement must be greater than when the spool is filled. Thus, when the Geneva gear rotates the friction roll to feed the paper onto the receiving spool, the friction connection between the friction roll 1007 and the feed roll 1012 permits a variable feed of the perforated strip. As the roll becomes filled and the paper becomes stretched taut, the friction roll 1007 tends to move downwardly around the pivot point 1010 as the limit of feeding movement of the paper is reached. The novel construction of the feed rollers and the friction roller is such that an automatic constant feed of the perforated strip is obtained.

When it is desired to remove the perforated strip from the spool on the shaft 991, the operator grasps the rockable frame 992 and rocks it clockwise, as viewed in Fig. 40, around the pivot shaft 1014 to permit easier access thereto for removal of the perforated strip and for the starting of the feeding of a new strip.

When a new strip is placed in the machine, which strip has the pre-perforated feed openings 983, it is necessary that the feed drum 985 rotates freely, and for this reason the drum 985 should be disconnected from its driving mechanism when the new paper is being inserted into the machine. For this purpose, the drum 985 is clutched to the shaft 986 by a clutch mechanism which disengages the drum 985 from the shaft 986 when the rockable frame 992 is moved into its accessible position.

Figure 47:
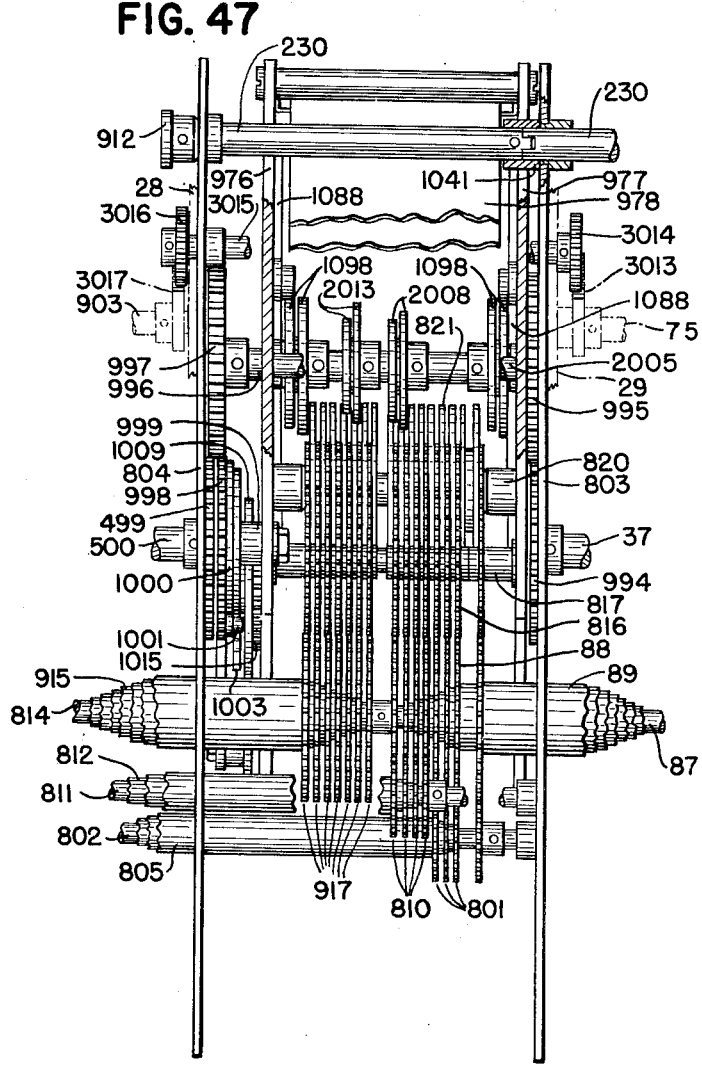
Fig. 47 is an end view showing the connections from the amount section and the account number section for setting up the perforating control disks, together with the cam shaft for actuating the perforator mechanisms.

The feed drum 985 is advanced step by step by the Geneva gear through a gear 1015 (Fig. 43) secured to the locking plate 1000, and said gear is located adjacent the frame 976 (see Fig. 47). The gear 1015 meshes with a gear 1016 secured to the above-mentioned shaft 986. The feed drum 985 is clutched to the shaft 986.

Figure 30:
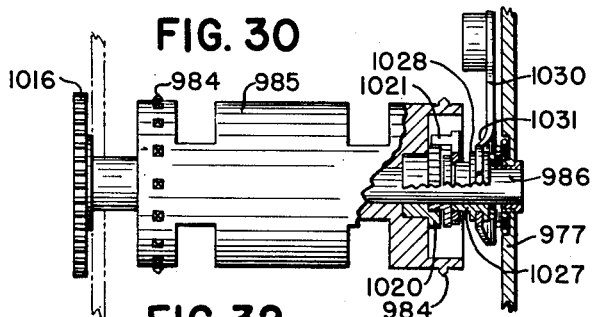
Fig. 30 is a detail view showing the feed drum for the perforated record with a part thereof broken away to illustrate the driving mechanism therefor.
Figure 31:
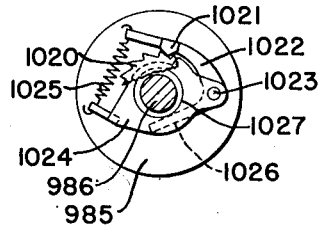
Fig. 31 is a detail view of a part of the driving mechanism for the perforated record strip feeding drum.
Figure 32:
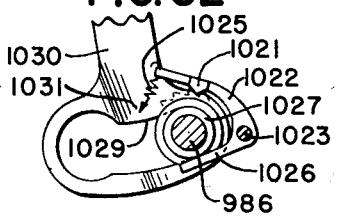
Fig. 32 is a detail view of a means to disconnect the perforator feeding drum from its driving means.
Figure 42:
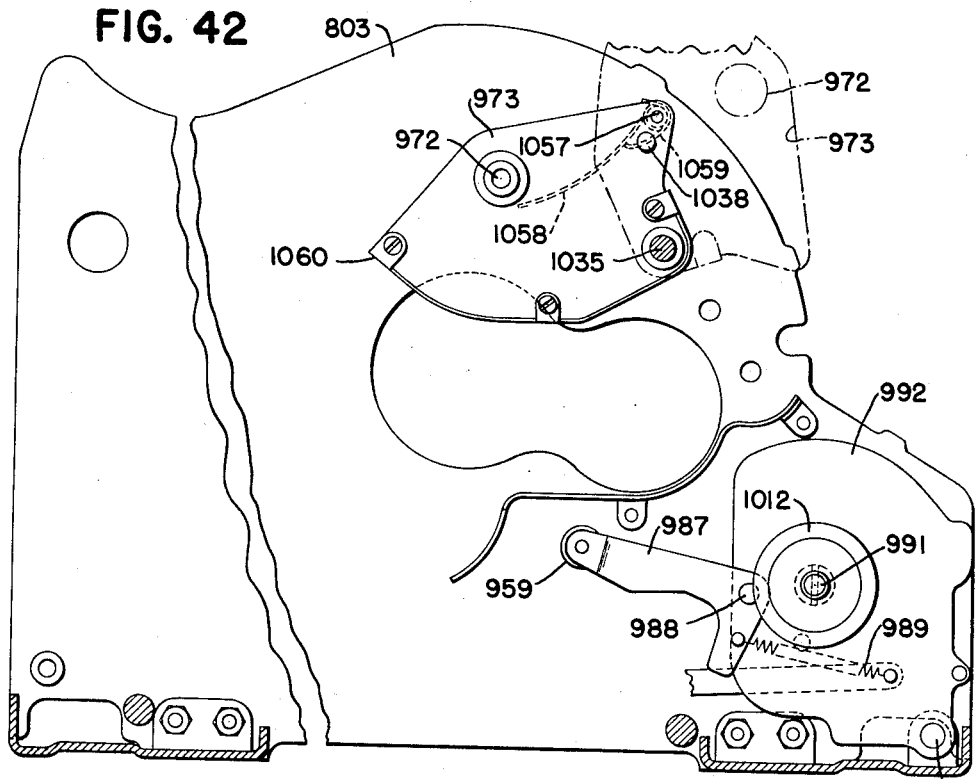
Fig. 42 is a detail view showing the elements of the perforating section of the machine which remain in the machine when the removable unit carrying the perforating mechanism is removed from the machine for inspection or repair.

The clutch mechanism for clutching the feed drum 985 to the shaft 986 is shown in detail in Figs. 30 and 31. As shown here, the right end of the drum 985 is recessed to receive a ratchet wheel 1020, which is normally engaged by the tooth 1021 of a pawl 1022. The pawl 1022 is pivoted on a stud 1023, carried by a plate 1024 secured to the shaft 986. A spring 1025 normally maintains a tooth 1021 in engagement with the ratchet wheel 1020, where it is locked by a finger 1026 of the pawl 1022 in engagement with the hub 1027 of a collar 1028. The collar 1028 is slidably mounted on the shaft 986 and is provided with an annular groove normally engaged by a slot 1029 (Figs. 32 and 41) of a cam arm 1030, which is provided with a laterally-extending cam portion 1031 (Fig. 30) for engagement with said groove. When the parts are in the position shown in Figs. 30 and 31, with the hub 1027 in engagement with the finger 1026, the tooth 1021 is locked in engagement with the ratchet 1020. Then, during a machine operation, when the shaft 986 is rotated in the manner hereinbefore described, the plate 1024, rotating the pawl 1022, causes the tooth 1021 to carry the ratchet 1020 and therefore the feed drum 985 therewith.

When the rocking frame 992 is rocked in a clockwise direction (Fig. 41) to render the receiving roll spool accessible, the cam arm 1030 is rocked counter-clockwise, together with the shaft 1032, journaled in the frames 976 and 977, to which it is pinned. This rocking movement of the shaft 1032 and the arm 1030 is obtained by an arm 1033, also secured to the shaft 1032, to the lower end of which is pivoted a link 1034, the opposite end of which link is pivoted to a rockable frame 992.

When the rockable frame 992 is rocked clockwise about the stud 1014 to render the receiving roll spool accessible, the link 1034 is moved to the right, thus rocking the arms 1033 and 1030 in a counter-clockwise direction to cause the cam 1031 on the arm 1030 to shift the collar 1028 to the right (Fig. 30) to withdraw the hub 1027 from engagement with the finger 1026 by moving said hub out of the path of movement of said finger. When the hub 1027 is out of the path of the finger 1026, the ratchet wheel is free to rotate independently of the disk 1024, and therefore the feed drum 985 can be rotated independently of the shaft 986. During such independent rotation of the feed drum 985, the pawl 1021 ratchets in and out of the ratchet teeth on the ratchet wheel 1020.

Machine release interlock

It is desirable to prevent release of the machine for operation when the rockable frame 992 is out of its normal position. To prevent such release, a slide 1040 (Fig. 41) is moved into the path of an arm 1041, secured to the machine release shaft 230 adjacent the frame 977 (see Fig. 47). The slide 1040 is moved into such position by a link 1042, having one end pivoted to the beforementioned arm 1033 and the opposite end pivoted to a bell crank 1043 pivoted on a shaft 1044, to which the slide 1040 is also pivoted.

When the rockable frame 992 is rocked clockwise (Fig. 41) and the link 1034 is moved to the right, the arm 1033 is rocked counter-clockwise to shift the link 1042 toward the right. Movement of the link 1042 to the right rocks the bell crank 1043 counter-clockwise to raise the slide 1040 into the path of movement of the arm 1041, and therefore the release shaft cannot rock to release the machine for an operation. When the rockable frame is again returned to its normal position, as shown in Fig. 41, the link 1034, the arm 1033, the link 1042, and the bell crank 1043 restore the slide 1040 into its normal position, as shown in Fig. 41, whereupon the machine can be released for operation.

It is also desirable to prevent operation of the machine when the perforated paper becomes exhausted, or torn, so that no machine operation can be performed without paper in the machine to receive the perforated data. To accomplish this end, a bell crank 1045, pivoted on a shaft 1046, is provided, which is moved into the path of the arm 1041 on the release shaft 230 when no paper is in the perforator section of the machine. The bell crank 1045 has connected thereto a link 1047, the lower end of which is secured to an arm 1048 pivoted on a stud 1049. Secured to the arm 1048 is an arm 1050, carrying the roller 982, normally overlying and supported on the perforated paper strip 970. A light spring 1051 normally maintains the roller 982 in contact with the top of the paper 970, where the arm 1045 is held out of the path of the arm 1041. Upon failure of the paper 970, due either to breakage or to the paper becoming exhausted, the spring 1051 rocks the arms 1048 and 1050 to lower the roller 982. This rocks the arms 1050 and 1048 counter-clockwise and shifts the link 1047 to the left to rotate the bell crank 1045 counter-clockwise into the path of the arm 1041. From this it is clear that, if there is a failure of paper due to tearing, or due to the exhaustion of paper in the machine, the machine is locked against releasing movement.

When the frame 992 is rocked clockwise to replace a roll of paper, or to repair a break in the paper, the link 1034, the arm 1033, the link 1042, and the bell crank 1043 raise the link 1040 as hereinbefore described. If at this time the bell crank 1045 is in the path of the arm 1041, due to the roller 982 having dropped because of a breakage in the paper, the link 1040 engages the bell crank 1045 and rocks the bell crank clockwise (Fig. 41) to lift the roller 982 out of the path of the paper when the breakage thereof is being repaired.

Supply roll support

The beforementioned rockable frame 973, in which the supply roll 971 is supported, is pivotally mounted on a shaft 1035. The rockable support 973 is held in the normal position, shown in Fig. 29, by a latch 1036 pivoted on a stud 1037 carried by the frame 976 (see Fig. 44). The latch 1036 is normally held in engagement with a stud 1038, carried by the rockable frame 973, by a spring 1053, having one end attached to a flange on the latch and the other end to a stud on the frame 976. A stud 1054 limits the movement of the latch 1036 by the spring 1053. The latch 1036 is provided with a finger piece 1055, by means of which the latch can be rocked clockwise to release it from the stud 1038. After the latch is released from the stud 1038, the frame 973 can be rocked into the position shown by chain lines in Fig. 42, where the arbor 972 for the supply roll is easily accessible for replacing the exhausted supply roll with a fresh roll. After the new supply roll has been inserted on the arbor 972, the rockable frame 973 is rocked back into the position shown in Fig. 29, and during such movement the stud 1038, engaging the edge 1056 of the latch, cams the latch downward against the action of the spring 1053 until the notch of the latch can again come into contact with the stud 1038, whereupon the rocking frame 973 is again latched in operated position.

Mounted on a rod 1057 (Fig. 42) is a spring-actuated tension plate 1058, which is urged into contact with the outer periphery of the supply roll by a spring 1059 to create sufficient tension to brake the rotating movement of the supply roll during the machine operation.

Figure 43:
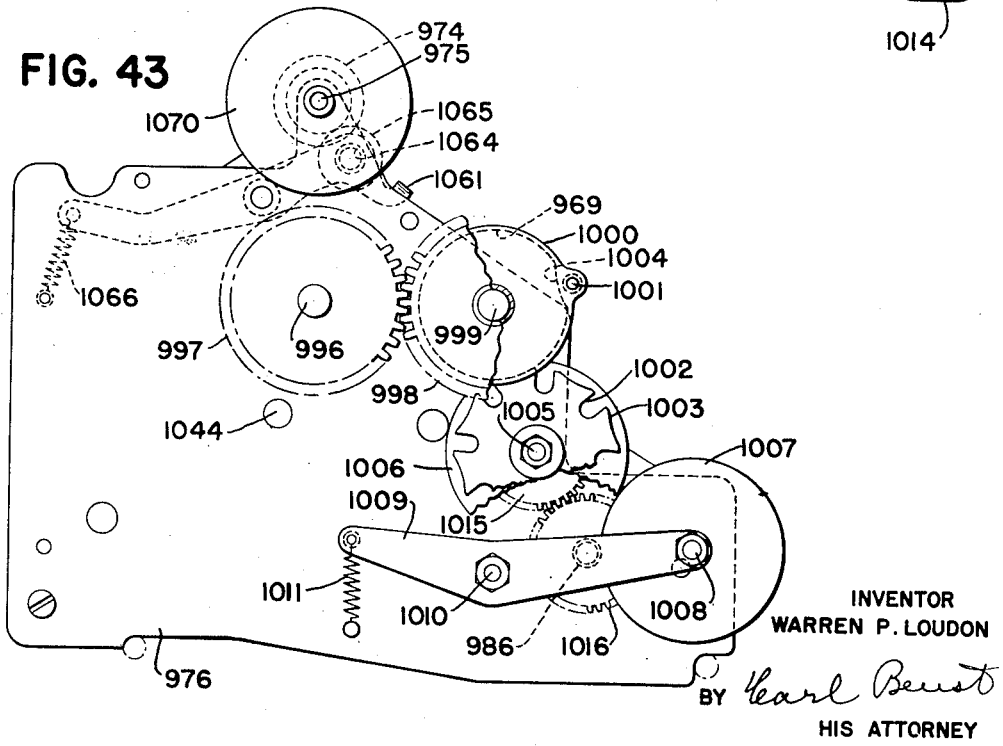
Fig. 43 is a detail view of the removable part of the perforating section of the machine.

The rockable frame 973 is provided with a yoke 1060, which normally overlies fingers 1060 of two arms 1062 pivoted on a shaft 1063. The two arms 1062 carry between them a shaft 1064, on which is mounted a roller 1065. The arms 1062 are urged counter-clockwise by springs 1066. One end of each is connected to a stud 1067 carried by each arm 1062, and the other end of each is connected to a stud 1068, one of which is carried by each frame 976 and 977. The yoke 1060 is so located in relation to the fingers 1061 that, when the rockable frame 973 is in its normal position, the roller 1065 is held out of engagement with the paper strip 970 and its guide roll 974. When the rockable frame 973 is moved into the chain-line position (Fig. 42), the yoke 1060 is withdrawn from contact with the fingers 1061, thus permitting the spring 1066 to raise the roller 1065 into engagement with the paper 970 and the roller 974. The position of the parts when the rockable frame 973 is moved to the chain-line position of Fig. 4 is shown in Fig. 43. A knurled disk 1070 (Figs. 43 and 46), secured to the shaft 975, provides a convenient means for feeding the end of the paper through the paper chute when a new supply of paper is threaded through the machine. To start the paper through the machine, the operator depresses the fingers 1061 and inserts the end of a new paper between the rolls 1065 and 974. Then, upon release of the fingers 1061, the spring 1066 causes the end of the paper to be gripped between the rollers 974 and 1065. Then, upon rotation of the knurled disk 1070, the paper is fed through the paper chute 978 into the chute 980, past the perforating mechanism up to the feed drum 985.

Receiving roll latch

The spool upon which the receiving roll 990 is mounted is provided with a latch for maintaining the arbor in position in the rockable frame 932. This latch is shown in Fig. 45. The arbor 972 for the receiving roll spool is provided with an annular groove, which is engaged by a square opening 1075 of a latch 1076. The latch 1076 is slidably mounted on two studs 1077 and is spring-urged downwardly (Fig. 45) by a spring 1078 to cause the square opening 1075 to engage the annular groove in the arbor. When it is desired to remove the arbor of the supply roll from the rockable frame 973, the operator grasps a finger piece 1079 of the latch 1076 and slides it upwardly to disengage the square opening 1075 from the annular groove in the arbor, whereupon the arbor can be withdrawn from the rockable frame 973.

Perforating code

Fig. 39 illustrates the code used to represent the various data for a ten-division code. The ordinals above the vertical lines indicate the data represented. For example, for a zero, no perforations are used. To represent "1," a perforation is made on the top line; "2" is represented by a perforation on the second line; "3" combines the perforation of 1 and 2, which results in a perforation in the first and second lines; "4" is represented by a perforation in the third line; and "5" is a combination of a 4 and 1 perforation, which results in a perforation on the first and third lines; "6" represents a combination of the perforations for the 4 and the 2, which results in perforations in the second and third lines; "7" is represented by a perforation in the fourth line; "8" is represented by perforations combining the perforations for 7 and 1, which results in a perforation in the top line and one in the fourth line; "9" is represented by a perforation which combines the perforations for 7 and 2, which results in perforations in the second line and in the ninth line. The code represented by Fig. 39 is for a ten-division monetary system. For a twelve-division monetary system, for example, for a "pence" order, the "10" is represented by a combination of the representation of 7 and 3, which results in three perforations, one in the top line, one in the second line, and one in the fourth line. "11" is represented by a combination of the perforations for 7 and 4, which results in perforations in the third line and in the fourth line.

The perforating control disk 821, as shown in Fig. 38, shows how the disk is constructed to obtain the above perforations. The disk is illustrated with the zero position on a horizontal line at the right, in which position no punch-operating projections are shown on the disk 821. However, the four possible positions assumed by such projections are shown in dotted lines in this figure. The diagonal lines which terminate with a digit indicate the position assumed when that particular data is set up at the perforating line.

Perforating mechanism

The perforating mechanism is shown in enlarged view in Fig. 37 and includes, in each order, four punches 1085, slidably mounted in a frame 1086, having flanges 1087 secured to a pair of arms 1088 (Fig. 35). Each punch is provided with a shoulder 1089, and a spring 1090 engages the under side of the shoulder 1089 at one end, and the bottom of the frame 1086 at its other end, to force the punch 1085 upwardly, where a second shoulder 1091 on the punch 1085 is arrested by the upper inner wall of the frame 1086. The punches 1085 project into openings in the bottom of the frame 1086, which are in alinement with openings 1092, formed in a frame 1093. The frame 1093 is provided with flanges 1094, by which it is also secured to the pair of arms 1088.

When the perforator selecting disks 821 are adjusted by their appropriate levers in the manner hereinbefore described, projections 1095 on the selecting disk 821 are selectively positioned above the punches 1085. After the selecting disks 821 have been properly positioned and the machine is operated, the arms 1088 are rocked to raise the punches 1085 into contact with whichever one or more of the projections 1095 have been moved in the path thereof. As the punches are raised, they come into selective contact with the projections 1095 and arrest the punches. Continued movement of the frame 1086 forces the selected punches 1085 downwardly through the paper and into the openings 1092 to perforate data on the strip in accordance with the setting of the selecting disks 821, as represented by the code (Fig. 39).

Figure 29:
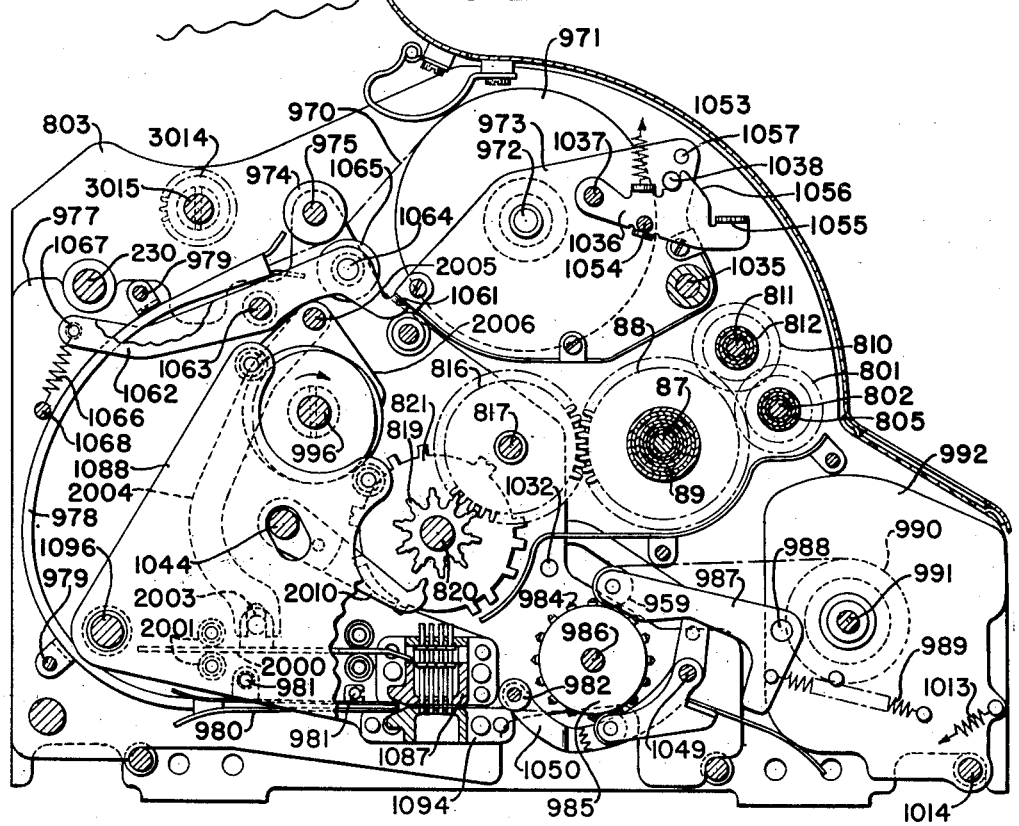
Fig. 29 is a sectional view taken through a perforating section of the machine.

The pair of arms 1088 are pivotally mounted on a shaft 1096 (Figs. 29, 33, and 35). The upper end of each arm 1088 is provided with a pair of rollers 1097, which are in engagement with a pair of cams 1098, there being a pair of cams 1098 provided for each arm 1088, as indicated in Fig. 34. The cams 1098 are secured to the beforementioned cam shaft 996, which shaft receives one clockwise rotation (Figs. 29, 33, and 35) each operation of the machine. Clockwise rotation of the cams 1098, coacting with the rollers 1097, rocks the arms 1088 first counter-clockwise and then clockwise. During the counter-clockwise movement of the arms 1088, the punches 1085 are rocked into engagement with the selected ones of the projections 1095 to effect the perforations in the manner just described.

When the arms 1088 are rocked clockwise to their home position, the springs 1096 will normally raise the actuated punches 1085 to the normal position, shown in Fig. 37. However, in the event any of these punches should stick, thus causing the punches to remain in the perforations of the strip and preventing the feeding thereof, a special means is provided to mechanically restore the punches into their home positions. This means includes a plate 2000 (Figs. 29, 33, and 35). The right-hand end of the plate is provided with a comb having teeth bent downwardly into a cam formation, which cam formation is equal to the space between the flanges 1089 and 1091.

During the operation of the machine, immediately after the perforations have been made and the arm 1088 is restored to its home position, the plate 2000 is moved toward the right (Fig. 35), whereupon the cam-formed comb 2000 enters between the punches 1085, cams whichever one may have become stuck, and moves it up to its home position.

The plate 2000 is mounted on rollers 2001 on each arm 1088, so that the plate is supported at each end by the rollers 2001. The plate 2000 has an ear 2002 formed thereon at each end thereof. A rod 2003 is supported between the two ears 2002. The lower bifurcated end of an arm 2004 engages the rod 2003. The upper end of the arm 2004 is pivoted on a shaft 2005 and is secured to a bell crank 2006, carrying a pair of cam rollers 2007. The cam rollers 2007 are in constant engagement with a pair of cam plates 2008 (see also Fig. 34), secured on the beforementioned shaft 996. When the shaft 996 receives its clockwise rotation (Fig. 35), the cam plates 2008, coacting with the rollers 2007, rock the bell crank 2006 and the arm 2004 counter-clockwise, which, through the rod 2003, shifts the plate 2007 toward the right (Fig. 35) to release the punches 1085 in the manner hereinbefore described.

Perforator selecting disk alining means

In order that the projections 1095 of the selector plates 821 are held in perfect alinement with the punches 1085, an aliner mechanism, shown in Fig. 36, is provided. The beforementioned gear 819, which is a part of the train of gears for setting the perforator selecting disks 821, has every other tooth omitted therefrom and an alining notch formed in the place thereof. An aliner 2010, pivoted on the beforementioned shaft 1044, engages the alining notches in the gear 819 during the machine operation, just prior to the perforating operation. Secured to the aliner 1010 is a bell crank 2011, carrying a pair of cam rollers 2012 engaging with a pair of cam plates 2013 (see also Fig. 34), and the cam plates 2013 are secured on the beforementioned cam shaft 996. When the cam shaft 996 is rotated clockwise during the machine operation, the cams 2013 rock the bell crank 2011 counter-clockwise, thus carrying the aliner arm 2011 into engagement with the aliner teeth of the gear 819. The timing of the cam plates 2013 is such that the aliner 2010 becomes effective to aline the selecting disks 821 just before the cam plates 1098 rock the perforating frame to effect a perforating operation.

Perforator confetti tray

In order to collect the confetti punched out of the perforated strip, a tray 2015 (Figs. 55 and 58) is provided, located directly beneath the punching mechanism.

The tray 2015 is provided with an angle runway, or support, 2016 on each side thereof, which angles project into slots formed in partition plates 2017, on which the cash drawers also are supported. The tray 2015 is maintained in its proper position by a latch 2018 engaging a bar 2014 secured to the two sides of the tray 2015 (see also Fig. 44). The latch 2018 is formed on one end of a yoke 2019, the other end of which yoke is provided with an arm 2020. The yoke 2019 is rotatably supported on a rod 2021, supported in a bracket 2022, supported on the base for the cash drawer cabinet 33 and in the frame 804, as shown in Fig. 44. The rear end of the tray 2015 is provided with an abutment 2023, which is moved into engagement with a spring 2024, carried on a bracket 2025, supported on the base member 33. When the tray 2015 is in latched position, the spring 2024 is slightly compressed. Means are provided to rock the latch out of engagement with the bar 2014, whereupon the spring 2024 forces the tray out of the cash drawer base far enough for the operator to grasp its front end to remove it from the machine to dispose of the confetti therein.

In order to move the latch 2018 from engagement with the bar 2014, the arm 2020 has pivoted thereto a slide 2026 (Figs. 44 and 55) slidably mounted on studs 2027 carried by the frame 804. The slide 2026 is urged upwardly by a spring 2028, one end of which is attached to the slide 2026 and the other end to a stud on the frame 804. The upper end of the slide 2026 is provided with a finger piece 2029, by means of which the operator can lower the slide 2026 against the action of a spring 2028 to rock the latch 2018 out of engagement with the bar 2014, thus permitting the spring 2024 to release the confetti tray 2015.

The finger piece 2029 is accessible through the door provided for giving access to the perforator section of the machine.

Printing mechanism

The machine as illustrated herein is provided with printing mechanism for printing totals directly from the totalizer, for printing on an audit tape, and for printing on an issuing receipt, as shown in Figs. 59, 60, and 61, respectively.

Total printing mechanism

The mechanism for printing the totals on an insertable slip, shown in Fig. 59, is located in the front of the machine adjacent the totalizer. The totalizer has coupled thereto a series of type wheels from which the total impressions are made manually without an operation of the machine. To obtain such a total printing, a slot 2040 is provided in the cabinet, as shown in Figs. 1, 2, 6, and 7, through which the slip is inserted. A total is printed from each of the four totalizers, and the insertable slip 2041 (Fig. 59) is inserted into the slot 2040 for each total-printing operation. Means is provided to select the proper line on which the total is to be printed, and, as shown in Fig. 59, the total of the A totalizer is printed in the line indicated by the letter A near the right-hand edge of the insertable slip 2041. The total from totalizer B is printed below that of A, and, inasmuch as the totalizer is interspersed, the total printed from the B totalizer is slightly offset. To print from the totalizer D, the slip is withdrawn and reversed, and, when the slip is viewed upside down from the position shown in Fig. 59, the total standing on totalizer D will be at the top of the slip and the total taken from totalizer E will be slightly offset therefrom and below the total D. The means for selecting the totalizer for printing the totals therefrom will be described presently.

When the insertable slip 2041 is inserted through the slot 2040, the slip is positioned between a printing platen 2042 and a type wheel 2043. The type wheels are carried on a shaft 2044 and are engaged by the before mentioned gears 145, which are coupled to the totalizer elements in the manner hereinbefore described, so that, when an amount is entered into the totalizer, the corresponding amount will be at the printing line of the type wheel 2043. Also, when the totalizer is reset to zero, the totalizer wheels 2043 will also be reset to zero.

A printing platen 2042 is provided for each set of type wheels 2043 of the same denomination, and the platens are selectively moved to come in alinement with the desired totalizer type wheels 2043; that is to say, with the A, B, D, or E totalizer type wheels. To selectively shift the platens 2042, they are mounted on a sliding plate 2039, having two slots 2045, each engaging a roller 2046. The rollers 2046 are mounted on a cross bar 2047, which joins two arms 2048, pivotally mounted on the beforementioned shaft 121. A spring 2049 is connected at each end to studs on the cross bar 2047, and the other ends are secured to the framework of the machine to maintain the hammer arms 2048 and the platens 2042 in the position shown in Fig. 7, wherein a cross yoke 2050, connecting the two arms 2048, engages a set screw 2051. The set screw 2051 provides a positive stop to limit the movement of the arms 2048 under the action of the springs 2049.

In order to select a set of totalizer wheel type elements 2043, the slide 2039 is moved longitudinally as guided by the roller 2046. To facilitate the movement of the slide 2039, a knob 2052 is mounted thereon and projects upwardly in front of the machine cabinet so as to be accessible to the operator. As shown in Fig. 4, an extension 2053 of the cross bar 2047, projecting out of the cabinet of the machine, is provided with four letters—A, B, D, and E—representing the four clerks' totalizers. Shifting the slides longitudinally, so as to bring the knob 2052 opposite the letter representing the totalizer to be selected, positions the platens 2042 opposite the corresponding type wheels 2043.

An aliner ball 2068 is held in engagement with a notch 2069 (Figs. 4 and 5) to maintain the slide 2039 in proper alinement. The ball 2068 is spring-urged into engagement with the notch by a spring 2070. The ball 2068 and the spring 2070 are located in an opening formed in the extension 2053, where they are held securely by a screw 2071.

After the proper set of totalizer wheels 2043 have been selected, the operator strikes the projection 2053 with his hand, thus carrying the printer platens against the inserted slip to take an impression from the selected type wheels 2043 through the medium of an inking ribbon (not shown).

Shifting of the slide 2039 longitudinally to select the proper set of type wheels 2043 also positions a stop in the machine to properly aline the insertable slip 2041 so that the printing will be effected on the line corresponding to the line marked with the letter A, B, D, or E which corresponds to the setting of the knob 2052. Fig. 6 shows the stop mechanism in detail and set for printing on the line A. When the stop is in the position shown, the ends 2055 of a pair of rods 2056 lie in the path of the insertable slip 2041 and position the slip for printing on line A. The rods 2056 are slidably mounted, and suitable openings are provided in the cross bar 2047 of the hammer. Secured to the outer end of each rod 2056 is a cylindrical member 2057, which is threaded at its bottom to be secured to the rod 2056. The upper end of the cylindrical member 2057 projects through a cam slot 2058 in the slide 2039.

When the B set of totalizer type wheels is selected and the slide 2039 is moved longitudinally leftwardly into the B position, the cam slot 2058, acting on the cylindrical member 2057, withdraws the end 2055 from the path of the insertable slip 2041, thus permitting the insertable slip to drop into contact with a shelf 2059. The shelf 2059, being lower than the ends 2055 of the rods 2056, permits the slip to drop far enough to make the impression on the line B of the insertable slip 2041 (Fig. 59).

When the total is printed from the totalizer D, after the slide 2039 has been shifted to bring the knob 2052 opposite the letter D, the cam slot 2058 will again have permitted the ends 2055 to move inwardly to the position shown in Fig. 6. Thereafter, when the insertable slip 2041 is inverted and again dropped into the slot 2040, the line D of the insertable slip 2041 is at the printing line.

Further shifting of the slide 2044 leftwardly (Fig. 4) causes the cam slot 2058 to again withdraw the ends 2055 from the path of the insertable slip 2041, thus permitting the inserted slip 2041 to drop low enough to bring the line D of the insertable slip 2041 to the printing line.

Normally a shutter 2060 (Fig. 8) lies beneath the slot 2040 to prevent the insertion of an insertable slip into the machine to prevent unauthorized persons from taking total printings from the totalizers. Before an insertable slip can be dropped into the slot 2040, the shutter 2060 must be moved out of the path of the slip. To accomplish this result, the shutter 2060 is formed on a yoke 2061 rotatably mounted on the before mentioned shaft 2044. Secured to the yoke 2061, through the medium of two studs 2062, is a lever 2063. The lever 2063 has secured thereto one end of a link 2064, the other end of which is provided with the beforementioned stud 314. The link 2064 is guided in its up-and-down movement by a stud 2065 carried by a plate 2066, said stud projecting through a slot 2067 of the link 2064.

When the unit control lock key 292 is moved to the "Reset" position in the manner hereinbefore described, and the hook is disengaged from the stud 314, the lever 2063 is free to be rocked clockwise. Clockwise movement of the lever 2063 carries with it the shutter 2060, thus removing it from beneath the slot 2040 and permitting the insertion of the slip into the machine for receiving the impressions in the manner just described.

As hereinbefore mentioned, when the unit control lock key 292 is moved to the reset position, the reset shaft 320 is accessible, so that the totalizer can be reset to zero. It has also been described how the segment 370, when being moved by the clerk's lever 117, causes the lug 377 on the bell crank 374 to be positioned into the path of the reset key when the clerk's lever is in one of its intermediate positions, so that the totalizer cannot be reset unless the coupling pawls 128 are in proper alinement with the totalizer wheels. In order to prevent insertion of the reset key onto the reset shaft 320 during the series of total-printing operations, a means is provided to prevent withdrawal of the flash 2060 from beneath the slot 2040 when the clerk's lever 117 is in any one of its four totalizer selecting positions.

This interlock is arranged so that the shutter 2060 can be withdrawn only when the clerk's lever 117 is in the position intermediate the A and B position. This position of the lever is maintained by a notch 2030 (Fig. 12), with which a stud 73 on the aliner arm for the clerk's bank engages. To prevent rotation of the lever 2063 while the clerk's lever is in any of its four totalizer selecting positions, the left-hand totalizer frame 140 (Fig. 4) is provided with a projection 2081 (Fig. 8) normally lying in the path of a lug 2082 on the rear end of the lever 2063.

When the clerk's lever 117 is moved to the position intermediate its A and B position, the projection 2081 is alined with an annular notch 2083, as shown in Fig. 4, whereupon the lever 2063 is free to be rotated to withdraw the shutter 2060 from beneath the slot 2040, and from the path of the insertable slip. As before mentioned, when the clerk's lever 117 is in a position intermediate its totalizer selecting positions, the cam 371, acting on the roller 372 of the plate 374, causes the lug 377 to block insertion of the reset key on the reset shaft 320. Therefore, when the slot 2040 is open to receive an insertable slip, the reset shaft cannot be turned.

The yoke 2061 is also provided with a projection 2088 (Figs. 4 and 8) lying in the path of studs 2087 on the hammer cross bar 2047. Therefore, as long as the shutter 2060 is in its closed position, the hammer cannot be operated, since the rods 2087 on each end thereof engage with the projections 2088. However, when the yoke 2061 is rocked in a clockwise direction to withdraw the shutter 2060 from beneath the slot 2040, the projections 2088 are withdrawn from the path of the rods 2087, thus freeing the printing hammer for operation.

*Audit strip and receipt printer*

The machine is provided with a printing mechanism mounted on the left side frame 31, which printing mechanism records data on a receipt 470 (Fig. 61) and on an audit strip 471 (Fig. 60).

The data printed on the issuing receipt includes a line of entries 472 (Fig. 61), which includes symbols identifying the clerk and the class of entry made, the amount of the transaction entered, and the customer's account number, together with data printed on line 483, which includes a date, a number identifying the machine from which the receipt is issued, and a consecutive number. Electros are provided in the printer for printing the advertising matter illustrated in Fig. 61.

The data printed on the audit strip 471 (Fig. 60) includes the customer's account number, a symbol representing the clerk entering the transaction, a symbol identifying the class of entry made, the amount of the transaction, and the consecutive number.

The receipt paper is fed from a supply roll 473 (Fig. 48), rotatably mounted on a stud 474, carried by the left side frame 31. The web of the receipt paper 475 is fed from the supply roll 473 around an ink well 476 and over a guard 477, between feed rollers, hereinafter described, and through a chute 478. A stationary knife 469, mounted on the chute 478, is provided for tearing off the receipt 470 after the receipt has been issued from the machine.

An endless ribbon 479 is provided for expediting the printing of the data from a group of type wheels mounted on the stud 92, from consecutive number type wheels, from manually settable date printing wheels, and from type wheels to identify the store by a number or symbol, mounted on a stud 497 (Fig. 52A).

*Receipt printing mechanism*

To record the impressions on the receipt paper from the type carriers on the studs 92 and 497, a hammer 480 (Figs. 48, 49, and 50) is provided. The hammer 480 is provided with a platen 481, for printing from the type carriers on the stud 92, and a platen 482 for printing from the type wheels on the stud 497. The hammer 480 is notched to receive the forward end of an arm 485, and a stud 486, extending through the hammer 480 and the free end of the arm 485, provides a pivot point for the hammer 480. The arm 485 is pivoted on a stud 487, carried by the side frame 31 of the machine. The arm 485 has, mounted thereon, a square stud 488, which normally lies in the path of a second square stud 495 (see Fig. 49) carried by the forward end of a link 496. The square stud 495 is normally engaged by a lever 489 pivoted on the stud 487, the lower end of which lever is provided with an anti-friction roller 490, held in engagement with a cam 491, loosely mounted on the cam shaft 500, by a spring 492. The shaft 500 is driven from the main shaft 37 through the beforementioned train of gears including gears 994 and 995, shaft 996, and wide gear 997 (Fig. 47). The gear 997 meshes with a gear 499 secured to shaft 500 (see also Fig. 53). The cam 491 is clutched to the shaft 500 by a clutch mechanism shown in Fig. 27 and described later.

Operation of the machine with the square stud 495 overlying the square stud 488 operates the printing hammer 480 in the following manner. Counter-clockwise rotation of the cam 491 rocks, by engagement with the anti-friction roller 490, the lever 489 clockwise against the action of the spring 492. Clockwise rotation of the lever 489 carries the stud 495 against the stud 488, thus rocking the arm 485 clockwise to lower the platens 481 and 482 to carry the web 475 and the ribbon 479 against the type carriers to make an impression on the receipt paper. After the impression has been made, and when the cam 491 passes beyond the roller 490, the spring 492 restores the hammer 480 into its original position.

The hammer 480 is provided with a guide slot 493 engaging the stud 494 carried by the left side frame 31. The slot 493, cooperating with the stud 494, guides the hammer in a vertical path when the arm 485 is rocked clockwise to make impressions.

The square stud 495 is movably mounted with the link 496 for disabling the printing hammer when desired. As illustrated in Fig. 50, the stud 495 is in its disabled position, and therefore, when the cam 491 rocks the lever 489, the stud 495 does not engage the stud 488; therefore the arm 485 is not operated. When it is desired to operate the hammer 480, the square stud 495 is moved to the right (Fig. 50) until it comes over the stud 488 in the manner described hereinafter.

Receipt feed and electro mechanisms

After the impression has been made by the hammer 480, the receipt paper web 475 is fed forwardly through the opening in the chute 478, and, while said receipt web is being fed, an electro device prints various data of descriptive, or advertising, nature on the face of the succeeding receipt, as illustrated in Fig. 61. The receipt feeding and electro mechanism will now be described.

Referring to Figs. 51 and 53, secured to the cam 491 is a partial gear 501, the teeth of which cooperate with the teeth in a gear 508 loose on a stud 503, and said gear 508 meshes with a gear 502 loose on the stud 497. The gear 502 meshes with a gear 504 on the shaft 92. The gear 504 meshes with a gear 505 rotatably supported on a stud 503 secured in the side frame 31. The gear 505 meshes with a gear 506 secured to a feeding roller 510, rotatably mounted on a shaft 507 mounted between the side frame 31 and a printer plate. The feeding roller 510, coacting with a pressure roller 512, provided to engage the feeding roller, cooperates to feed the receipt web 475. The pressure roller 512 is mounted between two bell cranks 513 pivotally mounted on the stud 494. A link 514 connects each bell crank 513 to a rod 515 (Fig. 48). The ends of the rod 515 are loosely engaged with the links 514 to permit independent action of each link 514 and each bell crank 513, so that each end of the pressure roller 512 can receive independent movement, to obtain a firm contact between the pressure roller and the feed roller. A spring 516 is connected to the rod 515 midway between its two ends. A rod 517 is carried by two arms 518, which arms are connected by a yoke 519. The yoke 519 supports a printing platen 520, which platen is provided to take impressions from a rotatable electro roll 521, having a gear 508 secured thereto, and the gear 508 meshes with the beforementioned gear 502. The yoke 519 is held against an adjustable screw 522 by a spring 523 stretched between a stud on one arm 518 and a stud in an arm 524 pivoted on a stud 526, on which the arms 518 are also pivotally mounted. A spring 527, connected to a stud on the arm 524, maintains a stud 525 on said arm 524 in engagement with a cam plate 528 rotatably mounted on a stud 530.

The cam 528, in cooperation with the stud 525, maintains the arm 524 and the adjusting screw 522 in such contact with the yoke 519 as to maintain the electro printing platen 520 in printing position. When in this position, the studs on the arms 518 maintain the links 514 in position to resiliently contact the tension rollers 512 with the feed disks 510. When the parts just described are in the position shown in Fig. 48, under control of the cam plate 528, the rod 517 is located in slots 531 in such relation to the left-hand ends of said slots as to permit the springs 516 to maintain the pressure roller 512 in contact with the feeding roller 510.

With the pressure roller 512 resiliently held against the feed roller 510, when the machine is operated, the cam shaft 500, through the clutch (later described) rotates the gears 501, 502, 504, 505, 506, and 508, and the feeding roller 510 feeds the receipt paper out of the machine. During this operation, the gear 502 rotates the electro 521 to cause the advertising matter to be printed on the receipt paper.

In order to provide time for the printing hammer 480 to take its impression before the receipt is fed out of the machine, the gear 501 has a section of its teeth omitted, and a plate 532 is secured thereto, which, in cooperation with the cut-away portion 533 on the gear 508, maintains the gear 508 against rotation until the plate 532 passes beyond the cut-away portion 533. After the cut-away portion 533 is free from the gear 508, the partial gear 501, acting through the train of gears 502 to 506, rotates the feeding roller 510. During the operation, the gear 502 rotates the electro cylinder to make the impressions on the receipt paper for the next receipt to be issued.

Printer and feed throw-off

Two means are provided to prevent the printing and issuing of a receipt. One means is a manually set lever, and the other means includes an automatic means controlled by the transaction lever 200 when it is moved into its ninth position.

Manual receipt printer and feed throw-off

When it is desired to operate the machine without issuing a receipt, the printer platen 480 and the feed mechanism can be disabled manually, by rotating the cam plate 528 (Figs. 48 and 49) prior to a machine operation. To facilitate the adjustment of the cam plate 528, a knob 536 is provided thereon, which knob projects through the cabinet of the machine. The full-line position (Fig. 49) of the knob 536 indicates the position which the cam plate assumes when the printer hammer and the feed mechanism are operated. As shown in this figure, the square stud 495 lies over the square stud 488, and therefore, when the machine is operated, the square stud 495, acting on the square stud 488, operates the printing hammer in the manner described above. If it is desired to disable the printing mechanism, the operator moves the knob 536 to the dot-and-dash line position shown in Fig. 49. This rotates the cam plate 528 and causes a cam surface 537 thereon to coact with the stud 525 and move the arm 524 counter-clockwise under action of the spring 527. The rotation of the cam plate 528 is arrested when a node 539 thereon comes into contact with the stud 525. Counter-clockwise movement of the arm 524, through the spring 523, lifts the arms 518 to move the electro platen 520 into ineffective position. Simultaneously, the arms 518, acting on the rod 517, shift the links 514 leftwardly (Fig. 48) to rock the bell cranks 513 counter-clockwise to raise the pressure roller 512 out of engaging position with the feed roller 510. Also simultaneously with the counter-clockwise movement of the rod 517, the link 496 (Fig. 49) is moved leftwardly to move the square stud 495 from the position shown in Fig. 49 to the position shown in Fig. 50, wherein the square stud 495 no longer overlies the square stud 488. Subsequent operation of the machine when the main cam 491 is rotated causes the lever 489 to rock the square stud 495 idly, and therefore the printing hammer 480 will not be operated to make an impression. Also the operation of the feeding roller 510 is idle, since the tension rollers 512 are not engaged therewith.

Automatic receipt printer and feed throw-off

Figure 27:
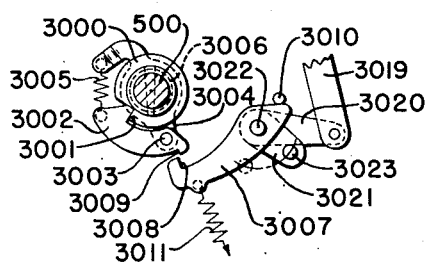
Fig. 27 is a detail view of a clutch mechanism for disabling the receipt printing and issuing mechanism.

As above mentioned, the gear 501 (Fig. 51) for operating the receipt issuing mechanism, and the cam 491 for operating the receipt printing hammer, are loosely rotated on the shaft 500, and the gear 501 and the cam 491 are clutched to the shaft 500. The clutch mechanism is normally effective, but, when the transaction lever 200 is moved into its "ninth" position—that is to say, its lowermost position—a means is automatically adjusted to throw off the clutch and thereby prevent rotation of the gear 501 and the cam 491 during the subseqeunt machine operation, and therefore during such operations no receipt will be issued from the machine. The clutch for controlling the receipt issuing mechanism is best illustrated in Figs. 26, 27, and 53. Secured to the shaft 500, adjacent the left side frame 31, is a clutch disk 3000. The clutch disk 3000 is provided with a shoulder 3001, engaging with a toe on a clutch pawl 3002, pivotally mounted on a stud 3003, carried by a disk 3004, loosely mounted on the shaft 500. A spring 3005, having one end connected to an upstanding arm of the disk 3004, and the other end connected to the clutch pawl 3002, normally maintains the finger of the pawl in engagement with the shoulder 3001. The disk 3004 is connected to the gear 501 and the cam 492 by a sleeve 3006.

With the parts in the positions shown in Fig. 27, when the shaft 500 rotates in a clockwise direction, the clutch disk 3000, engaging the clutch pawl 3002, rotates the disk 3004, the sleeve 3006, the receipt web feeding gear 501, and the printing cam 491 to effect their feeding and printing operations in the manner hereinbefore described.

When the transaction lever 200 is moved into its "ninth" position, a pawl 3007 (Fig. 27) is rocked clockwise to bring a shoulder 3008 into the path of a toe 3009 of the clutch pawl 3002. Thereupon, upon rotation of the shaft 500, the toe 3009, being held by the shoulder 3008, causes the clutch pawl 3002 to be withdrawn from engagement with the shoulder 3001 of the disk 3000, and therefore the receipt issuing and printing operating mechanism will be disabled.

The pawl 3007 is normally held in the position shown, with a tail engaging with a stud 3010 by a spring 3011. When the transaction lever is moved out of the "ninth" position, the spring 3011 withdraws the shoulder 3008 from engagement with the toe 3009, and therefore the pawl 3002 again becomes effective to cause the receipt issuing and printing mechanism to operate.

The position of the pawl 3007 is controlled by a transaction lever 200. As hereinbefore described, when the transaction lever is moved, a link 208, connected thereto (see also Fig. 28), rotates the transaction indicator setting segment 3012, secured to the shaft 75. Also secured to the shaft 75 is a segment 3013. The segment 3013 lies just to the right of the machine frame 29 (see also Fig. 47). The segment 3013 meshes with a pinion 3014 secured on a shaft 3015, supported by the machine frames 28 and 29. Also secured to the shaft 3015 is a gear 3016. The gear 3016 lies just to the left of the frame 28. The gear 3016 meshes with a segment 3017 (Figs. 28 and 47) secured to the beforementioned shaft 903, which shaft is in axial alinement with the beforementioned shaft 75. Also secured to the shaft 903 is an arm 3018 (Figs. 26 and 28) to which is pivoted the upper end of a link 3019, the lower end of which is pivoted to an arm 3020 (Fig. 27). Secured to the arm 3020 is a second arm 3021, and both of the arms 3020 and 3021 and the beforementioned pawl 3007 are pivoted on a stud 3022. The arm 3021 has a stud 3023 secured thereto, which projects into the plane of the pawl 3007. As the transaction lever is moved toward its "ninth" position, the stud 3023 gradually moves toward the pawl 3007, and, as the transaction lever moves from its "eighth" position into its "ninth" position, the stud 3023 engages with and moves the pawl 3007 around its pivoted stud 3022 to move the shoulder 3008 into the path of the toe 3009 of the clutch pawl 3002 to disable the receipt printing and issuing mechanism in the manner hereinbefore described.

Printing hammer latch

A latch 540 (Fig. 50) is provided to lock the printing hammer 480 against fraudulent operation when the printing hammer is in home position. The latch 540 is pivotally mounted on a hub carried on a stud 497 in the frame 31 and is normally urged counter-clockwise by a spring 541. The latch 540 is provided with a stud 542, which rests on the cam 491 when the machine is in home position. The latch 540 is provided with an upwardly-extending arm, which is in engagement with a downwardly-extending toe 543 on the hammer operating arm 485 when the machine is in its home position. When the cam 491 starts to rotate upon starting the machine in operation, it moves from the path of the stud 542, whereupon the spring 541 rocks the latch 540 counter-clockwise to free the hammer arm 485 for operation. Near the end of the machine operation, the cam 491 again engages the stud 542 and raises the latch 540 in the position in which the upwardly-extending arm of the latch 540 engages the toe 543, thus preventing any manipulation of the hammer 485 when the machine is at rest.

Consecutive number mechanism

In addition to the amount, account number, and clerk type wheels, the studs 93 and 497 each support a plurality of consecutive number type wheels 3025 and 3026, respectively. The teeth of the type wheels 3025 cooperate with similar teeth in drive gears similar to the drive gears 809. The type wheels 3026 on the shaft 497 are secured to the ends of sleeves 3027, to which are also secured gears 3028. The gears 3028 mesh with intermediate pinions 3029, having teeth which mesh with the drive gears 809 for the consecutive number mechanism. The consecutive number drive gears 809 are secured to ratchet wheels 550, rotatably mounted on a bearing for the shaft 814 (Fig. 52A). The teeth of the ratchet 550 cooperate with graduated tines of a feed pawl 551, pivoted on a stud 552 on a yoke 553, the arms of which straddle the ratchets 550 and the consecutive number drive gears, to which the ratchets are secured. The yoke is rotatably supported by the shaft 814. A spring 554 urges the yoke 553 counter-clockwise into contact with a stationary stud 555 in the printer frame. An extension of the yoke 553 carries a stud 556, which cooperates with the periphery of a cam 557 secured on the shaft 500 (see also Fig. 53). Counter-clockwise rotation of the shaft 500 (Fig. 48) causes the high point of the periphery of the cam 557 to engage the stud 556 and rock the yoke 553 clockwise to advance the consecutive number one step each machine operation. The feeding of the consecutive number type wheels occurs after the hammer 480 has completed its printing stroke.

Type wheel aliner mechanism

Before the hammer 480 makes its printing stroke, a cam 558 (Fig. 48), fast on the shaft 500, in cooperation with an upturned extension 559 of an aliner 560 loose on a stud 561 in the side frame 31, rocks said aliner clockwise against the action of a spring 562 and engages said aliner with the teeth of the gears, which drives the amount type wheels to lock said type wheels against movement during printing operation of the hammer 480. After the impression has been completed, the contour of the cam 558 permits the spring 562 to disengage the aliner 560 from the gears 82.

Inking ribbon mechanism

The beforementioned endless ribbon 479 is fed around a felt feed roller 565, rotatably mounted on a stud 566 carried by a ribbon frame plate (not shown). From the roller 565, the ribbon is guided through the printer mechanism in the usual manner.

The ribbon is fed step by step during machine operations by a pawl 580 pivoted on the upper end of a lever 581 supported on a stud 582 carried by the left side frame 31. A link 583, pivoted to the lever 581, connects said lever to the aliner 560. When the cam 557 actuates the aliner 560, the link 583 rocks the lever 581 first clockwise and then counter-clockwise (Fig. 48). During the clockwise movement of the lever 581, a pawl 580, engaging a ratchet 584 secured to the felt roller 565, rotates the roller clockwise one step. During the counter-clockwise movement of the lever 581, the pawl 580 ratchets over the ratchet wheel 584. A spring 585, stretched between the pawl 580 and a locking pawl 586, maintains the said pawl in constant engagement with the ratchet wheel 584. The locking pawl 586 prevents backward rotation of the felt roller when the feed pawl 580 is returned to its home position.

The ribbon 479 is constantly replenished with a fresh supply of ink from the beforementioned ink well 476, mounted on the left side frame 31 by means of screws 589. A wick 590 (Figs. 20 and 48) lies in the ink well 476, and the free end lies on a flange 579 of a roller 592. The flange 579 is held in constant engagement with a felt roller 593 supported in a yoke 594. The yoke 594 comprises two arms 595 and is pivoted on the beforementioned stud 548. The left arm 595 of the yoke 594 is provided with an upstanding projection, to which one end of a spring 596 is hooked, the other end being hooked to a spring clip mounted on the left side frame 31. The spring 596 acts to constantly maintain the flange 579 in contact with the roller 593 and the roller 593 in contact with the roller 565.

The wick 590 supplies ink to the flange 579. The ink is transmitted to the felt roller 593, where the ink is dispersed and from which the ink is transmitted to the ribbon 479 and the felt roller 565. In order that perfect contact may be maintained between the rollers 593 and 565 and between the flange 579 and the roller 593, the roller 593 is mounted in slots in the arms 595 to provide for independent movement of the roller when the yoke is pulled in a clockwise direction. Thus the spring forces the flange 579 against the roller 593 and the latter against the roller 565.

In order to prevent unnecessary wear on the felt roller 593 due to the narrow contact between the flange 579 and the roller 593, two additional flanges 597 (Fig. 20) are provided on the roller 592, which also bear on the felt roller 593, thus distributing the force of the spring 596 on the felt roller 593.

The ink well 476 is provided with a removable cap 598, through which the ink well can be supplied with ink when needed.

A tray 599 is formed on the bottom of the ink well 476, which tray extends below the flange 579 on the roller 592 to catch the ink drippings that may drip therefrom.

Audit tape mechanism

The machine is provided with an audit tape printer on which all entries made in the machine are recorded. The audit tape 605 is fed from a supply roll 606 mounted on a stud 607. From the supply roll 606, the audit tape is fed around a roller 608 to a roller 609, and thence to a receiving spool 610. The roller 608 is mounted on the free ends of a pair of levers 611 pivoted on a stud 612 carried by the side frame 31. The levers 611 are rockable, and one is provided with a slot 613, through which a stud 614 on the side frame 31 projects to guide the levers 611 in their rocking movements. The roller 609 is supported by a pair of levers 615 pivoted on a stud 616 carried by the left side frame 31. The upper end of one of the levers 615 is guided in its movement by a washer 617 on a stud carried by the left side frame 31. A link 618 connects the two levers 611 and 615 for unitary rocking movements for a purpose hereinafter described. The spool 610 has secured thereto a notched wheel 619, by which the spool is rotated step by step to feed the audit tape 605 one step during each machine operation. To rotate the notched wheel 619, an arm 620 is secured to the cam shaft 3103. The cam shaft 3103 is rotated by the beforementioned gear 499 (Figs. 26 and 53) by a train of gears including a pinion 3104 secured to a short shaft 3105 journaled in a bearing in the frame 28. Also secured to the shaft 3105 is a pinion 3106, meshing with a gear 3107 on a stud 3108 in the frame 28. Also meshing with the gear 3107 is a gear 3109, secured to the cam shaft 3103. During each machine operation, the cam shaft 3103 receives one clockwise rotation (Fig. 48). After the impression has been made on the audit tape, the arm 620 enters a notch in the notched wheel 619 and rotates the notched wheel 619, together with the receiving spool, one step, to line-space the printed data. A spring-actuated retaining pawl 621 is pivotally mounted on a stud 622 on the left side frame 31. The retaining pawl is urged into cooperation with a notch in the notched wheel 619 to maintain the notched wheel and the receiving spool 610 in position.

Audit strip printing hammer

A printing hammer 625, pivoted on the stud 561 carried by the left side frame 31 of the machine, is provided to take impressions from the type wheels 91 onto the audit tape 605. The spring 562 normally maintains a roller 628 on the printing hammer in engagement with a cam 629 mounted on the cam shaft 3103.

Shortly after the machine starts to operate, the cam 629, rotating in a clockwise direction (Fig. 48), engages the roller 628 and impinges the ribbon 479 and the audit tape 605 against the type characters set up on the type wheels 91 to make an impression on the tape.

In order to prevent fraudulent manipulation of the printing hammer when the machine is at rest, the hammer 625 is provided with a rod 630 normally coacting with the cam 629 to prevent manual counter-clockwise movement of the hammer 625 to make a fraudulent impression.

*Audit tape shifting mechanism*

The machine is provided with a means for shifting the audit tape from the printing line to a line where the audit tape is visible, so that the last impressions can be read through a window provided therefor. To obtain this shifting movement, the levers 611 and 615 are connected together by the aforesaid link 618 and are rockable to shift the audit tape from the reading position into a printing position and back to reading position. To shift the levers 611 and 615, a link 631 is provided. The link 631 is connected to one lever 611 by a pin-and-slot connection 632 and to the lever 615 by a stud 633. Intermediate its ends, the link 631 is provided with two antifriction rollers 634, which coact with a cam 635 on the cam shaft 3103. When the machine is operated, the cam 635, acting on the rollers 634, shifts the link 631 first to the left (Fig. 48) and then back to the right to home position. When the link 631 is shifted leftwardly, the levers 615, together with the link 618 and the levers 611, are rocked likewise. The length of the levers 611 from their pivot points 612 to the roller 608 is shorter than the distance between the pivot point 610 and the sleeve 609 on the levers 615. Therefore, as the levers 611 and 615 rock counter-clockwise, the sleeve 609 will give up slack in the audit tape 605 and permit the lever 611 to take up said slack to thereby shift the audit tape to present the next printing position to the printing line. After the impression has been taken, the cam 635, reversing the movement of the levers 611 and 615, shifts the audit tape to the right (Fig. 48) to restore the audit tape to its original position, and simultaneously therewith the audit tape has been shifted back to its original position, the beforementioned arm 626, coacting with the notched wheel 619, spaces the audit tape one step to line-space the printing.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a machine of the class described having a receipt printing and issuing mechanism, the combination of a main operating means; a second operating means for the receipt printing and issuing mechanism; a clutch connecting the second operating means to the main operating means; a plurality of manipulative devices for setting data recording elements in the receipt printing and issuing mechanism; a special manipulative device for setting symbols in the receipt printing and issuing mechanism and movable into a plurality of setting positions; means to render the clutch ineffective; and means operable by the special manipulative device when moved into one of said setting positions to actuate the last-named means to prevent the printing and issuing of a receipt.

2. In a machine of the class described having a receipt printing and issuing mechanism, the combination of a main operating means; a second operating means for the receipt printing and issuing mechanism; a clutch connecting the second operating means to the main operating means; a plurality of manipulative devices for setting data recording elements in the receipt printing and issuing mechanism; a special manipulative device for setting symbols in the receipt printing and issuing mechanism and movable into a plurality of setting positions; means movable into engagement with an element of the clutch to disable the printing and issuing mechanism; and connections operated by the special manipulative device to move the last-named means into engagement with said element of the clutch when the special manipulative device is moved into one of said setting positions.

3. In a machine of the class described having a receipt printing and issuing mechanism, the combination of a main operating means; a second operating means for the receipt printing and issuing mechanism; a clutch connecting the second operating means to the main operating means; a plurality of manipulative devices for setting data recording elements in the receipt printing and issuing mechanism; a special manipulative device for setting symbols in the receipt printing and issuing mechanism and movable into a plurality of setting positions; said clutch comprising a notched disk and a clutch pawl normally engaging the notched disk; a member movable into engagement with the clutch pawl to disengage the clutch pawl from the notched disk to thereby disable the receipt printing and issuing mechanism; and means operable by the special manipulative device when moved into one of said setting positions to move the member into said engagement with the clutch pawl.

4. In a machine of the class described having a receipt printing and issuing mechanism, the combination of a main operating means; a second operating means for the receipt printing and issuing mechanism; a clutch connecting the second operating means to the main operating means; a plurality of manipulative devices for setting data recording elements in the receipt printing and issuing mechanism; a special manipulative device for setting symbols in the receipt printing and issuing mechanism and movable into a plurality of setting positions; said clutch comprising a notched disk and a clutch pawl; a spring to normally hold the clutch pawl in engagement with the notched disk; a second pawl movable into engagement with the clutch pawl to cause the clutch pawl to be disengaged from the notched disk upon operation of the main operating means; a spring to maintain the second pawl out of engagement with the clutch pawl; a linkage connected to the special manipulative device and differentially settable thereby; and a surface on the second pawl in the path of movement of one member of said linkage whereby said one member of the linkage engages the surface to move the second pawl into engagement with the clutch pawl when the special manipulative device is moved into a certain setting position.

5. In a machine of the class described, having a receipt printing and issuing mechanism, the combination of a main operating means; a second operating means for the receipt printing and issuing mechanism; a clutch connecting the second operating means to the main operating means; a plurality of manipulative devices for setting data recording elements in the receipt printing and issuing mechanism; a special manipulative device for setting symbols in the receipt printing and issuing mechanism and movable into a plurality of setting positions; said clutch comprising a notched disk and a clutch pawl; a spring connected to the clutch pawl to normally hold the clutch pawl in engagement with the notched disk; a toe formed on the clutch pawl; a second pawl having a projection thereon movable into engagement with said toe on the clutch pawl to cause the clutch pawl to be disengaged from the notched disk when the notched disk is rotated upon operation of the main operating means; a second spring to normally maintain the projection on the second pawl out of engagement with said toe on the clutch pawl; and connections actuated by the special manipulative device when moved into a certain position to move the projection on the second pawl into engagement with said toe to disable the clutch pawl.

6. In a machine of the class described, having a receipt printing and issuing mechanism, the combination of a main operating means; a second operating means for the receipt printing and issuing mechanism; a clutch connecting the second operating means to the main operating means; a plurality of manipulative devices for setting data recording elements in the receipt printing and issuing mechanism; a special manipulative device for setting symbols in the receipt printing and issuing mechanism and movable into a plurality of setting positions; said clutch comprising a notched disk and a clutch pawl; a spring connected to the clutch pawl to normally hold the clutch pawl in engagement with the notched disk; a toe formed on the clutch pawl; a second pawl having a projection thereon movable into engagement with said toe on the clutch pawl to cause the clutch pawl to be disengaged from the notched disk when the notched disk is rotated upon operation of the main operating means; a second spring to normally maintain the projection on the second pawl out of engagement with said toe on the clutch pawl; an arm; a stud on said arm movable into contact with said second pawl; and connections actuated by the special manipulative device when moved into a certain position to engage and operate said second pawl to move the projection thereon into the path of movement of said toe to disable the clutch pawl during a subsequent machine operation.

WARREN P. LOUDON.

REFERENCES CITED

The following references are of record in the file of this patent:

UNITED STATES PATENTS

| Number | Name | Date |
|---|---|---|
| 1,633,042 | Shipley | June 21, 1927 |
| 1,648,999 | Shipley | Nov. 15, 1927 |
| 1,753,288 | Fuller | Apr. 8, 1930 |
| 1,847,532 | Kropff | Mar. 1, 1932 |
| 1,873,760 | Green | Aug. 23, 1932 |
| 1,956,013 | Falkner | Apr. 24, 1934 |
| 2,008,159 | Shipley | July 16, 1935 |
| 2,010,642 | Peirce | Aug. 6, 1935 |
| 2,174,686 | Carroll | Oct. 3, 1939 |
| 2,176,130 | Green | Oct. 17, 1939 |
| 2,181,991 | Fuller | Dec. 5, 1939 |
| 2,209,763 | Breitling | July 30, 1940 |
| 2,241,269 | Nelson | May 6, 1941 |
| 2,267,655 | Hogfors | Dec. 23, 1941 |
| 2,270,960 | Nelson | Jan. 27, 1942 |
| 2,306,894 | Nelson | Dec. 29, 1942 |
| 2,338,942 | Hughes | Jan. 11, 1944 |
| 2,375,594 | Spurlino | May 8, 1945 |
| 2,388,063 | Klosterman | Oct. 30, 1945 |
| 2,390,396 | Spurlino | Dec. 4, 1945 |
| 2,490,373 | Page | Dec. 6, 1949 |

FOREIGN PATENTS

| Number | Country | Date |
|---|---|---|
| 484,881 | Great Britain | May 11, 1938 |